United States Patent [19]
Yamasaki et al.

[11] Patent Number: 5,751,890
[45] Date of Patent: May 12, 1998

[54] MAGNETIC TYPE RECORDING AND REPRODUCING APPARATUS

[75] Inventors: Tatsuo Yamasaki; Masako Asamura; Sadayuki Inoue; Junko Shinohara; Ken Onishi, all of Tokyo, Japan

[73] Assignee: Mitsubishi Denki Kabushiki Kaisha, Tokyo, Japan

[21] Appl. No.: 554,833

[22] Filed: Nov. 7, 1995

[30] Foreign Application Priority Data

Nov. 11, 1994 [JP] Japan ..................... 6-277823
Jan. 25, 1995 [JP] Japan ..................... 7-009869

[51] Int. Cl.$^6$ ............................................. H04N 5/76
[52] U.S. Cl. ................ 386/79; 360/77.15; 386/80; 386/88
[58] Field of Search .................. 386/46, 88, 14, 386/16, 21, 23, 35, 78–80, 113; 360/77.01, 77.14, 77.15; H04N 5/76

[56] References Cited

U.S. PATENT DOCUMENTS

| | | | |
|---|---|---|---|
| 5,313,346 | 5/1994 | Shimotashiro et al. | 360/77.13 |
| 5,321,557 | 6/1994 | Shimotashiro et al. | 360/65 |
| 5,570,248 | 10/1996 | Ido et al. | 360/77.14 |

FOREIGN PATENT DOCUMENTS

| | | |
|---|---|---|
| 117753 | 9/1984 | European Pat. Off. . |
| 137346 | 4/1985 | European Pat. Off. . |

OTHER PUBLICATIONS

"A Recording Method of ATV Data on a Consumer Digital VCR" Int'l. workshop on HDTV '93, vol. II—Oct. 16 to 28, 1993 in Otawa, Canada.

"Fast Scan Technology for Digital Video Tape Recorders", J. Boyce, et al., IEEE Transactions on Consumer Electronics, vol. 39, No. 3, Aug. 1993.

*Primary Examiner*—Andrew Faile
*Assistant Examiner*—Vincent F. Boccio

[57] ABSTRACT

A magnetic type recording and reproducing apparatus comprises means for extracting by a first head and a second head a plurality of pilot signal components and means for finding an error for control of tracking with using a proper pilot signal component in accordance with a data rate of signals.

The magnetic type recording and reproducing apparatus controls a recording tape speed in accordance with the data rate of signals, controls a playback tape speed in accordance with a high playback speed and the data rate, and arranges high speed playback data in areas which are to be traced by both heads during a playback with a plurality of data rates.

7 Claims, 53 Drawing Sheets

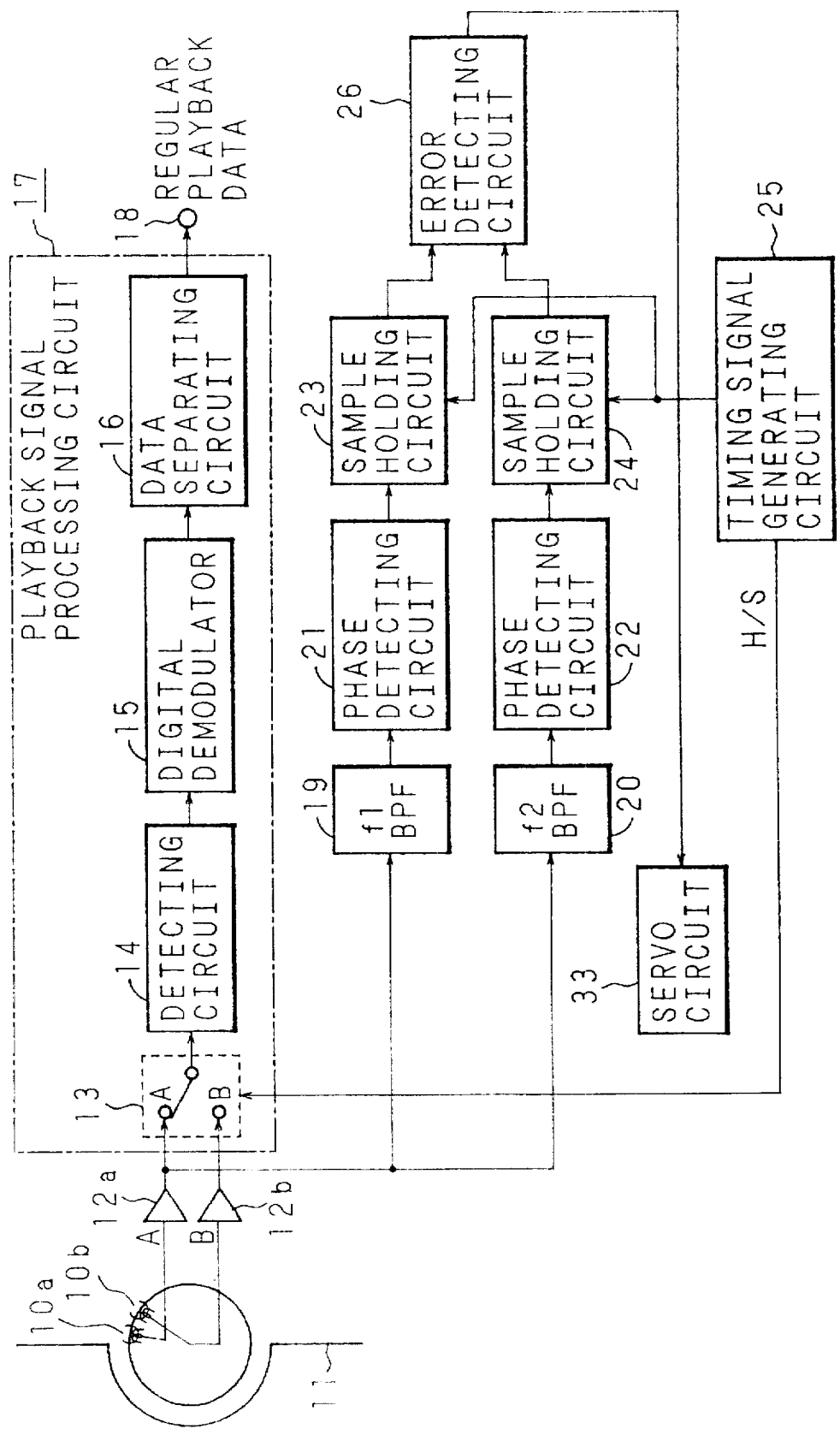

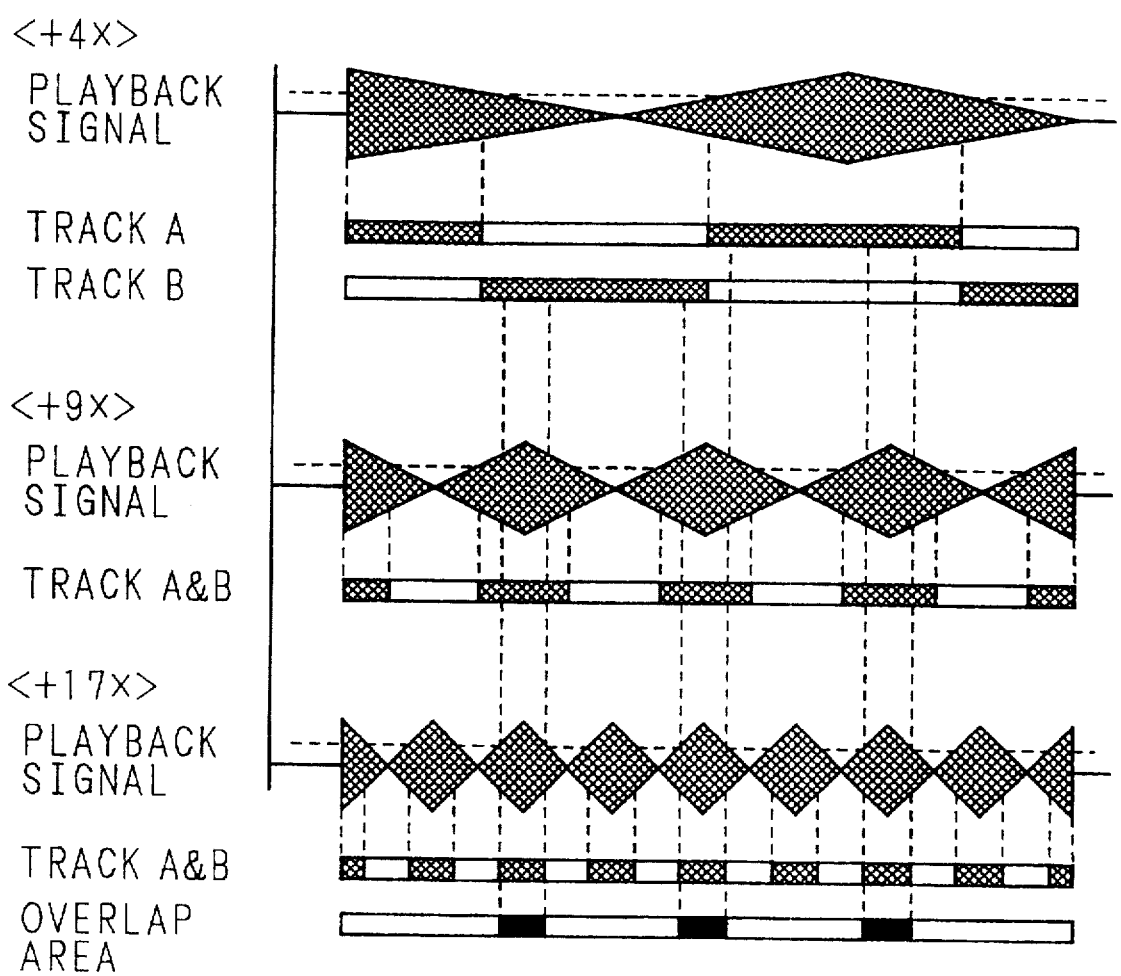

B A B A B A B A B A B A
  HEAD A     HEAD B

B A B A B A B A B A B A
  HEAD A     HEAD B

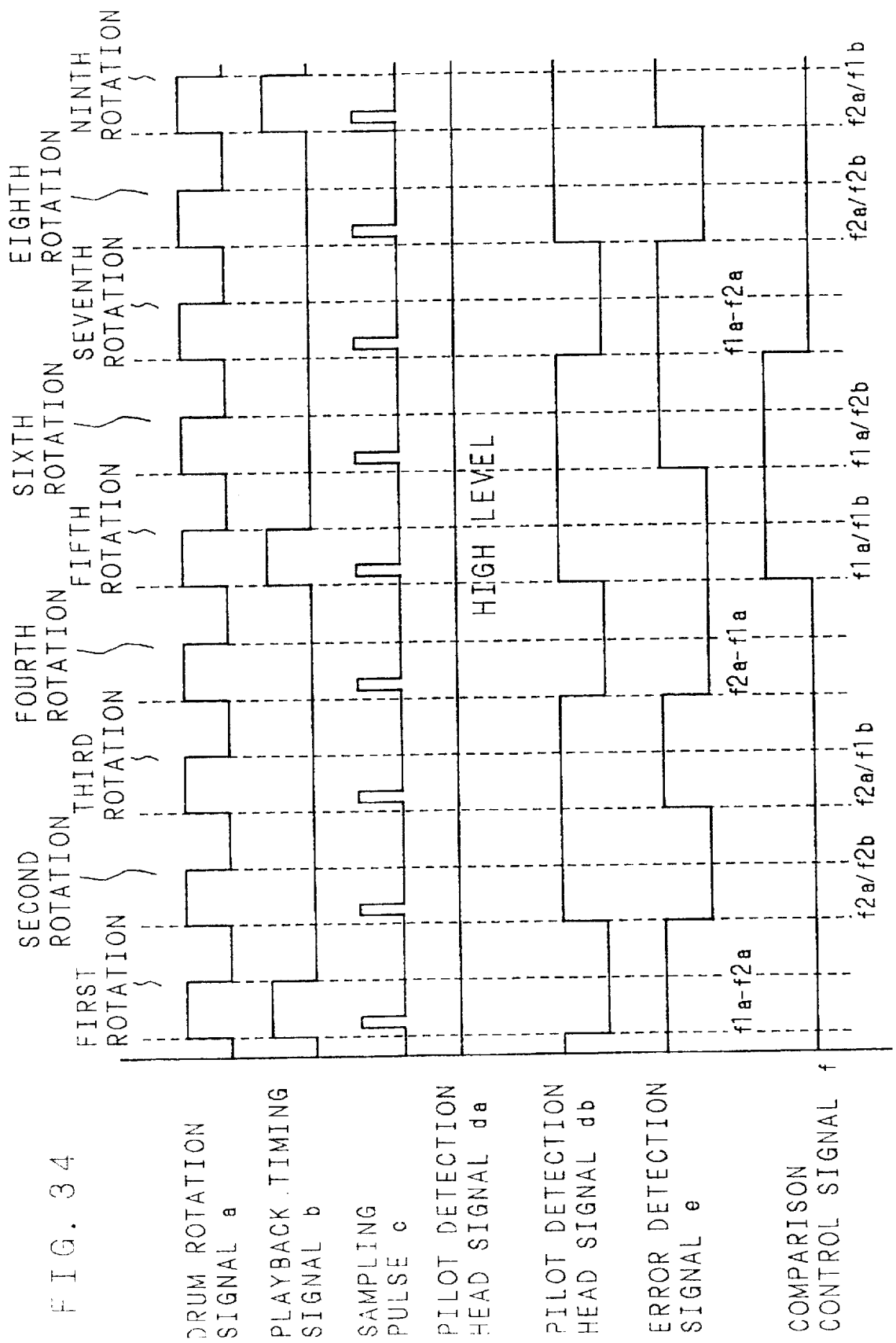

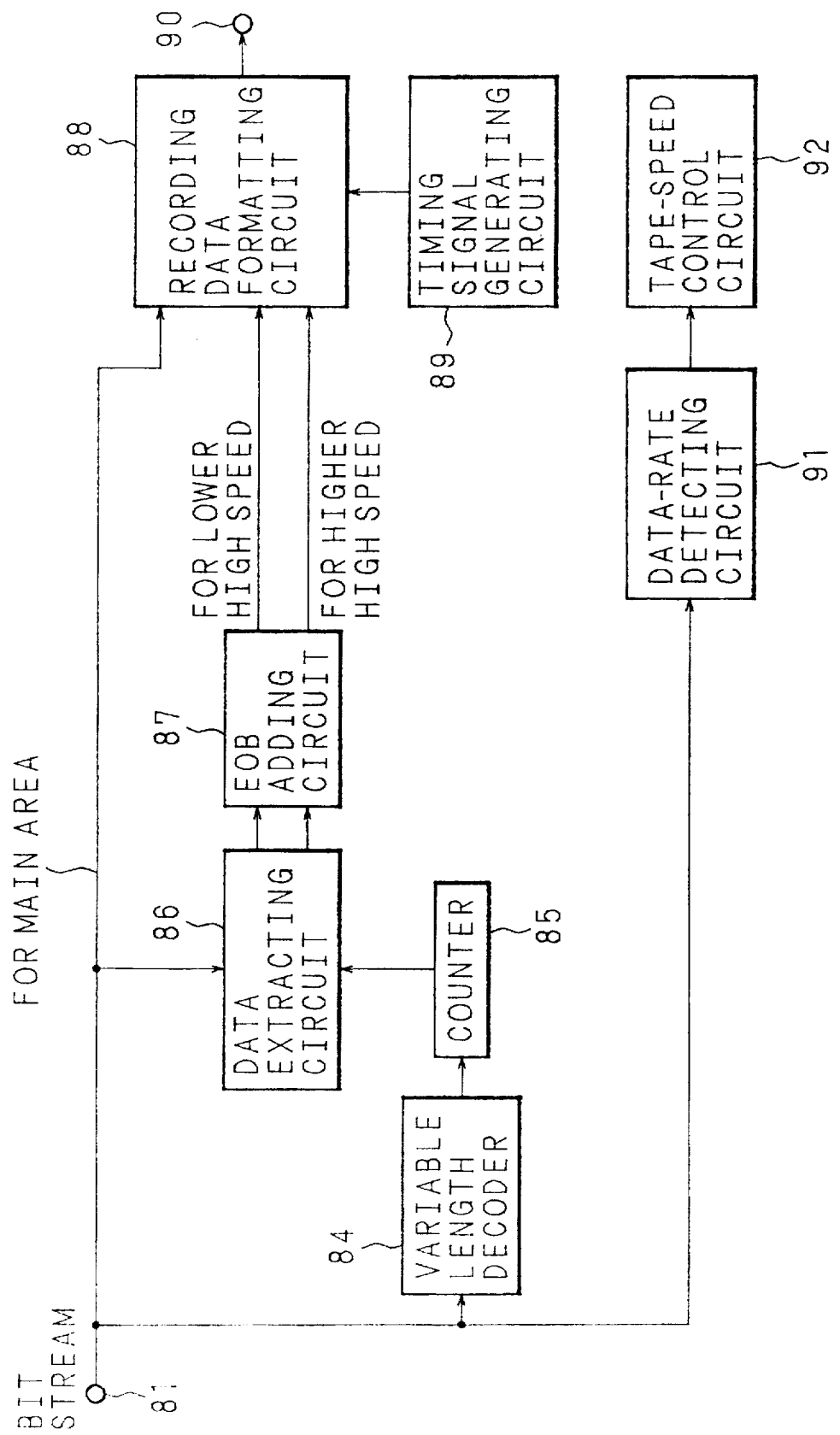

SCANNING DIRECTION OF HEAD B

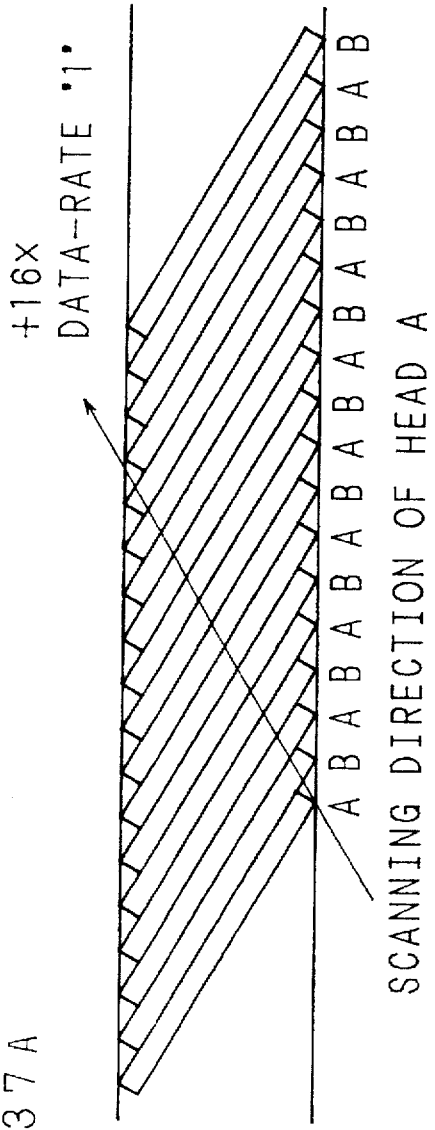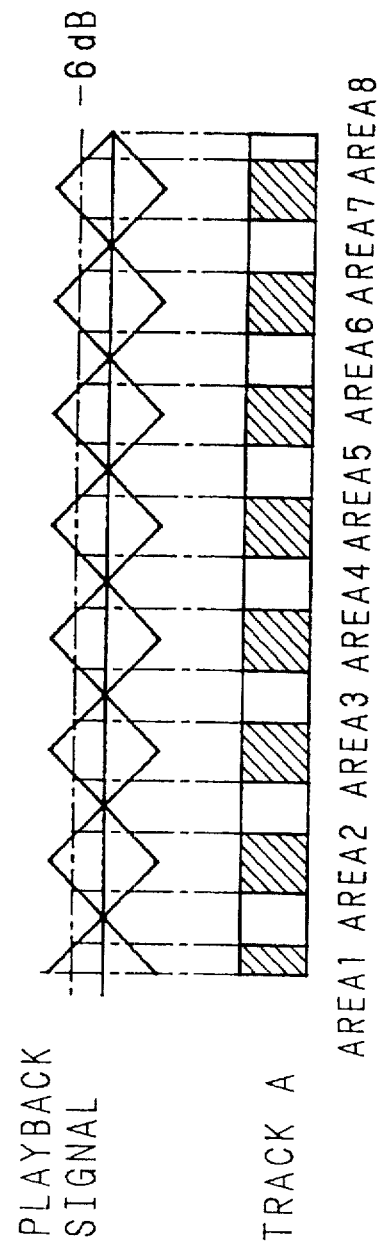
FIG. 37A
FIG. 37B

SCANNING DIRECTION OF HEAD B

FIG. 42

MAGNETIC TYPE RECORDING AND REPRODUCING APPARATUS

BACKGROUND OF THE INVENTION

1. Field of the Invention

The present invention relates to a magnetic type recording and reproducing apparatus such as a digital video tape recorder (hereinafter "digital VTR") for recording a digital video signal and a digital audio signal which are inputted in the form of a bit stream in predetermined areas of slant tracks formed in a magnetic tape and for reproducing the digital video signal and the digital audio signal.

2. Description of Related Art

FIG. 1 is a diagram of tracks used in a common home digital VTR. Track 111 are formed slantwise in a magnetic tape 11. One track 111 has a video area 11a for recording a digital video signal and an audio area 11b for recording a digital audio signal. An ITI (Insert and Track Information) area 11c storing information regarding insertion and tracks is formed in a lower portion of each track.

There are two methods to record a video signal and an audio signal by such a home digital VTR as above. One is a so-called base band recording method in which an analog video signal and an analog audio signal are inputted and recorded using a high-efficiency video/audio coder. The other is a so-called transparent recording method in which a digitally transmitted bit stream is recorded.

The latter transparent recording method is suitable to record an ATV (Advanced Television) signal which is now being discussed in the United States of America. The reason for this is that a high-efficiency coder and a high-efficiency decoder are unnecessary because the ATV signal is an already digitally compressed signal and deterioration of an image is prevented because the digital signal is recorded as is. On the other hand, a weakness of the transparent recording method is image quality during the special playback such as high speed playback, is poor. Particularly when bit streams are directly recorded in a slant track, it is almost impossible to reproduce an image in high speed playback.

A digital VTR method of recording an ATV signal as described above, was disclosed in "A Recording Method of ATV data on a Consumer Digital VCR" was disclosed at "International Workshop on HDTV '93" which was held in Ottawa, Canada from Oct. 26, 1993 through Oct. 28, 1993. In the following, the disclosed technique will be described as an example of the conventional technique.

According to basic specifications of a prototype of a consumer digital VTR, during an SD (Standard Definition) mode, one image frame is recorded in a video area of ten tracks with a recording rate for a digital video signal of 25 Mbps and a field frequency of 60 Hz. If the data rate of an ATV signal is 17 to 18 Mbps, transparent recording of the ATV signal at the SD mode is possible.

FIG. 2A is a diagram showing traces of heads during the regular playback of a digital VTR. In FIG. 2A, heads having different azimuth angles record slantwise tracks at alternate angles. Since a tape feed speed during the regular playback is the same as a tape feed speed during recording, the heads are allowed to trace as shown in FIG. 2A along record tracks.

FIG. 3 is a block circuitry diagram showing a recording part of a bit stream recording and reproducing apparatus. In this apparatus, recording signals including bit streams of ATV signals are recorded at predetermined positions of tracks. An MPEG2 bit stream inputted through an input terminal 1 is supplied to a record amplifier 9 through a formatting circuit 7 and a digital modulator 8 in this order.

A timing signal generating circuit 6 is also disposed for generating a timing signal which represents a synchronizing signal or indicates a track to be used for recording. In accordance with the timing signal supplied from the timing signal generating circuit 6, the formatting circuit 7 forms a synchronizing block (sync block) in such a manner that recording signals are recorded at predetermined positions on tracks and supplies the synchronizing block to the digital modulator 8. The digital modulator 8, in accordance with the timing signal, performs digital modulation while adding pilot signals for the purpose of tracking during the playback to the recording signals for every track. Digital modulation is performed by the 24–25 modulation method for a consumer digital VTR, for example. The recording signals outputted from the digital modulator 8 are supplied and amplified at the record amplifier 9. A head 10a having an azimuth angle A and a head 10b having a different azimuth angle B sequentially record the recording signals at predetermined positions on the tracks of the tape 11.

FIGS. 5A, 5B, and 5C show frequency spectrums of recording signals for the respective tracks to which the pilot signals are added. The pilot signals are added to tracks so that the adjacent tracks have different frequencies. As shown in FIG. 4, for instance, recording signals to which pilot signals having frequencies f1 and f2 are alternately added are recorded in tracks at the azimuth angle B which are recorded by the head 10b (hereinafter f1 track and f2 track). Recording signals to which pilot signals are not added are recorded in tracks at the azimuth angle A which are recorded by the head 10a (hereinafter f0 track).

FIG. 6 is a block circuitry diagram showing a structure of a playback part of the conventional bit stream recording and reproducing apparatus. Playback signals read from the tape 11 by the heads 10a and 10b are amplified by playback amplifiers 12a and 12b and supplied to a playback signal processing circuit 17. The playback signal processing circuit 17 is formed by a switch 13 for switching and outputting playback signals in accordance with a head switch signal indicating a head which is reproducing, a detection circuit 14 for detecting the playback signals, a digital demodulator 15 and a data separating circuit 16. Playback data from the playback signal processing circuit 17 are supplied to a predetermined apparatus through an output terminal 18 so as to be reproduced.

The playback part includes a band pass filter 19 for extracting a pilot signal component of a frequency f1 from the playback signals supplied from the playback amplifier 12a, a band pass filter 20 for extracting a pilot signal component of a frequency f2 from the same playback signals, phase detectors 21 and 22 for detecting output signals from the band pass filters 19 and 20, sample holding circuits 23 and 24 for extracting pilot signals, a timing signal generating circuit 25, an error detection circuit 26 for detecting a difference between the pilot signal components having frequencies f1 and f2 included in the playback signals to detect an error of tracking and a servo circuit 33 for performing tracking control and other functions.

Now, an operation during the regular playback will be described. The playback signals read from tracks of the tape 11 by the heads 10a and 10b are amplified by playback amplifiers 12a and 12b, respectively, and supplied to the switch 13. The switch 13 alternately switches outputs from tracks at the azimuth angle A (f0 track in FIG. 4) and tracks at the azimuth angle B (f1 track and f2 track in FIG. 4) in accordance with the head switch signal outputted from the timing signal generating circuit 25, to form one playback signal which is supplied to the detection circuit 14. The playback signal detected by the detection circuit 14 is digitally demodulated into an original bit stream by the digital demodulator 15 and outputted to the data separating circuit 16. A bit stream which is recorded at a predetermined position on the track is separated by the data separating circuit 16 and supplied through the output terminal 18 to an MPEG2 decoder disposed outside the digital VTR.

Further, playback signals read from tracks of the azimuth angle A by the head 10a are amplified by the playback amplifier 12a and supplied to the band pass filters 19 and 20, whereby pilot signal components of frequencies f1 and f2 are extracted from the playback signals. Outputs from the band pass filters 19 and 20 are phase-detected by the phase detectors 21 and 22 and supplied to the sample holding circuits 23 and 24, respectively. The sample holding circuits 23 and 24 perform sampling and holding of the pilot signal components of the frequencies f1 and f2 using a sampling pulse which is outputted from the timing signal generating circuit 25, and then supply values y1 and y2 at the sampling point to the error detection circuit 26. The error detection circuit 26 detects a difference (y1−y2) between the values y1 and y2 and outputs the result of the detection to the servo circuit 33. In accordance with the result of the difference detection, the servo circuit 33 controls tracking.

The sampling pulse supplied from the timing signal generating circuit 25 to the sample holding circuits 23 and 24 is so set as to have a sampling point, for example, at a position which corresponds to the ITI area 11c at the bottom end of the track to which a pilot signal having a constant amplitude is added, as shown in FIG. 7. In this case, tracking is controlled by the result of the error detection at the sampling point of a signal which is obtained when the head 10a scans the f0 track.

When tracking by the head 10a having the azimuth angle A is normal (FIG. 8A), among playback signals read from a track A (f0 track) by the head 10a, a pilot signal component y1 having the frequency f1, i.e., a cross talk component from a track B which is located on the left side of the track A is equal to a pilot signal component y2 having the frequency f2, i.e., a cross talk component from a track B which is located on the right side of the same track A. However, as shown in FIG. 8B, when there is a displacement x between tracking positions, a difference is brought about between the pilot signal components y1 and y2 depending on a direction of the displacement. The servo circuit 33 controls tracking so that the pilot signal components y1 and y2 become equal to each other, that is, a difference (y1−y2) between the pilot signal components y1 and y2 becomes 0.

Since the conventional apparatus has such a structure as above, tracking control during regular playback is performed using only a signal reproduced by the head 10a which has the same azimuth angle A as the head which recorded the f0 track. Hence, it is not allowed to use a signal which is reproduced by the head 10b having a different azimuth angle from the head which recorded the f0 track.

By the way, a DVB (Digital Video Broadcasting) signal which is under discussion for use in digital broadcasting in Europe is transmitted as a bit stream similar to the ATV signal. It is also the transparent recording method that is suitable to a digital VTR for recording this DVB signal. However, a DVB signal has a plurality of modes among which data rates of transmitted bit streams are different. The data rates of a DVB signal are normalized in values as follows:

| Data Rate: | (Normalized value) | (Actual data rate value) |
|---|---|---|
| | 1 | 25 Mbps |
| | 1/2 | 12.5 Mbps |
| | 1/3 | 8.33 Mbps |
| | 1/4 | 6.25 Mbps |

Hence, when DVB signals having different data rates are recorded by the transparent recording method, the number of revolutions of a rotation drum is set constant while a tape speed is changed depending on a data rate ratio (normalized value). As a result, bit streams are recorded on tracks at the same recording rate. Where a data rate of bit streams is ½ of a standard data rate "1", for example, if the tape speed is changed to ½ of a tape speed v for the data rate "1", signals are recorded on tracks at the same recording rate and in the same format as where the data rate is "1".

Where the data rate is "⅓", and the tape speed is changed to ⅓ of the tape speed v for the data rate "1", signals are recorded on tracks at the same recording rate and in the same format as where the data rate is "1". Further, where the data rate is "¼", with the tape speed changed to ¼ of the tape speed v for the data rate "1", signals are recorded on tracks at the same recording rate and in the same format as where the data rate is "1".

Now, a description will be given regarding tracking in the conventional apparatus during regular playback of record tracks conformed to the plurality of the data rates. For example, in the regular playback with the data rate of "½", the heads 10a and 10b mounted to the rotation drum scan a track at the azimuth angle A (track A) and a track at the azimuth angle B (track B) respectively, whereby playback signals are read. After being converted into regular playback data through the playback signal processing circuit 17, the playback signals are outputted outside through the output terminal 18. At this stage, the head 10a scanning the track A is subjected to tracking control based on the pilot signal components y1 and y2 having the frequencies f1 and f2 which are extracted as cross talk components from the tracks B adjacent to the track A.

However, since the heads 10a and 10b scan the tracks B and A respectively during the next revolution of the rotation drum, the head 10a can extract only one of the pilot signal components which has the frequency f1 or f2. The extracted only one pilot signal component cannot be used for tracking control. That is, the tracking control operation utilizing sampling is updated only once in two revolutions of the rotation drum.

Similarly, during regular playback with the data rate of "⅓", the tracking control operation utilizing sampling is updated only once in three revolutions of the rotation drum. Further, during the regular playback with the data rate of "¼", the tracking control operation utilizing sampling is updated only once in four revolutions of the rotation drum.

In the conventional apparatus, since tracking control during the regular playback is performed only by the head 10a which has the same azimuth angle as the head which recorded the f0 track, the tracking control operation utilizing sampling is updated only once in r revolutions of the rotation drum during the regular playback with the data rate of "1/r" (r>1) as above. Compared with the regular playback with the data rate of "1" wherein the tracking control operation is updated utilizing sampling for every revolution of the rotation drum, this means a decrease of opportunities for tracking, causing a tracking accuracy to be deteriorated during the regular playback with the data rate of "1/r".

FIG. 2B is a diagram showing traces of heads during the high speed playback of the digital VTR. Since the tape speed is different during the high speed playback, the heads trace across some tracks, whereby merely fragments of tracks having the same azimuth angle are reproduced. Fast forwarding at a quintuple speed is shown in FIG. 2B.

From an MPEG2 bit stream, only an intra-coded block is decoded independently without referring to other frames. Where MPEG2 bit streams are recorded in tracks in order, an image is reconstructed by only intra codes from a burst of playback data during the high speed playback. Here, areas reproduced on a screen are not continuous. Rather, fragments of blocks spread on the screen. Further, since the bit streams are variable-length-coded, it is not guaranteed that the screen will be entirely updated periodically. Rather, a certain portion of the screen is likely not to be updated for a long time. The image quality during the high speed playback is eventually not satisfactory and not acceptable for a consumer digital VTR.

In a bit stream recording and reproducing apparatus which can playback at high speeds, a video area of each track is divided into a main area for recording bit streams of all ATV signals and a copy area for recording essential portions (HP data) of bit streams to be used to reconstruct an image at the high speed playback. Since only the intra-coded blocks are valid during the high speed playback, the intra-coded blocks are recorded in the copy area. Further, low frequency components are extracted from all intra-coded blocks so as to reduce data, and the remaining data is recorded as HP data.

FIG. 9 is a block diagram showing a recording part of the bit stream recording and reproducing apparatus referred to above. MPEG2 bit streams inputted through an input terminal 81 are directly outputted at an output terminal 82 as a main area data and sequentially recorded in the main area. The bit streams from the input terminal 81 are supplied to a variable length decoder 84 as well, where syntaxes of the MPEG2 bit streams are analyzed, so that an intra image is detected. In accordance with the intra image signal, a counter 85 generates a timing signal. In accordance with the timing signal, a data extracting circuit 86 extracts low frequency components of all blocks of the intra image. An EOB adding circuit 87 adds an EOB to the low frequency components, thereby constituting HP data. The HP data is outputted at the output terminal 83 as a copy area data and recorded in the copy area.

FIGS. 10A and 10B are diagrams explanatory of a playback method used in the conventional bit stream recording and reproducing apparatus. During the regular playback (FIG. 10A), all bit streams recorded in the main area are reproduced and supplied to the MPEG2 decoder outside the digital VTR. Since this operation is performed during the regular playback, the HP data recorded in the copy area are disposed of. On the other hand, during the high speed playback (FIG. 10B), only the separated HP data in the copy area are collected and supplied to the MPEG2 decoder, while bit streams in the main area are disposed of.

Next, an arrangement of the main area and the copy area on one track will be described. FIGS. 11A and 11B are a diagram showing an example of traces by a head during the high speed playback at a nonuple speed. If the tape speed is an integral multiple and phase lock control is exerted, head scanning synchronizes with a track having the same azimuth. Hence, a position of data to be reproduced is fixed. Assuming that a portion wherein an output level of a playback signal is larger than −6 dB is reproduced in FIGS. 11A and 11B, a region indicated by crisscrosses is reproduced by one head. Reading of signals from this crisscross region is ensured at the nonuple speed. Hence, the HP data should be recorded in this area. However, since reading of signals is not guaranteed at other high speeds, this region needs to be selected so that signals can be read at several tape speeds.

FIG. 12 is a diagram showing an example of scanning regions by a head with three tape speeds synchronized with a track having the same azimuth. The regions scanned at the respective tape speeds overlap at some areas. The copy area is selected from these areas to guarantee reading of the HP data at different tape speeds. FIG. 12 shows fast forwarding at quadruple, nonuple, 17-times speeds. Scanning regions in these cases are the same as those at fast forwarding at minus double, minus septuple, minus 17-times speeds.

A head cannot trace exactly the same area at different tape speeds. This is because the head traverses a different number of tracks depending on the tape speed. Further, the head must be able to trace any tracks having the same azimuth. FIG. 13 shows an example of traces of a head at different tape speeds. In FIG. 13, areas 1, 2 and 3 are selected from the overlap areas for the quintuple speed and the nonuple speed. It is possible to read the HP data at either the quintuple speed or the nonuple speed since the same HP data is repeatedly recorded in 9 tracks.

FIGS. 14A and 14B show an example of traces of heads at the quintuple speed. As can be understood from FIGS. 14A and 14B, if the same HP data is repeatedly recorded in the same number of tracks as that of the tape speed, it is possible to read the HP data by the head which synchronizes with the tracks having the same azimuth. Hence, if the HP data is repeatedly duplicated in the same number of tracks as the maximum tape speed for high speed playback, copied HP data can be read at several tape speeds in any of the forward and the backward direction.

FIG. 15 is a diagram showing an example of the main area and the copy area. In a consumer digital VTR, the video area of each track consists of 135 sync blocks. The main area includes 97 sync blocks while the copy area includes 32 sync blocks. As the copy area, the overlap area which corresponds to the quadruple, nonuple and 17-times speeds shown in FIG. 12 is selected. In this case, the data rate of the main area is about 17.46 Mbps. Since the same data is recorded for 17 times in the copy area, the data rate is about 338.8 kbps.

The conventional apparatus has such a structure as above. To record bit streams supplied at a fixed data rate, an overlap area which is reproduced at a plurality of high playback speeds is selected to store high speed playback data in the conventional apparatus.

Now, a future digital VTR is considered here which records bit streams of multiplexed signals having different data rates such as DVB signals. The transparent recording method is suitable to the future digital VTR as well. To record signals having different data rates, the number of revolutions of the rotation drum is set constant while the tape speed is changed depending on a data rate ratio. As a result, bit streams are recorded on tracks at the same recording rate. For example, if the data rate of bit streams is ½ of a standard data rate, and the tape speed is changed to ½ of a tape speed v for the data rate "1", signals are recorded on tracks at the same recording rate and in the same format as where the data rate is "1". Further, if the data rate of bit streams is ¼ of the standard data rate, with the tape speed changed to ¼ of the tape speed v for the data rate "1", signals are recorded on tracks at the same recording rate and in the same format as where the data rate is "1".

During recording and high speed playback of bit streams transmitted in the form that signals having different data rates are multiplexed, recorded tracks are the same at any data rate. However, with respect to the speed during the playback, assuming that a high playback speed is m-times with the data rate of 1, an m-times speed with signals having the data rate "½" must correspond to a (½)×m-times speed with the data rate of "1". The m-times speed with signals having the data rate "¼" must correspond to a (¼)×m-times speed with the data rate of "1".

Since high speed playback data is stored in an area where bit streams having a fixed data rate is reproduced at a predetermined high playback speed in the conventional apparatus, to perform high speed playback of recording signals having different data rates each at the same high speed, it is necessary to change the playback tape speed depending on the data rate. In this case, the head traces differently depending on the data rate even during the high speed playback at the same high speed. Hence, depending on the data rate of bit streams, the stored high speed playback data cannot be traced in some cases.

In addition, while high speed playback data is sometimes stored in an area which is traced at a predetermined high speed at each one of all data rates, the digital VTR has limited video areas for recording video signals. Hence, when an area is to be created for recording high speed playback data in addition to an area for recording the data of the main area, the quantity of high speed playback data is limited. This restricts the number of data rates of bit streams the apparatus can deal with.

SUMMARY OF THE INVENTION

The present invention has been made to solve these problems. One object of the present invention is to provide a magnetic type recording and reproducing apparatus in which a tracking accuracy remains approximately the same during the regular playback of signals having a data rate of 1/r as during the regular playback of signals having a data rate of 1.

A magnetic type recording and reproducing apparatus according to the present invention obtains a first pilot signal component through playback scanning by a first head and obtains a second pilot signal component through playback scanning by a second head. In accordance with a data rate of recording signals, the pilot signal components are selectively used to detect a tracking error signal.

Further, a third and a fourth pilot signal components are obtained by reproducing while scanning astride two tracks approximately equally. Tracking is controlled in accordance with a ratio of these pilot signal components and the error signal. With such a structure, the apparatus deals with an increased number of data rates.

Another object of the present invention is to obtain a magnetic type recording and reproducing apparatus which performs high speed playback at a plurality of common high speeds even when the data rates are different.

A magnetic type recording and reproducing apparatus according to the present invention arranges and records data in an area which is traced and reproduced by a head during the high speed playback of recording signals having all types of data rates at an m-times speed (lm l>1) while controlling a tape speed depending on the data rate. In this case, a playback tape speed is controlled based on the value m and the data rate during the playback.

The above and further objects and features of the invention will more fully be apparent from the following detailed description with accompanying drawings.

BRIEF DESCRIPTION OF THE DRAWINGS

FIG. 6 is a diagram showing a structure of a playback part of a conventional bit stream recording and reproducing apparatus;

FIG. 12 is a diagram showing examples of areas scanned by a head synchronizing with tracks having the same azimuth at three tape speeds;

FIG. 34 is a timing chart of signals during the regular playback with a data rate of "⅓" in the third embodiment;

FIG. 35 is a block circuitry diagram showing a structure of a recording part of a magnetic type recording and reproducing apparatus according to a fourth embodiment of the present invention;

FIGS. 37A are 37B are diagrams showing a position of a head trace and a playback area during the playback at a 16-times speed with a data rate of "1";

FIG. 42 is a diagram showing a state in which tracks recording data having a data rate of "½" are reproduced at a quadruple speed in a drum structure of 1ch×2 in the fourth embodiment;

DESCRIPTION OF THE EMBODIMENTS

In the following, the present invention will be described with reference to associated drawings which show embodiments of the present invention.

First, a description will be given on a magnetic type recording and reproducing apparatus which can normally playback without deteriorating a tracking accuracy even when signals having different data rates are used.

Embodiment 1

Figure 16:
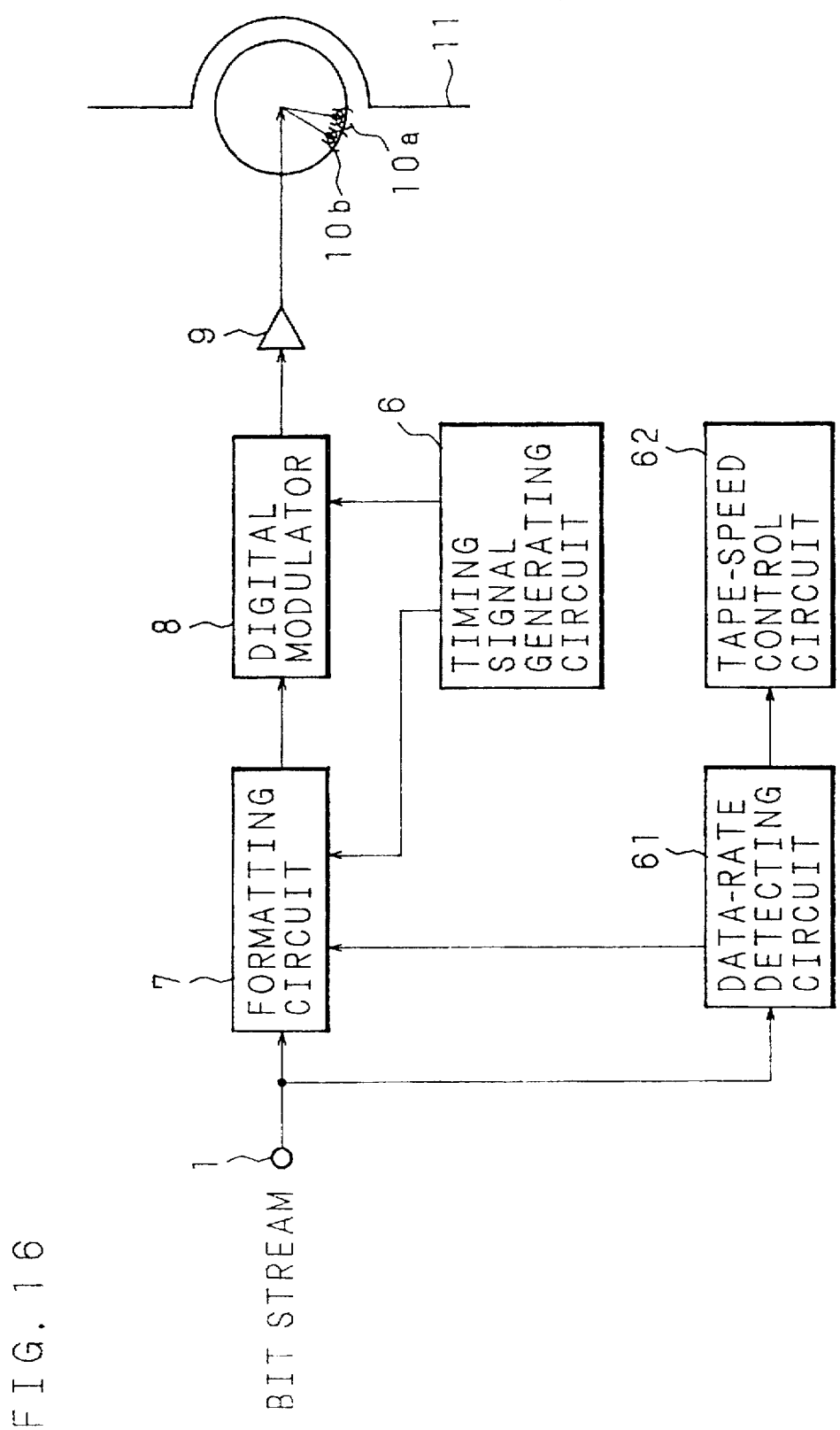
FIG. 16 is a block circuitry diagram showing a structure of a recording part of a magnetic type recording and reproducing apparatus according to a first embodiment of the present invention.

FIG. 16 is a block circuitry diagram showing a structure of a recording part of a bit stream recording and reproducing apparatus according to a first embodiment. An MPEG2 bit stream inputted through an input terminal 1 is supplied to a record amplifier 9 through a formatting circuit 7 and a digital modulator 8 in this order. A timing signal generating circuit 6 is also disposed for generating a timing signal which represents a synchronizing signal or indicates a track to be used for recording. In accordance with the timing signal supplied from the timing signal generating circuit 6, the formatting circuit 7 forms a synchronizing block (sync block) in such a manner that recording signals are recorded at predetermined positions on tracks and supplies the synchronizing block to the digital modulator 8. The digital modulator 8, in accordance with the timing signal generated by the timing signal generating circuit 6, performs digital modulation while adding pilot signals for the purpose of tracking at the time of playback to the recording signals for every recording track.

Figure 1:
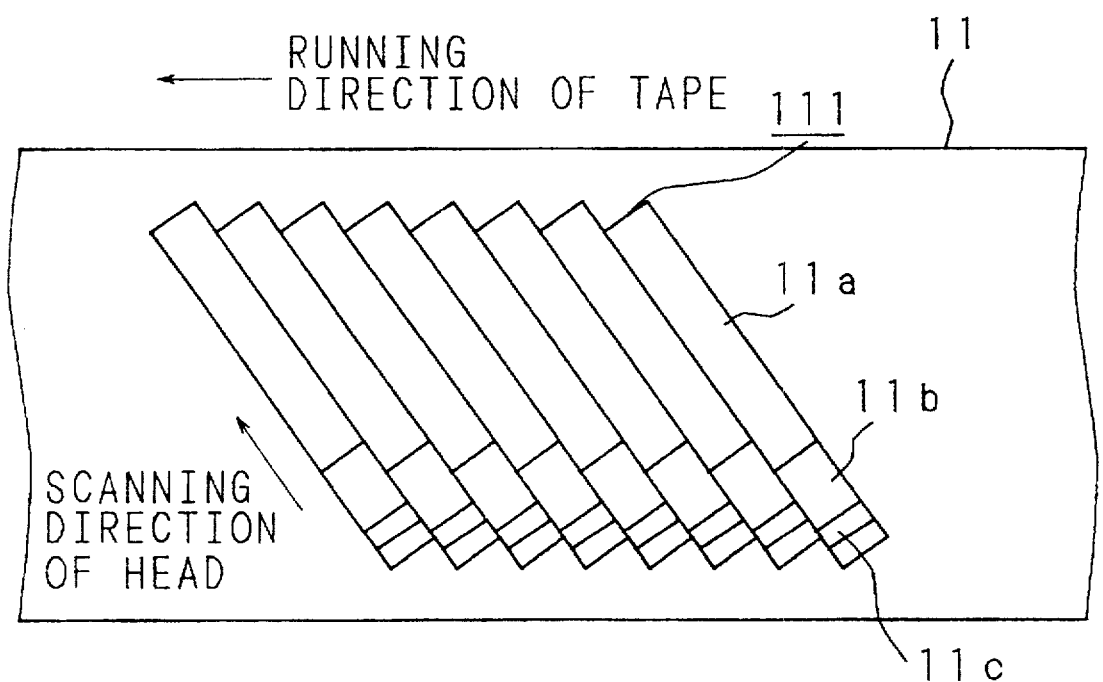
FIG. 1 is a diagram of tracks used in a common home digital VTR.
Figure 2A:
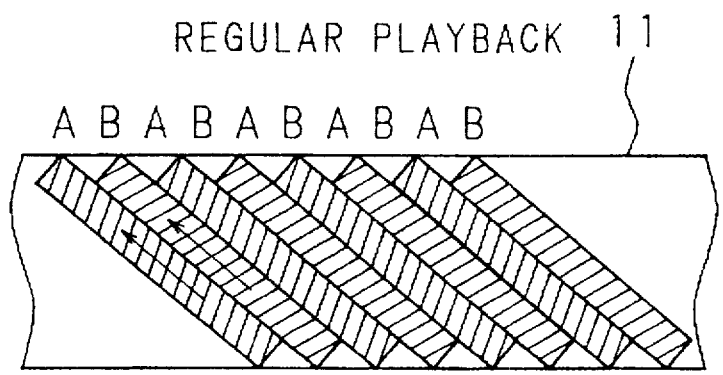
FIG. 2A is a diagram of traces by heads at the regular playback in a digital VTR.
Figure 2B:
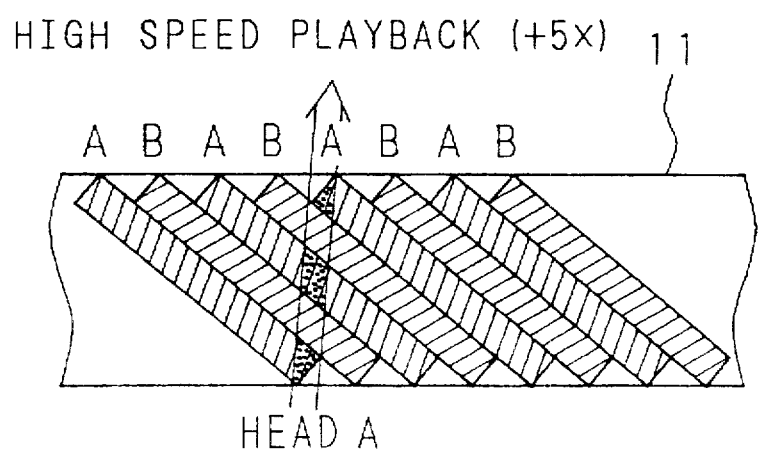
FIG. 2B is a diagram of traces by heads at the high speed playback in a digital VTR.
Figure 3:
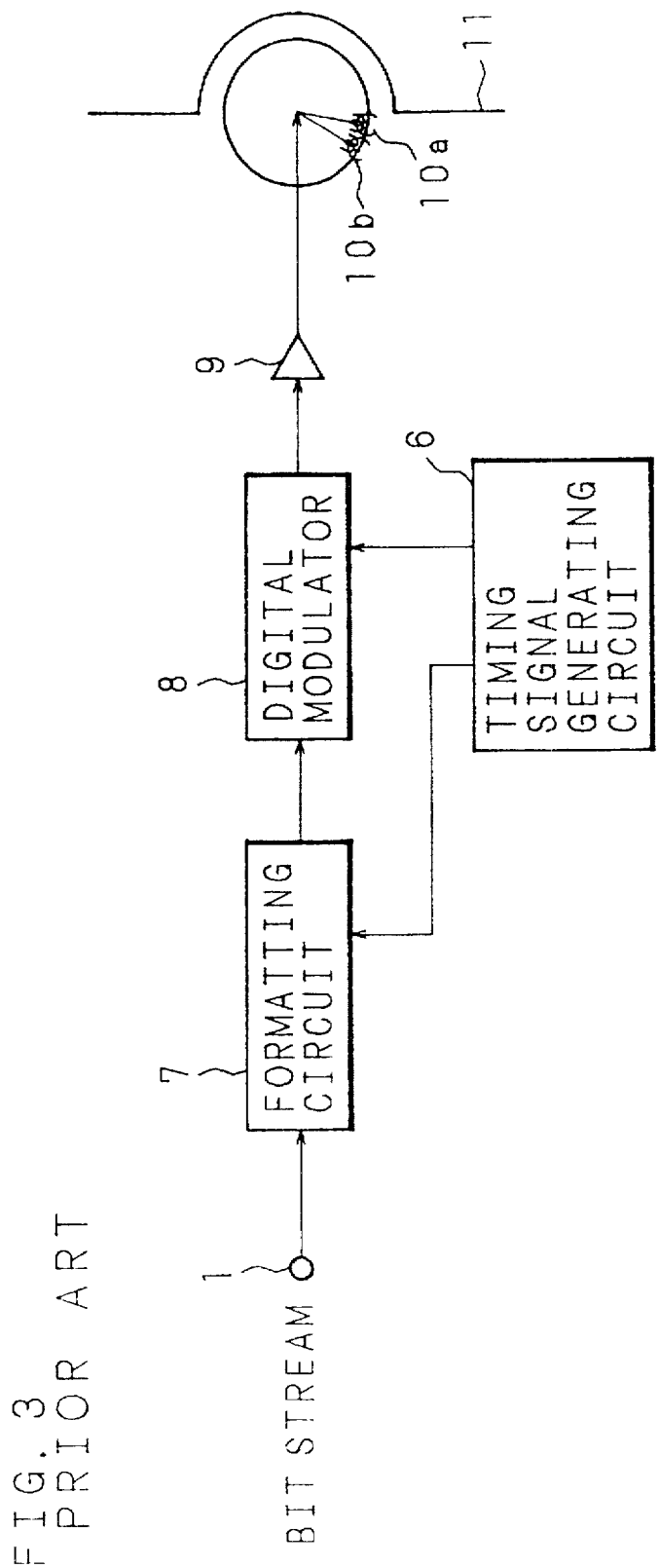
FIG. 3 is a diagram showing a structure of a recording part of a conventional bit stream recording and reproducing apparatus.
Figure 4:
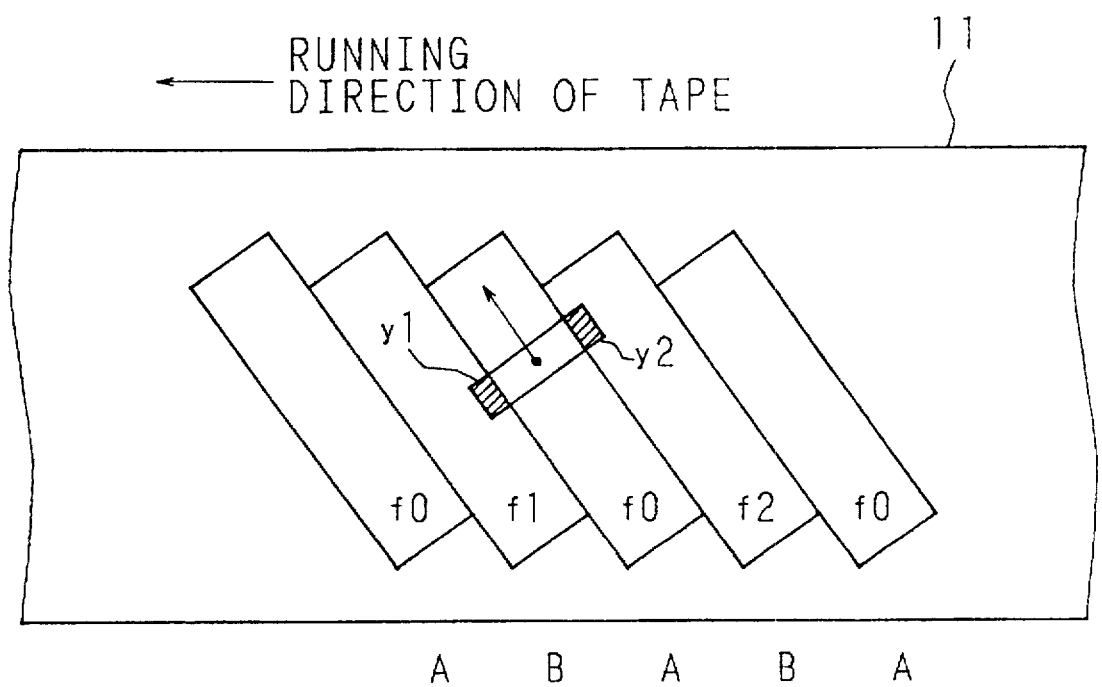
FIG. 4 is a diagram showing an example of a pattern of a tracking pilot signal on tracks in a home digital VTR.
Figure 5A:
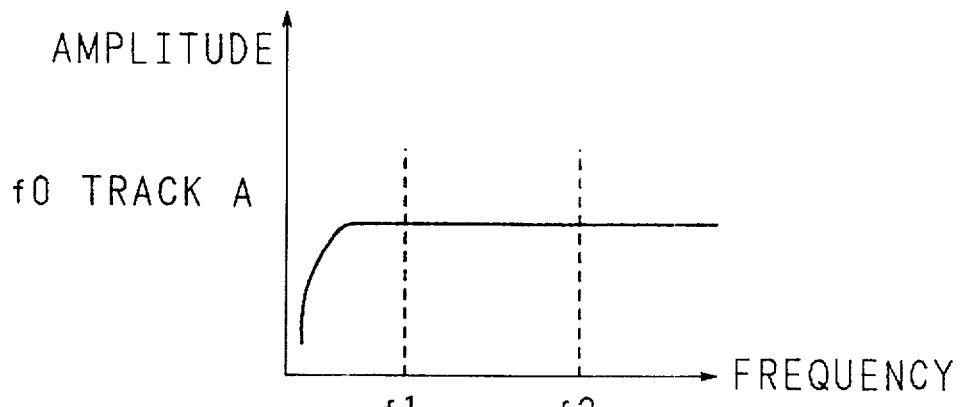
FIGS. 5A, 5B and 5C are graphs showing an example of frequency spectrums of recording signals to which a tracking pilot signal is added.
Figure 5B:
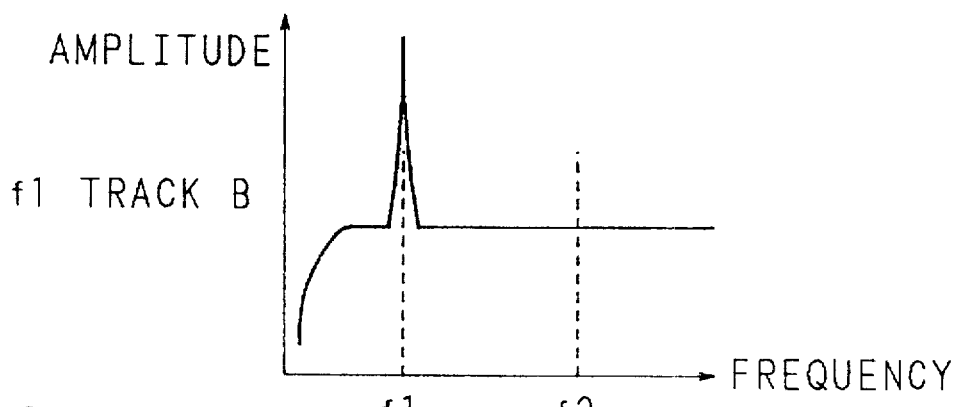
Figure 5C:
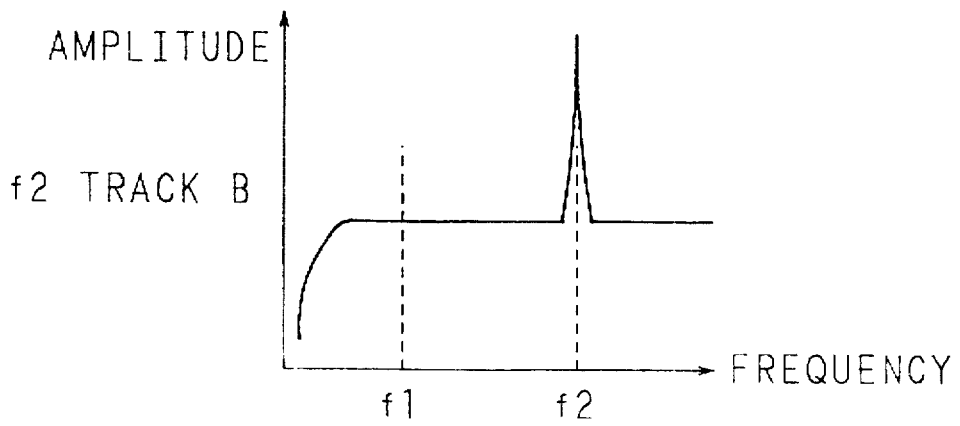

The above digital modulation is performed by the 24–25 modulation method for a consumer digital VTR, for example. Pilot signals are added so that different tracks have different frequencies. As shown in FIG. 4, for instance, pilot signals having frequencies f1 and f2 are alternately added to recording signals, which are recorded in tracks at the azimuth angle B recorded by the head 10b. Record signals to which pilot signals are not added are recorded in tracks at the azimuth angle A recorded by the head 10a (hereinafter f10 track). FIGS. 5A and 5B show frequency spectrums on tracks after pilot signals are added.

The apparatus further includes a data rate detection circuit 61 for detecting a data rate of an inputted bit stream and outputting a signal expressing the data rate to the formatting circuit 7 and a tape-speed control circuit 62, and the tape speed control circuit 62 for controlling a tape speed during recording in accordance with the signal from the data rate detection circuit 61.

Now, operation during recording in the first embodiment will be described. MPEG2 bit streams inputted through the input terminal 1 are supplied to the formatting circuit 7 and the data rate detection circuit 61. The data rate detection circuit 61 detects whether the data rate of the inputted bit streams is "1" (a normal data rate), "½" (½ of the normal data rate; "⅓" or "¼", and generates a signal indicative of the detected data rate to supply the signal to the tape speed control circuit 62 and the formatting circuit 7. In accordance with a timing signal, the formatting circuit 7 inserts the signal expressing the data rate into a synchronization block (sync block) of a recording signal and supplies the recording signal to the subsequent digital modulator 8. The recording signal to which the pilot signal is added in accordance with the timing signal at the digital modulator 8 is supplied to the record amplifier 9 so as to be amplified for recording. The recording signals are sequentially recorded at predetermined positions on tracks of the tape 11 by the head 10a which has the azimuth angle A or the head 10b which has the azimuth angle B different from the azimuth angle A. The tape speed control circuit 62 controls the tape speed during recording based on the inputted signal of the detected data rate, whereby data are recorded at a tape speed corresponding to the data rate of the inputted bit streams.

Figure 17:
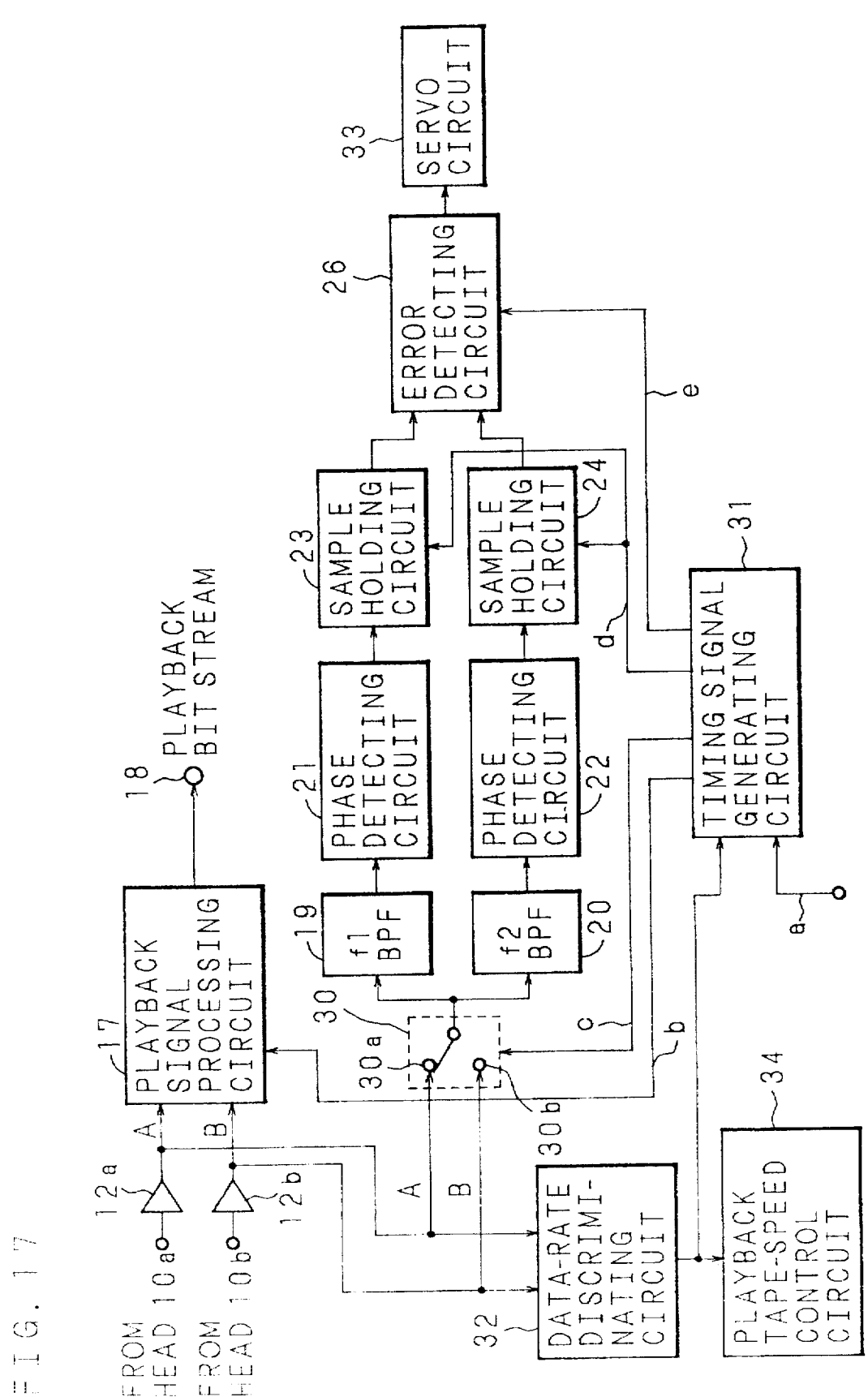
FIG. 17 is a block circuitry diagram showing a structure of a playback part of the magnetic type recording and reproducing apparatus according to the first embodiment.

FIG. 17 is a block diagram showing the structure of a playback part of the bit stream recording and reproducing apparatus according to the first embodiment. Playback signals read from the tape 11 by the heads 10a and 10b are amplified by playback amplifiers 12a and 12b and supplied to a playback signal processing circuit 17. Playback data outputted from the playback signal processing circuit 17 after digitally demodulated and separated are supplied to an apparatus through an output terminal 18 and reproduced there.

Playback signals amplified by the playback amplifier 12a are supplied to one input terminal 30a of a switch 30 and a data rate determining circuit 32. Playback signals amplified by the playback amplifier 12b are supplied to the other input terminal 30b of the switch 30 and the data rate discriminating circuit 32. The switch 30 switches playback signals A and B supplied from the head 10a and the head 10b and supplies either playback signal to a band pass filter f1BPF 19 for extracting a pilot signal component having a frequency f1 from the playback signal and a band pass filter f2BPF 20 for extracting a pilot signal component having a frequency f2 from the same playback signal. As in the conventional apparatus, phase detectors 21 and 22, sample holding circuits 23 and 24, an error detection circuit 26 and a servo circuit 33 are subsequently connected to the band pass filters 19 and 20. The servo circuit 33 controls tracking in accordance with a signal from the error detection circuit 26 and performs other functions.

The playback part further includes the timing signal generating circuit 31 which receives a drum rotation signal a and, a data rate judgement signal from the data rate determining circuit 32, and generates and outputs timing signals such as a playback timing signal b for switching a head to reproduce recording signals from a recording track, a pilot detection head signal c which indicates a head to be used to detect a pilot signal component and a sampling pulse d which shows a sampling point for error signal detection for tracking control.

The data rate discriminating circuit 32 provides the timing signal generating circuit 31 and a playback tape speed control circuit 34 with a signal of the data rate of record tracks during playback. The playback tape speed control circuit 34 controls a playback tape speed in accordance with this signal.

Figure 18:
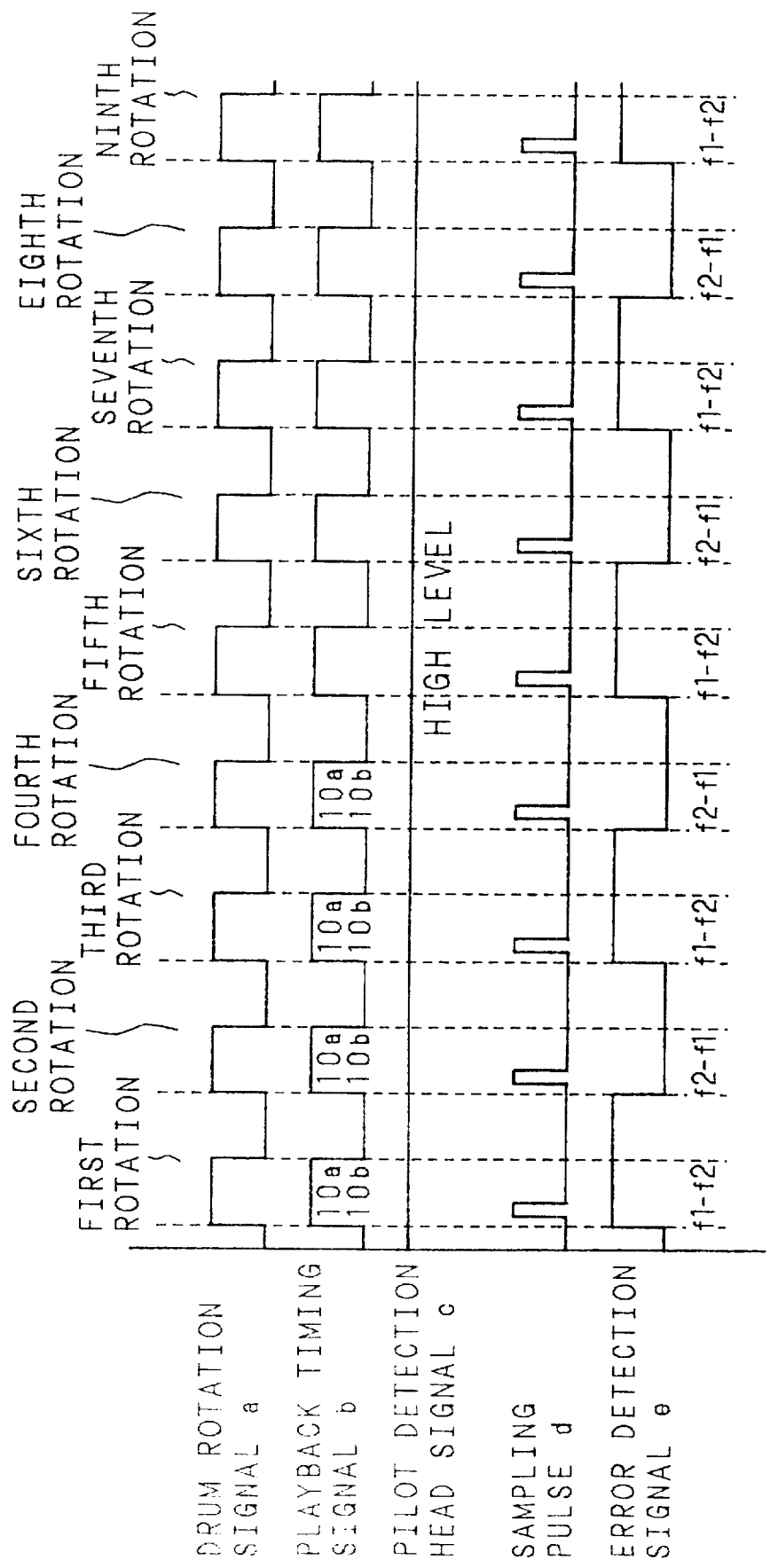
FIG. 18 is a timing chart of signals during the regular playback with a data rate of "1" in the first embodiment.
Figure 19:
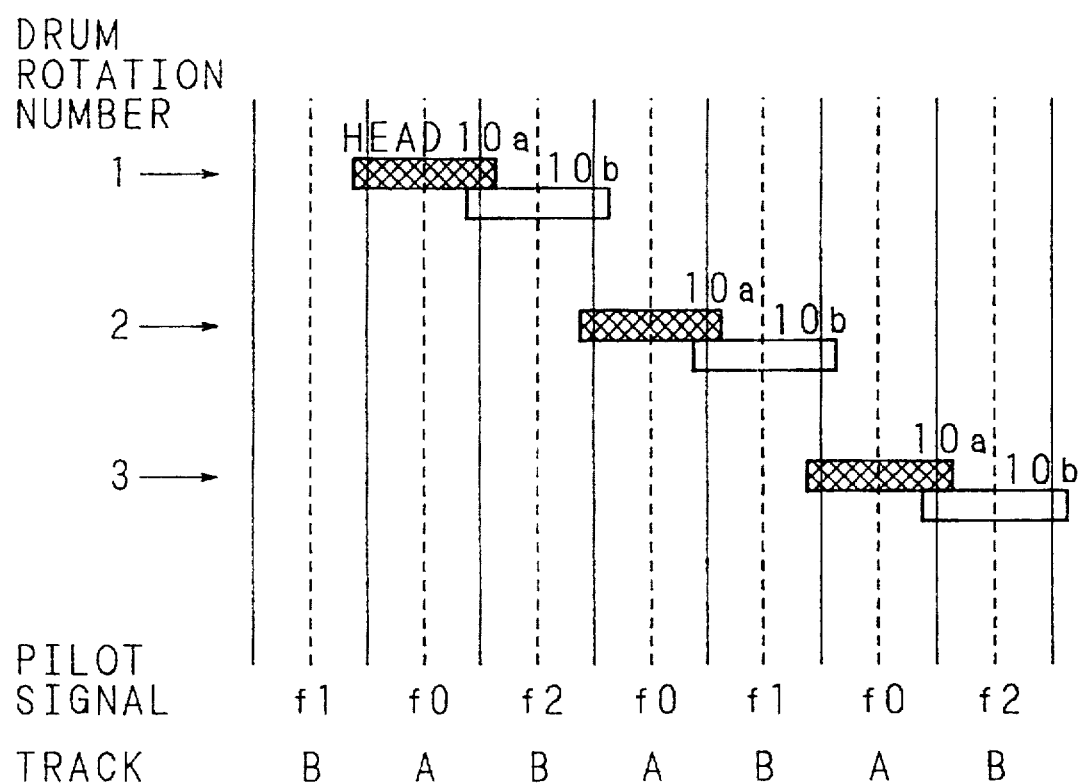
FIG. 19 is a diagram showing traces of heads during the regular playback with a data rate of "1" in the first embodiment.

Next, a tracking operation with the data rate of "1" at the time of regular playback will be described. FIG. 18 shows a timing chart of signals a to e shown in FIG. 17. FIG. 19 simplifies a scanning condition of tracks by the heads 10a and 10b at the rotation number of revolution assigned to a drum rotation signal a during the regular playback. During a revolution expressed by the rotation number 1 shown at the left end of FIG. 19, the heads 10a and 10b shown in FIG. 18 each in the first revolution scan tracks A and B approximately at the same timing. Similarly, revolutions expressed by the rotation numbers 2 and 3 at the left end of FIG. 19 correspond to the second revolution and the third revolution shown in FIG. 18.

Corresponding to the rotation number a denoted as 1, 2, 3, 4, . . . in FIG. 18, during a High level period of the playback timing signal b from the timing signal generating circuit 31, the heads 10a and 10b read playback signals A and B from the tracks A and B of the tape 11 which correspond to the respective azimuths, approximately at the same timing. The playback amplifiers 12a and 12b amplify the playback signals A and B and supply the signals to the playback signal processing circuit 17. Original bit streams are reproduced and outputted from the playback signal processing circuit 17 to the output terminal 18. In addition, the outputs A and B from the playback amplifiers 12a and 12b are supplied to the data rate discriminating circuit 32, and the data rate discriminating circuit 32 judges a data rate of the recording track which is now being reproduced. The judgement signal is outputted to the playback tape speed control circuit 34, whereby the tape speed during the regular playback is controlled in accordance with the detected data rate of the judgement signal.

On the other hand, the outputs A and B from the playback amplifiers 12a and 12b are supplied to the switch 30. A tracking control operation for regular playback of a recording track having the data rate of "1" is the same as that for regular playback in the conventional apparatus. That is, during the first revolution of the drum during the regular playback with the data rate of "1", the switch 30 is switched to the terminal A to select the playback signal A of the track A (f0 track) which is read by the head 10a crosshatched in FIG. 19 and which is outputted from the playback amplifier 12a, in accordance with the pilot detection head signal c which always stays at High level as shown in FIG. 18. The playback signal A outputted from the switch 30 is supplied to the band pass filters 19 and 20, whereby pilot signal components which have the frequencies f1 and f2, i.e., cross talk components from the right and left tracks B adjacent to the reproduced track A (f1 and f2 tracks) are extracted. The pilot signal components f1 and f2 outputted from the band pass filters 19 and 20 are detected by the phase detectors 21 and 22 and supplied to the sample holding circuits 23 and 24.

Using the sampling pulse d inputted through the timing signal generating circuit 31, the sample holding circuits 23 and 24 sample-hold the pilot signal components f1 and f2 detected by the phase detectors 21 and 22 and supply values at sampling points (f1, f2) to the error detection circuit 26. The error detection circuit 26 detects a difference (f1–f2) between the values f1 and f2 from an error detection signal e of High level and outputs the difference to the servo circuit 33.

Figure 7:
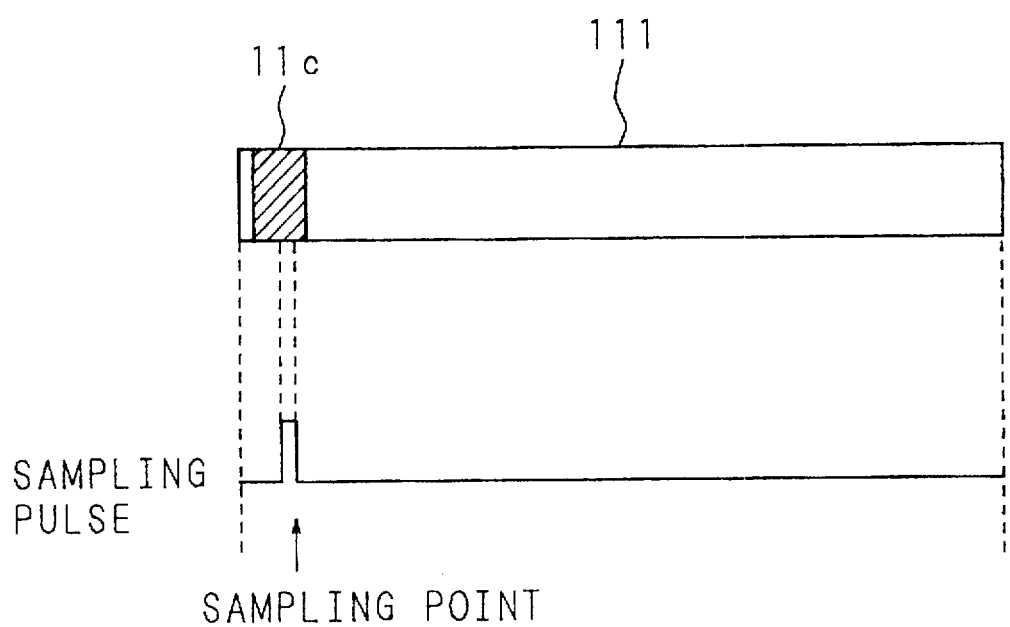
FIG. 7 is a view showing an example of a sampling pulse to obtain a tracking error signal in the conventional bit stream recording and reproducing apparatus.
Figure 8A:
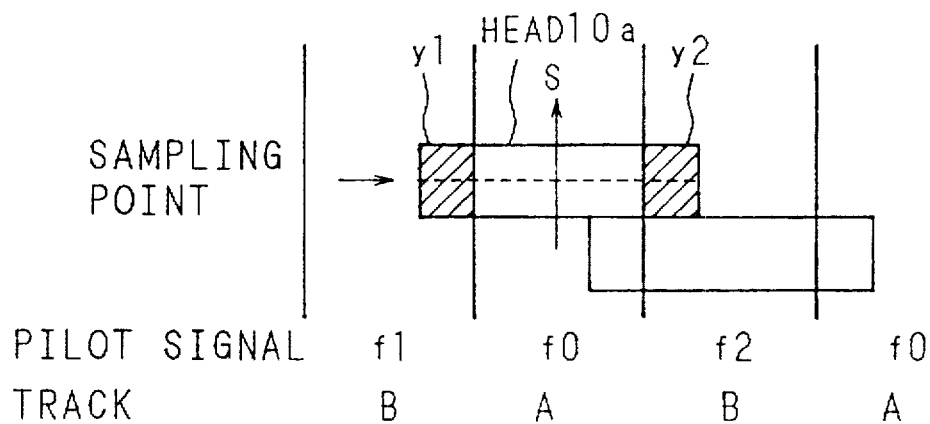
FIG. 8A is a diagram explanatory of a relationship between an error signal and servo control during tracking.
Figure 8B:
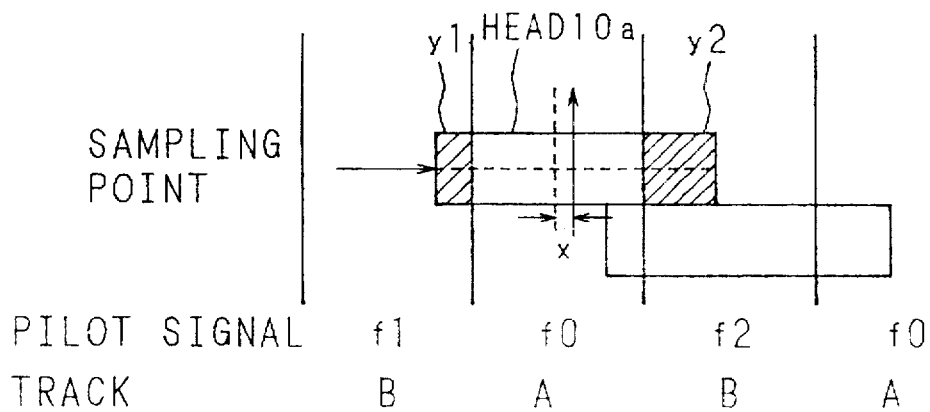
FIG. 8B is a diagram explanatory of a relationship between an error signal and servo control during tracking.
Figure 9:
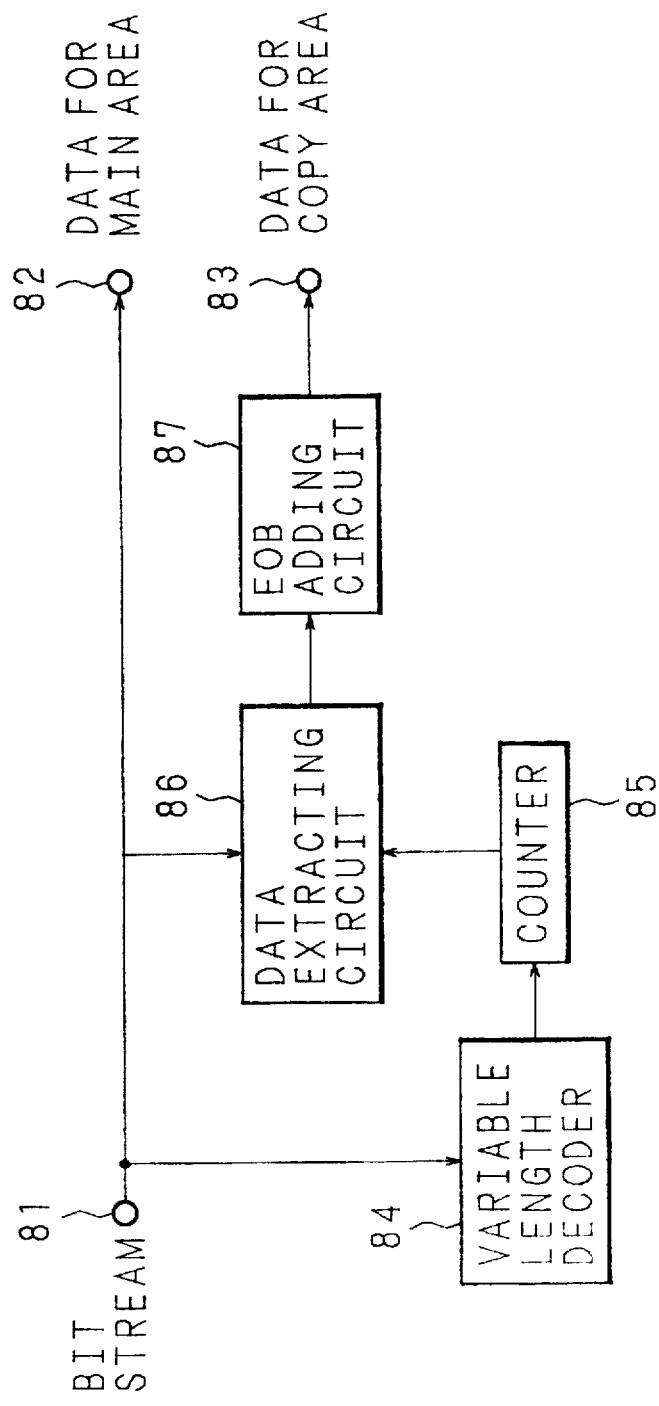
FIG. 9 is a diagram showing a structure of a recording part of the conventional bit stream recording and reproducing apparatus which can playback at high speeds.
Figure 10A:
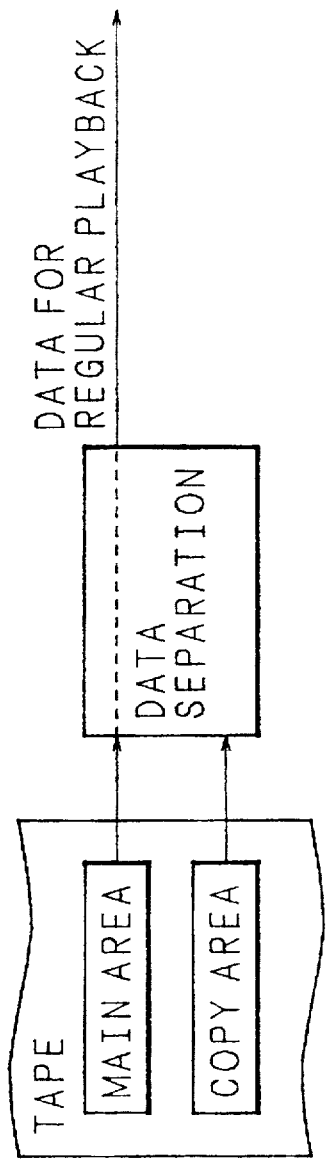
FIG. 10A is a an explanatory diagram of data processing during the regular playback in the conventional bit stream recording and reproducing apparatus.
Figure 10B:
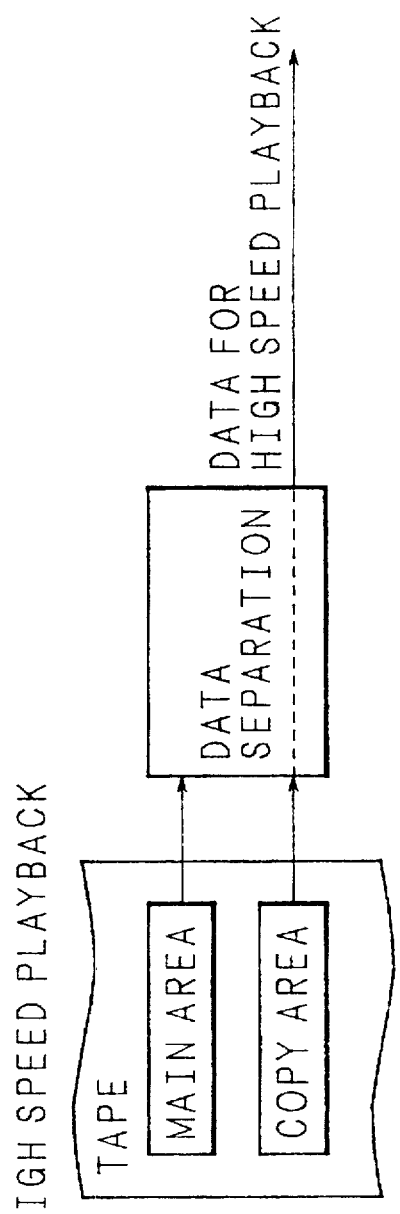
FIG. 10B is an explanatory diagram of data processing during the high speed playback in the conventional bit stream recording and reproducing apparatus.
Figure 11A:
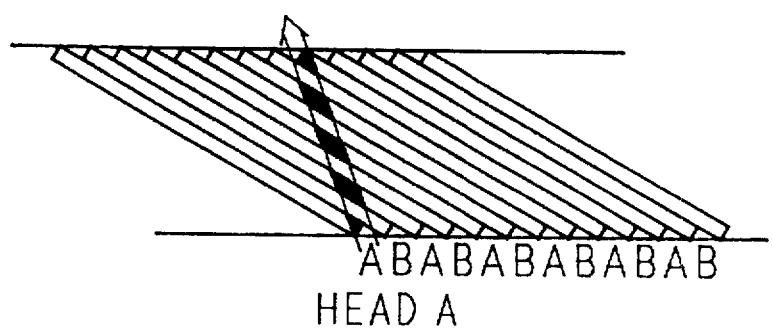
FIGS. 11A and 11B are diagrams showing an example of a trace of a head during the high speed playback at a nonuple speed.
Figure 11B:
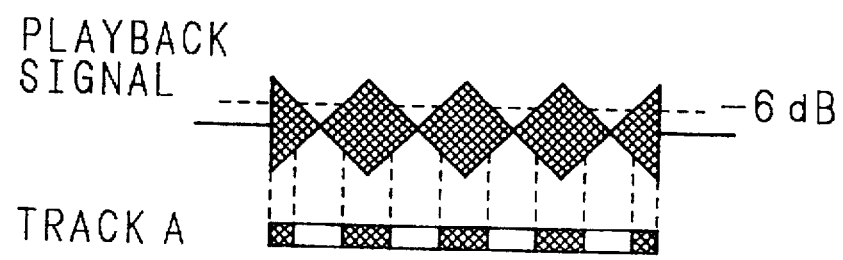
Figure 13:
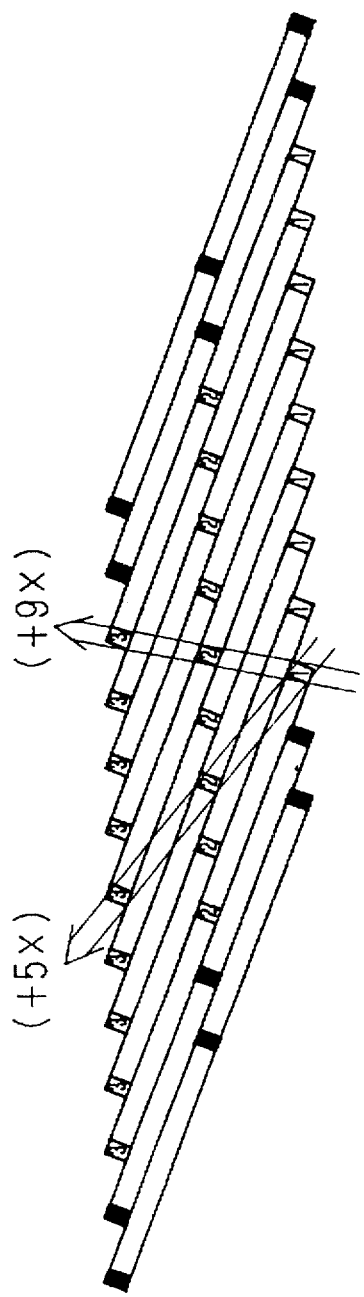
FIG. 13 is a diagram showing an example of traces of a head at different tape speeds.
Figure 14A:
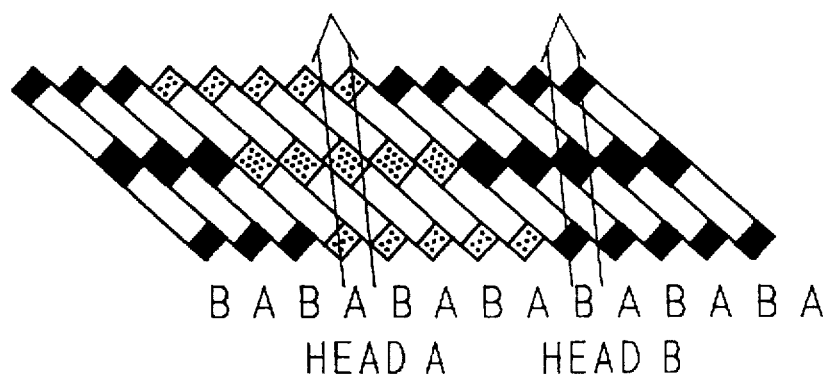
FIGS. 14A and 14B are diagrams showing traces of heads at a quintuple speed.
Figure 14B:
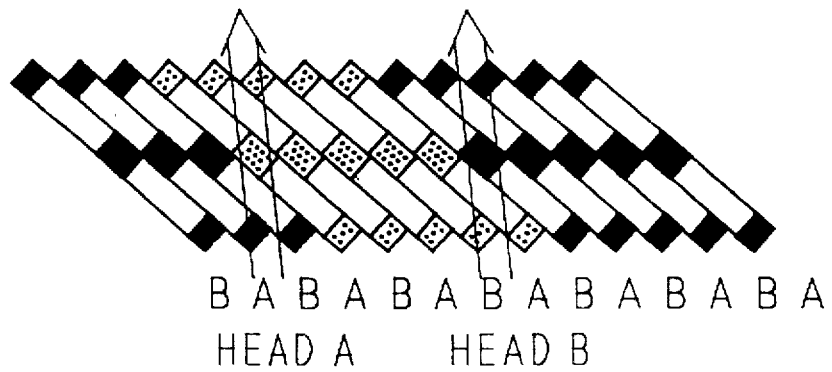
Figure 15:
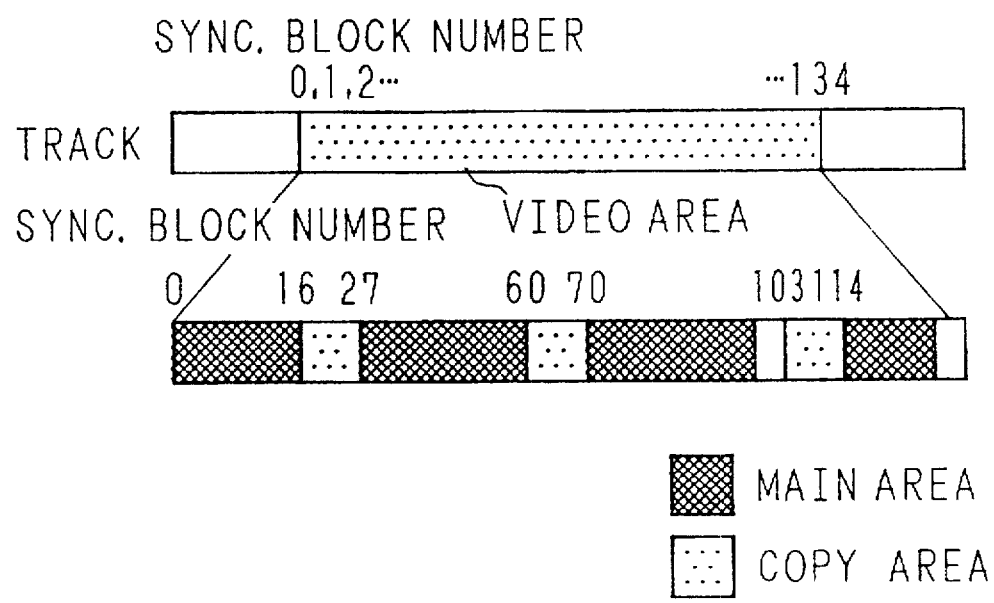
FIG. 15 is a diagram showing an example of a configuration of a main area and a copy area.

In accordance with the error signal (f1–f2) supplied thereto, the servo circuit 33 controls tracking. When the sampling pulse for sample holding has a sampling point in the ITI area 11c which is located at the lower end of a track shown in FIG. 7, as in the conventional apparatus, during the regular playback, the components f1 and f2 of the playback signal A from the head 10a tracing the f0 track A, i.e., cross talk components from adjacent tracks at the sampling point are sampled, so that the difference between the pilot signal components f1 and f2 is detected. Tracking is controlled in such a manner that the difference becomes 0.

Further, during the second revolution of the drum as crosshatched in FIG. 19, the head 10a reproduces the pilot signal components f1 and f2 from the tracks B adjacent to the track A. Hence, while the pilot detection head signal c is kept at High level, an error detection circuit 51 changes the error detection signal e into a Low level signal and detects a difference (f2–f1) between the two components. During the third and following revolutions of the drum, the operations in the first and the second revolutions are repeated. In short, during the regular playback with the data rate of "1", tracking control utilizing sampling is updated every revolution of the drum. The sampling point during the regular playback is not limited to that shown in FIG. 7. Rather, the sampling point may be at any timing within a period in which the heads detect pilot signal components every time the drum rotates.

Figure 20:
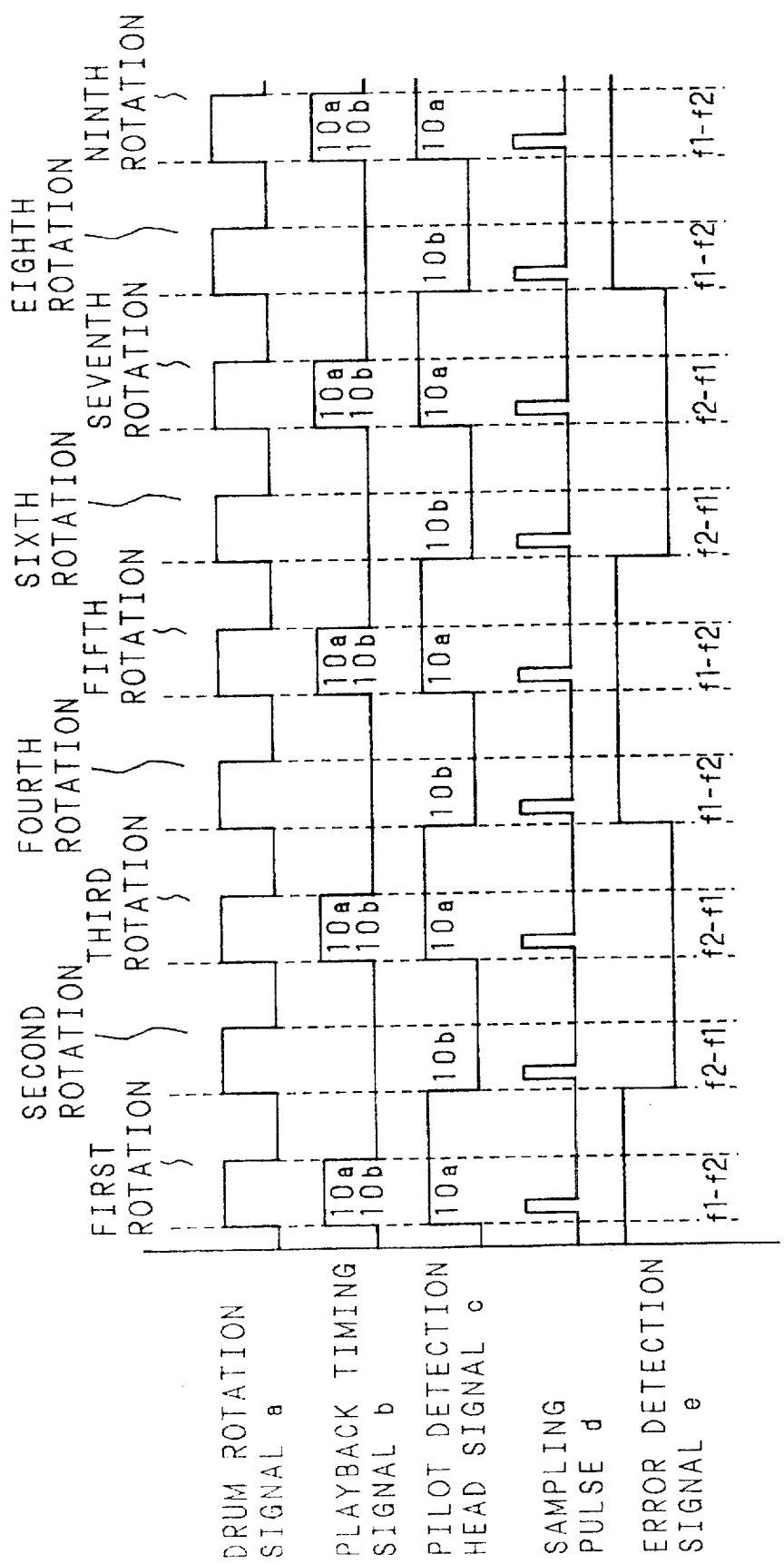
FIG. 20 is a timing chart of signals during the regular playback with a data rate of "½" in the first embodiment.
Figure 21:
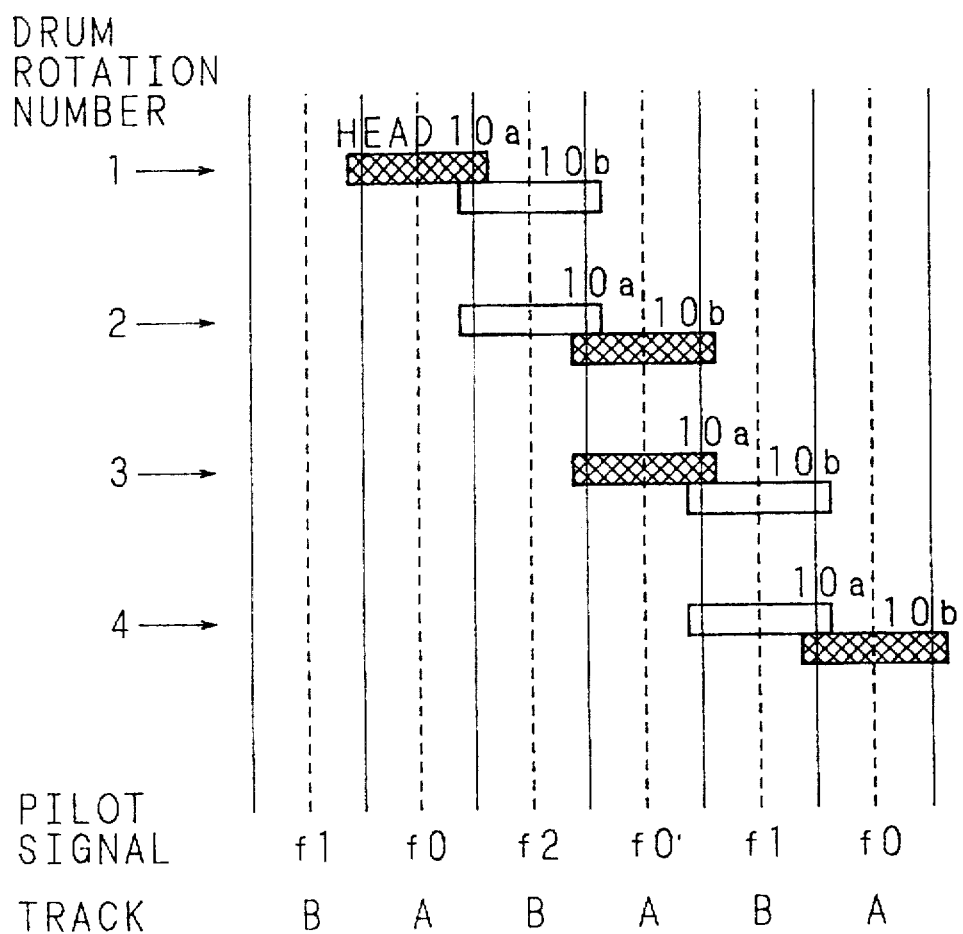
FIG. 21 is a diagram showing traces of heads during the regular playback with a data rate of "½" in the first embodiment.

Next, a tracking control operation will be described during the regular playback of record tracks having the data rate of "½". FIG. 20 is a timing chart showing the signals a to e. FIG. 21 illustrates in a simplified diagram a scanning condition of tracks by the heads 10a and 10b at the rotation number of revolution assigned to the drum rotation signal a during regular playback. During a revolution expressed by the rotation number 1 shown at the left end of FIG. 21, the heads 10a and 10b each in the first revolution scan tracks A and B approximately at the same timing. Similarly, the rotation number 2 shown at the left end of FIG. 21 corresponds to the second revolution shown in FIG. 20. This applies also to the following third and fourth rotation numbers 3 and 4.

During the first revolution of the drum, the playback signals A and B from the heads 10a and 10b during a High level period of the playback timing signal b are sent to the playback signal processing circuit 17, and outputted at the output terminal 18 as playback bit streams. This operation is the same as the above processing during the regular playback with the data rate of "1".

As shown by cross hatching in FIG. 21, during the first revolution of the drum, the head 10a reproduces the pilot signal components f1 and f2 from the tracks B having the azimuth angle B adjacent to the track A having the azimuth angle A (a track with a pilot signal frequency f0) as cross talk components. Hence, during the first revolution of the drum, the pilot detection head signal c is changed to High level and the playback signal A from the head 10a is selectively outputted from the switch 30. The band pass filters 19 and 20 extract the pilot signal components f1 and f2, and the pilot signal components f1 and f2 outputted respectively from the band pass filters 19 and 20 are detected by the phase detectors 21 and 22 and transmitted to the sample holding circuits 23 and 24.

In accordance with the sampling pulse d from the timing signal generating circuit 31, the sample holding circuits 23 and 24 sample-hold the pilot signal components f1 and f2 detected by the phase detectors 21 and 22 and supply values at sampling points (f1, f2) to the error detection circuit 26. The error detection circuit 26 detects a difference (f1–f2) between the values f1 and f2 and hence a tracking error, and supplies the result of the detection to the servo circuit 33. The servo circuit 33 controls tracking based on the result of the error detection.

Meanwhile, during the regular playback with the data rate of "½", in accordance with the judgement signal which expresses that the data rate outputted from the data rate determining circuit 32 is "½", the playback tape speed control circuit 34 controls the tape speed to be ½ of the tape speed v which is used during the regular playback with the data rate of "1". Hence, during the second revolution of the drum, the head 10a scans the track B, while the head 10b scans the track A as shown in FIG. 21. For this reason, with the playback timing signal b changed to Low level, the supply of the playback outputs A and B from the heads 10a and 10b to the playback signal processing circuit 17 is stopped.

However, during the second revolution of the drum, the head 10b scanning the track A reproduces as cross talk components the pilot signal components f2 and f1 from the right and left tracks B adjacent to the track A as shown by cross hatching in FIG. 21. Hence, the pilot detection head signal c is changed to Low level and the switch 30 selectively outputs the playback signal B from the head 10b during the second revolution of the drum. Through the band pass filters 19 and 20 and the phase detectors 21 and 22, the sample holding circuits 23 and 24 perform sample holding on the pilot signal components f1 and f2 in accordance with the sampling pulse d. The values f1 and f2 at the sampling points are supplied to the error detection circuit 26. The error detection circuit 26 detects a difference (f2–f1) in accordance with the error detection signal e of Low level. In FIGS. 20 and 21, the operation in the first and the second revolutions are repeated for the third and following revolutions of the drum.

As described above, during the regular playback with the data rate of "½", tracking control utilizing sampling is updated every revolution of the drum, similar to the case where the data rate is "1".

Figure 22:
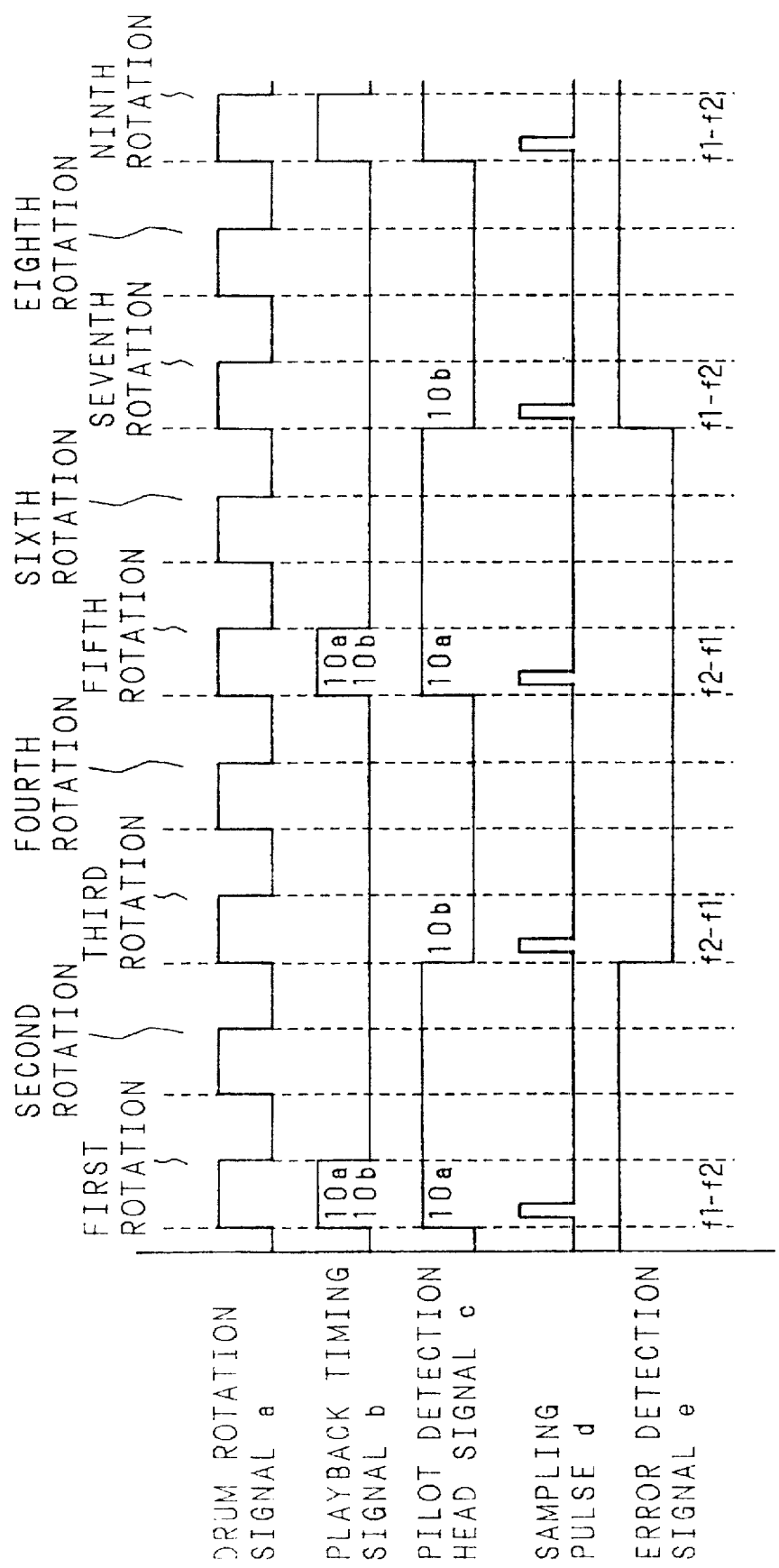
FIG. 22 is a timing chart of signals during the regular playback with a data rate of "¼" in the first embodiment.
Figure 23:
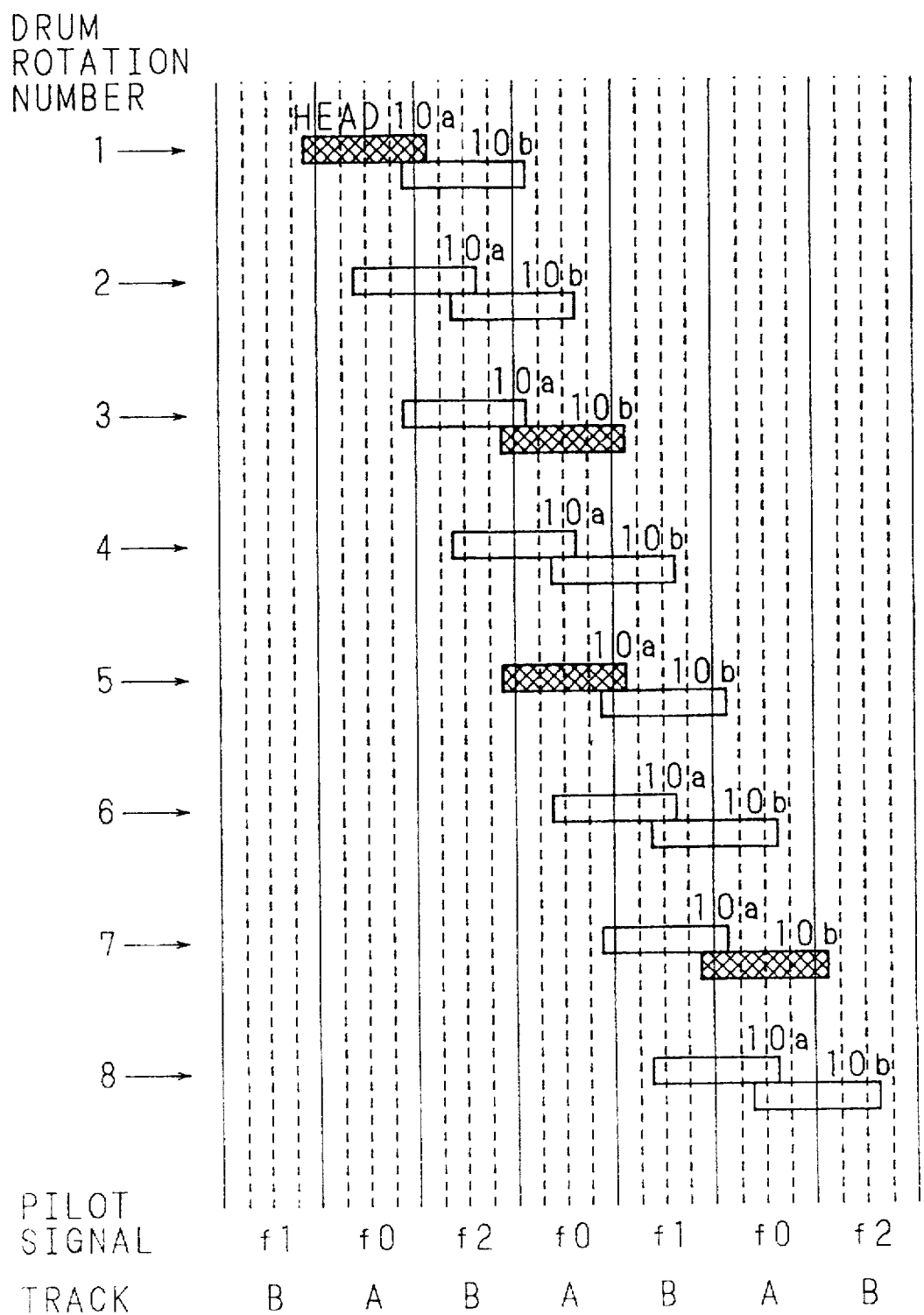
FIG. 23 is a diagram showing traces of heads during the regular playback with a data rate of "¼" in the first embodiment.

Next, a description will be given on a tracking control operation during the regular playback of record tracks having the data rate of "¼". FIG. 22 is a timing chart showing the signals a to e. FIG. 23 is a simplified diagram of a scanning condition of tracks by the heads 10a and 10b at the rotation number of revolution assigned to the drum rotation signal a during the regular playback. In this case, the playback signals A and B from the heads 10a and 10b are transmitted to the playback signal processing circuit 17. It is during one of four revolutions of the drum with the playback timing signal b being at High level (e.g., the first and the fifth revolutions) when the playback signals A and B are outputted at the output terminal 18 as playback bit streams. This operation is the same as the above reproducing processing during the regular playback with the data rate of "½".

Meanwhile, during the regular playback with the data rate of "¼", in accordance with the judgement signal which expresses that the data rate outputted from the data rate determining circuit 32 is "¼", the playback tape speed control circuit 34 controls the tape speed so that the tape is fed at ¼ of the tape speed v used during the regular playback with the data rate of "1". Hence, during the first revolution of the drum, the head 10a reproduces the pilot signal components f1 and f2 from the tracks B adjacent right and left to the track A (a track with a pilot signal frequency f0) as cross talk components as shown by cross hatching in FIG. 23. Consequently, during the first revolution of the drum, both the pilot detection head signal c and the error detection signal e are at High level.

Since the heads 10a and 10b can reproduce only the pilot signal component f2 from the track B during the second revolution of the drum, the error detection circuit 26 cannot detect an error signal with respect to the pilot signal component f1. Hence, during a period of the second revolution of the drum, the difference (f1–f2) detected by the error detection circuit 26 on the basis of the values f1 and f2 which are supplied from the head 10a during the first revolution of the drum is supplied continuously to the servo circuit 33, whereas the pilot detection head signal c is kept at High level, the generation of the sampling pulse d is stopped and the error detection signal e is maintained at High level.

As shown by cross hatching in FIG. 23, the head 10b reproduces the pilot signal components f2 and f1 from the tracks B adjacent to the track A as cross talk components during the third revolution of the drum. During the fourth revolution of the drum, the error detection circuit 26 cannot detect an error signal since the head 10a can reproduce only the pilot signal component f2 while the head 10b can reproduce only the pilot signal component f1. Hence, during a period of the third and the fourth revolutions of the drum, the pilot detection head signal c is changed to Low level, the sample holding circuits 23 and 24 perform sample holding on the pilot signal components f2 and f1 with utilizing the sampling pulse d at which are reproduced by the head 10b during the third revolution of the drum, and values at the sampling points are supplied to the error detection circuit 26. In accordance with the error detection signal e at Low level, the error detection circuit 26 detects a difference (f2–f1) between the values f2 and f1 and outputs the difference to the servo circuit 33.

In FIGS. 22 and 23, basically, the operation in the first to the fourth revolutions are repeated during the fifth to the eighth revolutions of the drum. However, the error detection circuit 26 detects a difference (f2–f1) during a period of the fifth and the sixth revolutions, but detects a difference (f1–f2) during a period of the seventh and the eighth revolutions.

As described above, during the regular playback with the data rate of "¼", tracking control utilizing sampling is updated once in every two revolutions of the drum. Thus, sampling is twice more frequent in comparison with sampling once in four revolutions of the drum during the regular playback with the data rate of "¼" according to the conventional technique.

Although tracking control during the regular playback with the data rates of "½" and "¼" is depicted in the first embodiment, the first embodiment is also applicable to tracking control during the regular playback with the data rate of "½n" (n is an integer larger than 0). In such a case, tracking control utilizing sampling is updated once in every 2n revolutions of the drum.

Embodiment 2

Figure 24:
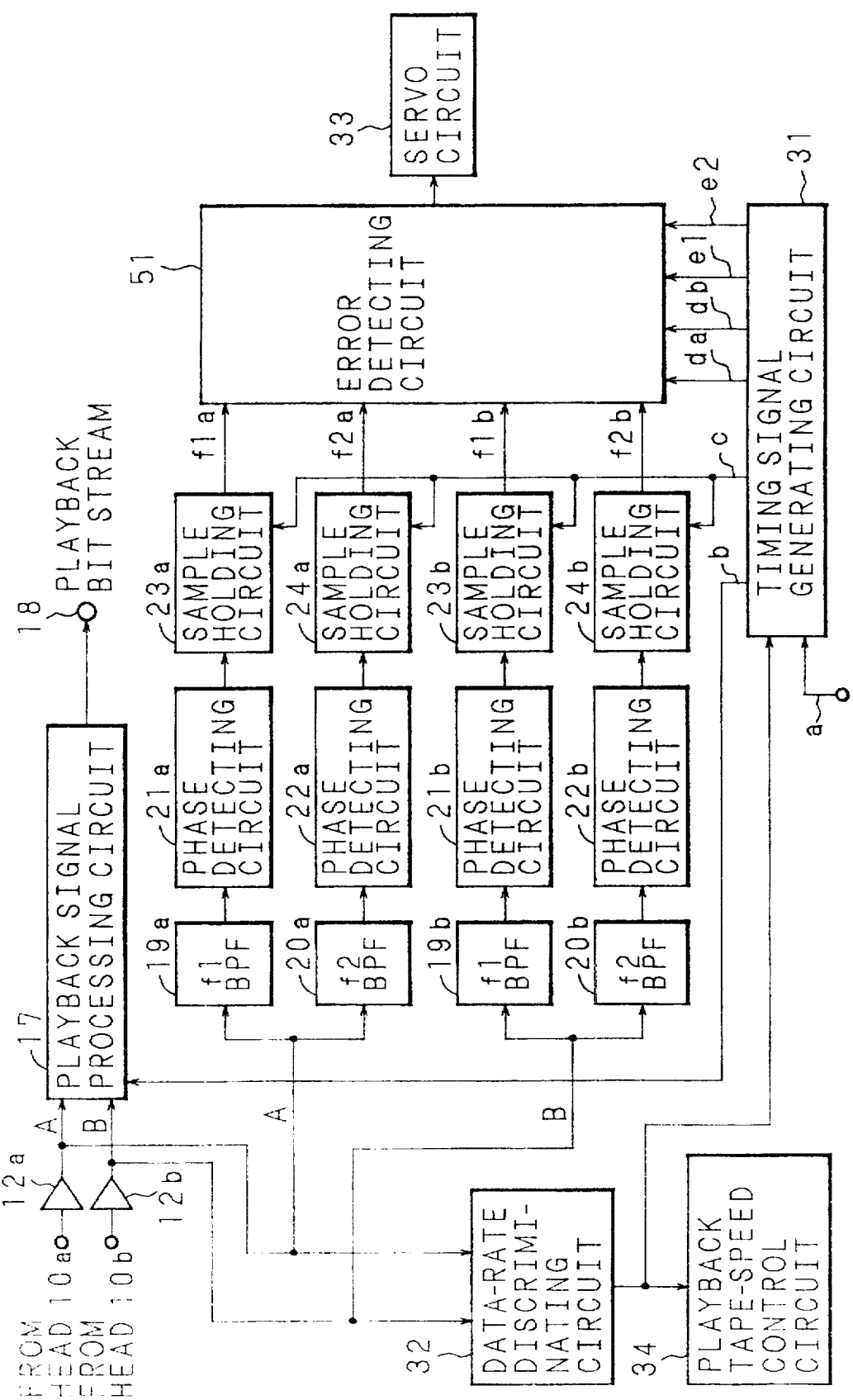
FIG. 24 is a block circuitry diagram showing a structure of a playback part of a magnetic type recording and reproducing apparatus according to a second embodiment of the present invention.

FIG. 24 is a block diagram showing a structure of a playback part of a bit stream recording and reproducing apparatus according to a second embodiment, which reproduces record tracks normally with the data rates of "1", "½" and "¼". The second embodiment eliminates the switch 30 of FIG. 17. Instead, the second embodiment uses band pass filters, phase detection circuits and sample holding circuits for processing the pilot signal components f1 and f2 for each one of the heads 10a and 10b. The timing signal generating circuit 31 outputs the drum rotation signal a and the playback timing signal b as in the first embodiment. The timing signal generating circuit 31 further outputs the sampling pulse c for the sample holding circuits 23, pilot detection head signals da and db for the error detection circuit 51, a first error detection signal e1 and a second error detection signal e2.

The error detection circuit 51 receives a pilot signal component f1a which is generated by holding a playback signal from the head 10a at a sample holding circuit 23a, a pilot signal component f2a from a sample holding circuit 24a, a pilot signal component f1b which is generated by holding a playback signal from the head 10b at a sample holding circuit 23b, a pilot signal component f2b from a sample holding circuit 24b, the pilot detection head signal da regarding the head 10a and supplied from the timing signal generating circuit 31, the pilot detection head signal db regarding the head 10b and supplied from the timing signal generating circuit 31, the first error detection signal e1 and the second error detection signal e2. The structure (10, 12, 17–24, 32–34) is otherwise similar to that shown in FIG. 17, and therefore, will not be described.

Figure 25:
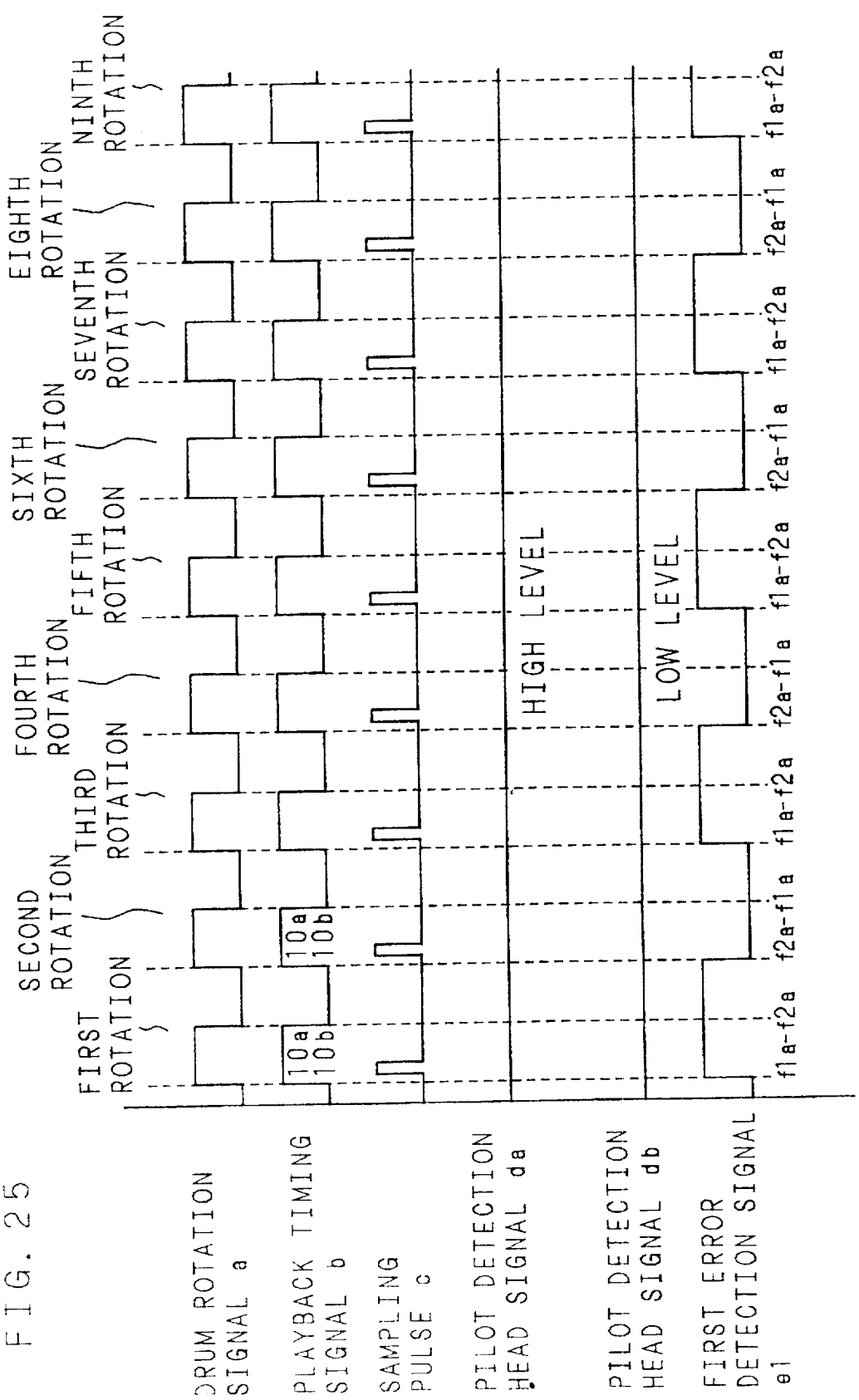
FIG. 25 is a timing chart of signals during the regular playback with a data rate of "1" in the second embodiment.

First, a tracking control operation during the regular playback with the data rate of "1" will be described with reference to FIG. 25. A head trace in this case is exactly the same as that during the regular playback shown in FIG. 19 described in relation to the first embodiment. Hence, the playback signals A and B from the heads 10a and 10b during a High level period of the playback timing signal b are supplied to the playback signal processing circuit 17 and outputted at the output terminal 18 as playback bit streams. This operation is the same as the processing during the regular playback in the first embodiment. A tracking control operation at this stage is as follows.

During the first revolution of the drum, as crosshatched in FIG. 19, the head 10a reproduces the pilot signal components f1 and f2 from the right and left tracks B adjacent to the track A. Sample holding of the components f1a and f2a detected by phase detection circuits 21a and 22a is performed at the timing of the sampling pulse c. In a period wherein the pilot detection head signal da regarding the head 10a is at High level and the first error detection signal e1 at High level, the error detection circuit 51 detects a difference (f1a–f2a) between the two components and the result of the detection is outputted to the servo circuit 33.

The pilot detection head signal db regarding the head 10b is kept always at Low level. The error detection circuit 51 does not detect an error regarding the components f1b and f2b from the head 10b. FIG. 25 does not show the second error detection signal e2 since this signal is invalid when either one of the two pilot detection head signals da and db is at High (or Low) level.

As shown by cross hatching in FIG. 21, the head 10a reproduces the pilot signal components f2 and f1 from the tracks B adjacent to the track A during the second revolution of the drum. Hence, while the pilot detection head signal da is kept at High level at the error detection circuit 51, the error detection signal e1 is changed into Low level signal, so that the error detection circuit 51 detects a difference (f2a–f1a) between the two components.

The operation in the first and the second revolutions are repeated during the third and following revolutions of the drum. That is, during the regular playback with the data rate of "1", sampling for tracking control is realized for every revolution of the drum. The second error detection signal e2 is invalid when either one of the two pilot detection head signals da and db is at High (or Low) level.

Next, a description will be given on a tracking control operation during the regular playback of record tracks having the data rate of "½" with reference to FIG. 26. A head trace in this case is exactly the same as that during the regular playback shown in FIG. 21 described in relation to the first embodiment. Since the first revolution of the drum is the same as the first revolution of the drum during the regular playback with the data rate of "1" of the second embodiment, the description will not be given here.

As shown by cross hatching in FIG. 21, the head 10b scanning the track A reproduces the pilot signal components f2 and f1 from the tracks B adjacent to the track A as cross talk components during the second revolution of the drum. Hence, during the second revolution of the drum, the pilot detection head signal da regarding the head 10a is kept at Low level. The pilot detection head signal db regarding the head 10b is set at High level while the first error detection signal e1 is set at Low level. The error detection circuit 51 detects a difference (f2b–f1b) between the components f2b and f1b which are detected by phase detection circuits 21b and 22b, and the result of the detection is outputted to the servo circuit 33. FIG. 26 does not show the second error detection signal e2 since this signal is invalid when either one of the two pilot detection head signals da and db is at High (or Low) level.

As shown by cross hatching in FIG. 21, the head 10a reproduces the pilot signal components f2a and f1a from the tracks B adjacent to the track A as cross talk components during the third revolution of the drum. Hence, the error detection circuit 51 detects a difference (f2a–f1a). Further, since the head 10b can reproduce the pilot signal components f1 and f2 from the tracks B adjacent to the track A as cross talk components during the fourth revolution of the drum, the error detection circuit 51 detects a difference (f1b–f2b). The tracking operations in the first to the fourth revolutions described above are repeated during the fifth and subsequent revolutions. As described above, during the regular playback with the data rate of "½", the heads 10a and 10b alternately perform sampling for tracking control every time the drum rotates once.

Figure 27:
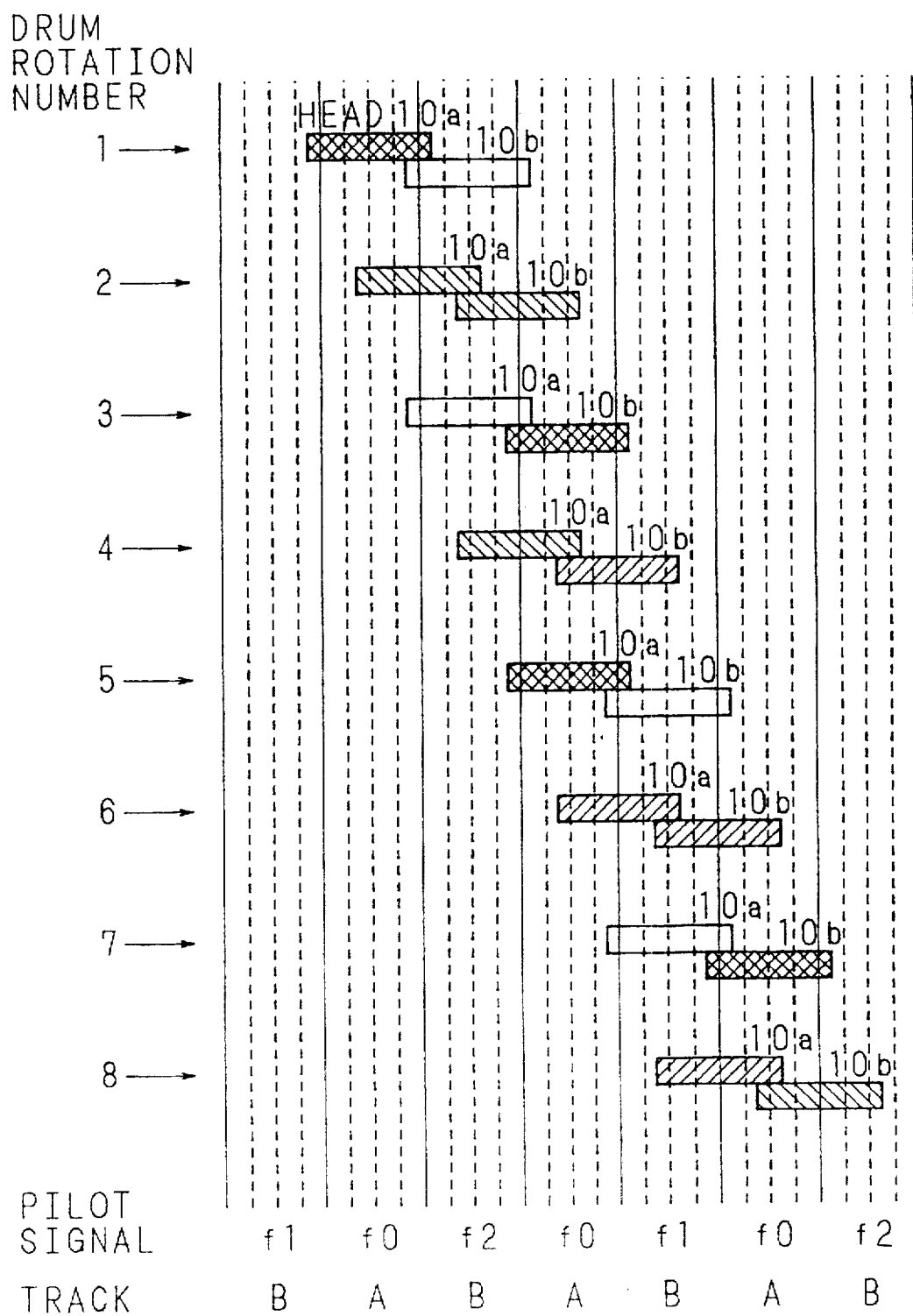
FIG. 27 is a diagram showing traces of heads during the regular playback with a data rate of "¼" in the second embodiment.
Figure 28:
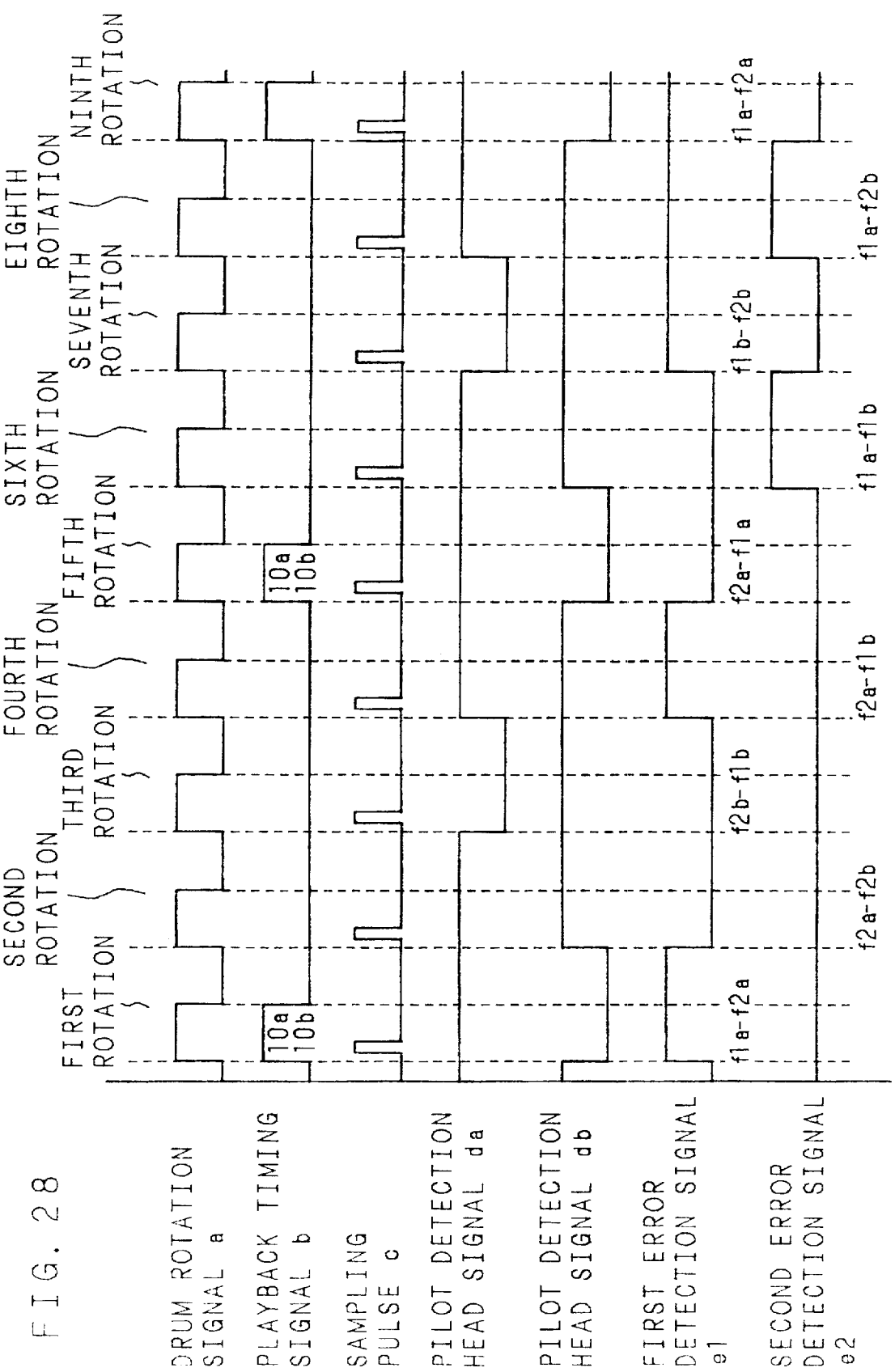
FIG. 28 is a timing chart of signals during the regular playback with a data rate of "¼" in the second embodiment.

Next, a description provides for a tracking control operation during the regular playback of record tracks having the data rate of "¼"with reference to FIGS. 27 and 28. A head trace in this case is exactly the same as that during the regular playback shown in FIG. 23 described in relation to the first embodiment. FIG. 27 shows the head trace again. An operation during the first revolution of the drum is the same as the operation during the first revolution of the drum during the regular playback with the data rate of "½"of the second embodiment, and therefore, will not be described. The second error detection signal e2 during a period of the first revolution of the drum is invalid.

During the second revolution of the drum, the head 10a scanning astride from the track A to the track B reproduces the pilot signal component f2 from the track B as shown with cross hatching in FIG. 27. Meanwhile, the head 10b scanning astride from the track B to the track A reproduces the pilot signal component f2 from the track B.

Hence, the pilot detection head signals da and db regarding the heads 10a and 10b are set at High level during the second revolution of the drum. The first error detection signal e1 is set at Low level while the second error detection signal e2 is also set at Low level. This allows the error detection circuit 51 to detect a difference (f2a–f2b) between the pilot signal component f2a detected by the phase detection circuit 22a and the pilot signal component f2b detected by the phase detection circuit 22b. The error detection circuit 51 then outputs the result of the detection to the servo circuit 33.

As shown by cross hatching in FIG. 27, the head 10b reproduces the pilot signal components f2 and f1 from the tracks B adjacent to the track A during the third revolution of the drum. Hence, during the third revolution of the drum, the pilot detection head signal da regarding the head 10a is at Low level and the pilot detection head signal db regarding the head 10b is kept at High level. Further, the first error detection signal e1 is set at Low level while the second error detection signal e2 is invalidated. As a result, the error detection circuit 51 detects a difference (f2b–f1b) between the pilot signal components.

During the fourth revolution of the drum, the head 10a scanning astride from the track B to the track A reproduces the pilot signal component f2 from the track B as shown with cross hatching in FIG. 27. Meanwhile, the head 10b scanning astride from the track A to the track B reproduces the pilot signal component f1 from the track B. Hence, the pilot detection head signals da and db regarding the heads 10a and 10b are set at High level during the fourth revolution of the drum. The first error detection signal e1 is set at High level while the second error detection signal e2 is set at Low level, allowing the error detection circuit 51 to detect a difference (f2a–f1b) between the pilot signal components. The result of this is outputted to the servo circuit 33.

Since the head 10a reproduces the pilot signal components f2 and f1 from the tracks B adjacent to the track A during the fifth revolution of the drum, the error detection circuit 51 detects a difference (f2a–f1a) between the pilot signal components. During a period of the fifth revolution of the drum, the first error detection signal e1 is set at Low level while the second error detection signal e2 is invalidated.

During the sixth revolution of the drum, both of the heads 10a and 10b reproduce the pilot signal component f1 from the tracks B. Hence, the pilot detection head signals da and db regarding the heads 10a and 10b are set at High level during the sixth revolution of the drum. Further, the first error detection signal e1 is set at Low level while the second error detection signal e2 is set at High level, allowing the error detection circuit 51 to detect a difference (f1a–f1b) between the pilot signal components.

Since the head 10b reproduces the pilot signal components f1 and f2 from the tracks B adjacent to the track A during the seventh revolution of the drum, the error detection circuit 51 detects a difference (f1b–f2b) between the pilot signal components. The first error detection signal e1 is set at High level while the second error detection signal e2 is invalidated during the seventh revolution of the drum.

During the eighth revolution of the drum, the head 10a scanning astride from the track B to the track A reproduces the pilot signal component f1 from the track B as shown with cross hatching in FIG. 27. Meanwhile, the head 10b scanning astride from the track A to the track B reproduces the pilot signal component f2 from the track B. Hence, the pilot detection head signals da and db regarding the heads 10a and 10b are set at High level during the eighth revolution of the drum. The first error detection signal e1 is set at High level and the second error detection signal e2 is also set at High level, allowing the error detection circuit 51 to detect a difference (f1a–f2b) between the pilot signal components.

The tracking operations in the first to the eighth revolutions described above are repeated during the ninth and subsequent revolutions. As described above, during the regular playback with the data rate of "¼" as well, it is possible to update tracking control utilizing sampling for every revolution of the drum.

Although described in relation to tracking control during the regular playback with the data rate of "¼", the second embodiment is also applicable to tracking control during the regular playback with the data rate of "¼n" (n is an integer larger than 0). In such a case, tracking control utilizing sampling is updated once in every 4n revolutions of the drum.

Embodiment 3

Figure 29:
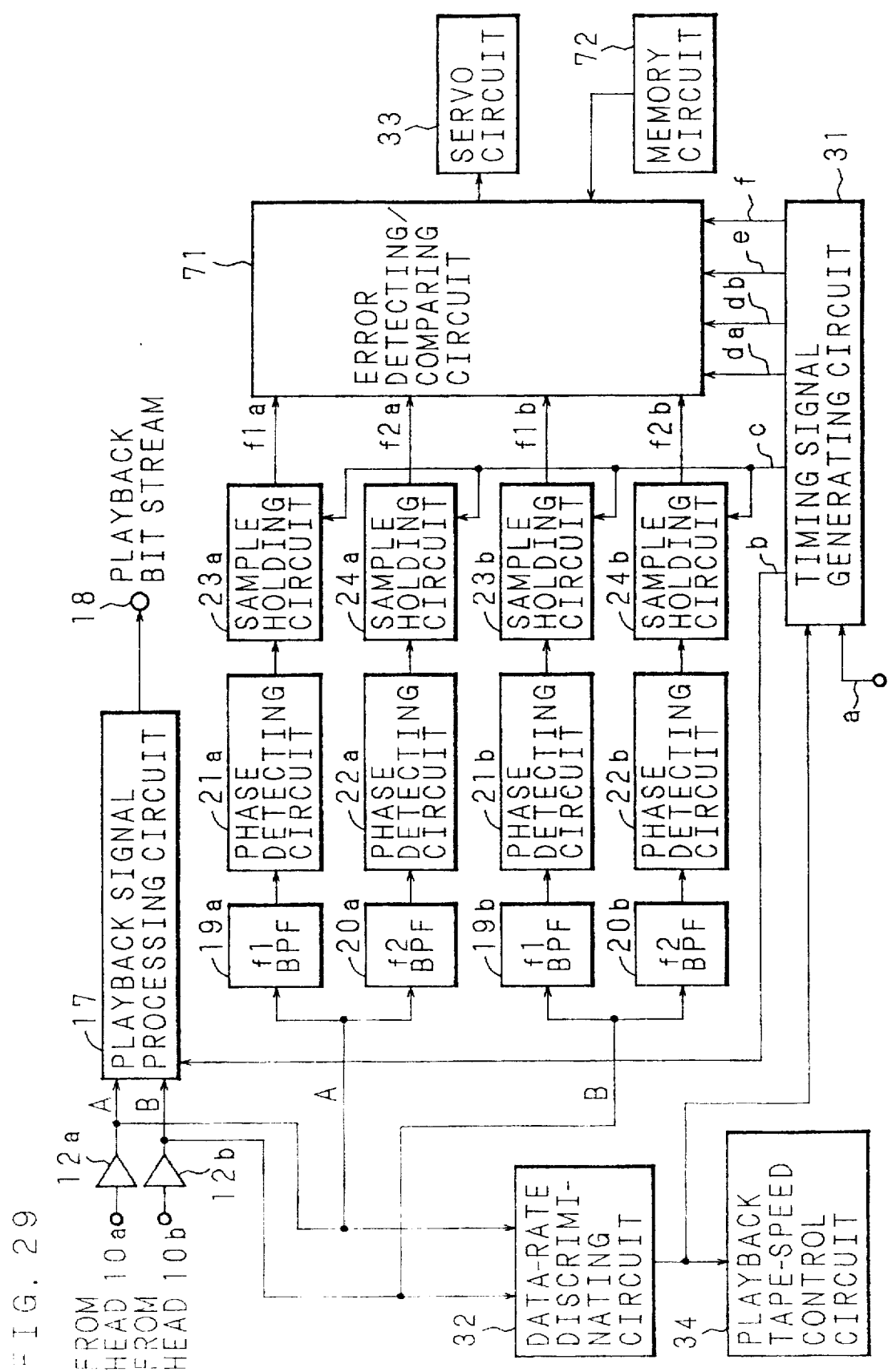
FIG. 29 is a block circuitry diagram showing a structure of a playback part of a magnetic type recording and reproducing apparatus according to a third embodiment of the present invention.

FIG. 29 is a block circuitry diagram showing a structure of a playback part of a bit stream recording and reproducing apparatus according to a third embodiment which reproduces record tracks normally with the data rates of "1", "½", "⅓" and "¼". An error detection/comparison circuit 71 of the third embodiment receives the pilot signal component f1a which is generated by holding a playback signal from the head 10a at the sample holding circuit 23a, the pilot signal component f2a which is generated by holding a playback signal from the head 10a at the sample holding circuit 24a, the pilot signal component f1b which is generated by holding a playback signal from the head 10b at the sample holding circuit 23b and the pilot signal component f2b which is generated by holding a playback signal from the head 10b at the sample holding circuit 24b.

Receiving the drum rotation signal a, the timing signal generating circuit 31 outputs the playback timing signal b, the sampling pulse c for the sample holding circuits 23, the pilot detection head signal da regarding the head 10a which is to be inputted to the error detection/comparison circuit 71, the pilot detection head signal db regarding the head 10b which is to be inputted to the error detection/comparison circuit 71, the error detection signal e and a comparison control signal f. The structure (10, 12, 17–24, 32–34) is otherwise similar to that of the second embodiment (FIG. 24), and therefore, will not be described.

Figure 30:
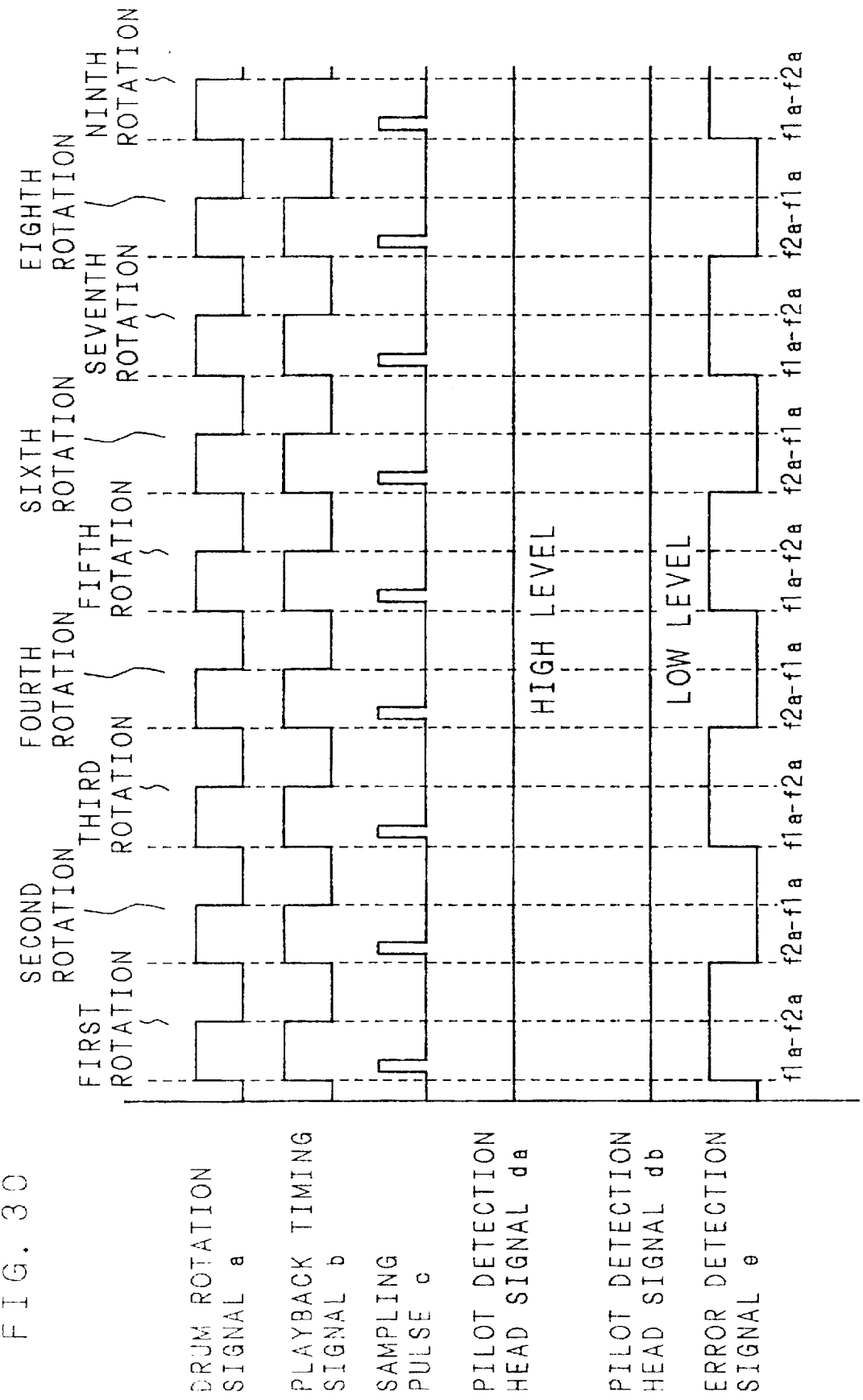
FIG. 30 is a timing chart of signals during the regular playback with a data rate of "1" in the third embodiment.

First, a tracking control operation during the regular playback with the data rate of "1" will be described with reference to a timing chart in FIG. 30. The signals a, b, c, da and db, being the same as those used in the second embodiment, will not be described. Instead, only the error detection signal e and the comparison control signal f will be described in detail. During each revolution of the drum, the pilot detection head signal da is set always at High level while the pilot detection head signal db is set always at Low level. During a High level period of the error detection signal e in the first, the third, the fifth and the seventh revolutions of the drum, the error detection/comparison circuit 71 detects a difference (f1a–f2a) between the two pilot signal components.

During a Low level period of the error detection signal e in the second, the fourth, the sixth and the eighth revolutions of the drum, the error detection/comparison circuit 71 detects a difference (f2a–f1a) between the two pilot signal components. FIG. 30 does not show the comparison control signal f since this signal is invalid when either one of the two pilot detection head signals da and db is at High (or Low) level.

Figure 31:
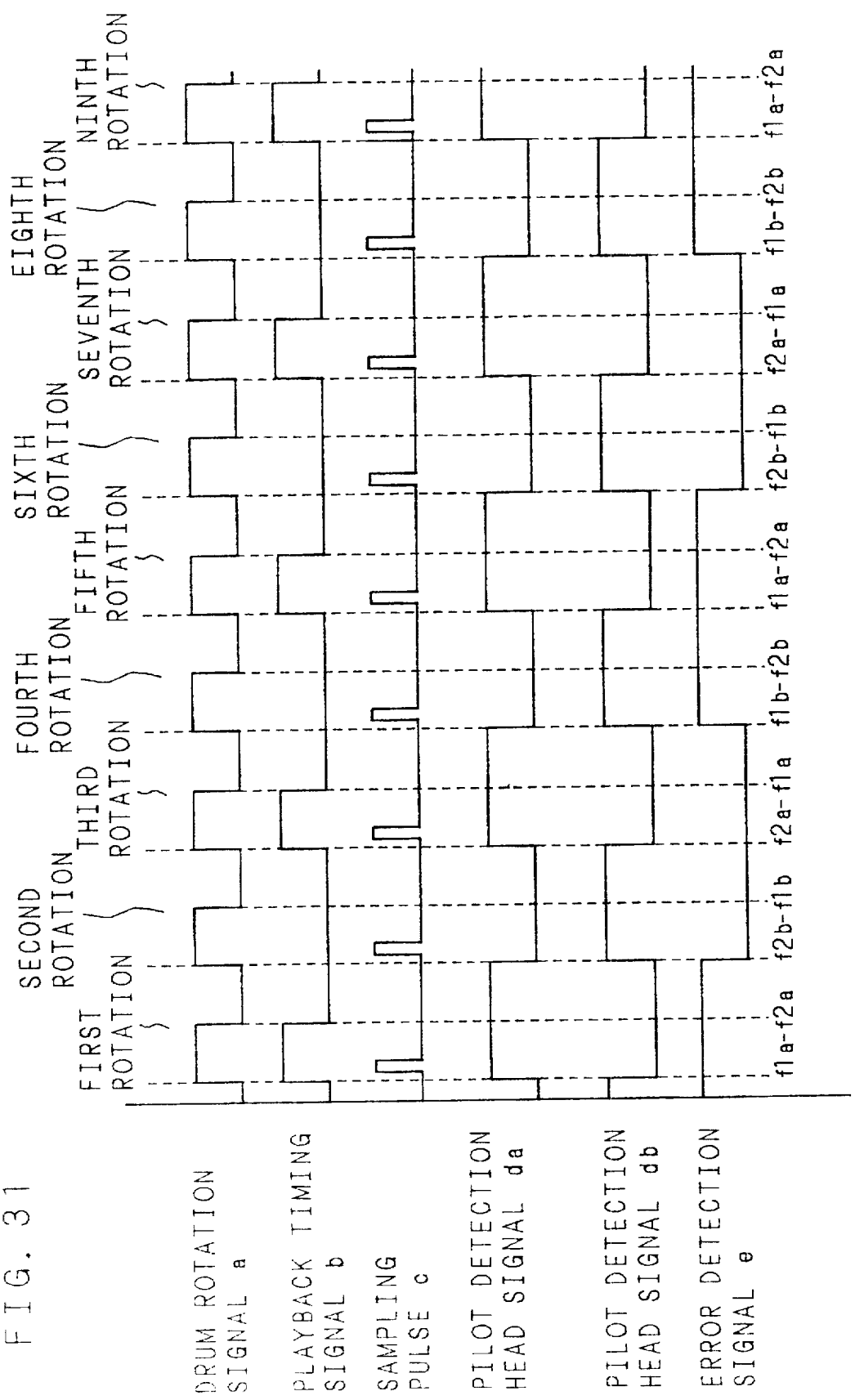
FIG. 31 is a timing chart of signals during the regular playback with a data rate of "½" in the third embodiment.

Next, an explanation will be given on a tracking control operation during the regular playback of record tracks having the data rate of "½" with reference to the timing chart in FIG. 31. The signals a, b, c, da and db, being the same as those used in the second embodiment, will not be described. Instead, only the error detection signal e and the comparison control signal f will be described in detail. During the first revolution of the drum, the pilot detection head signal da is set at High level, the pilot detection head signal db is set at Low level, the error detection signal e is set at High level and the comparison control signal f is invalidated. This allows the error detection/comparison circuit 71 to detect a difference (f1a–f2a) between the two pilot signal components.

Figure 26:
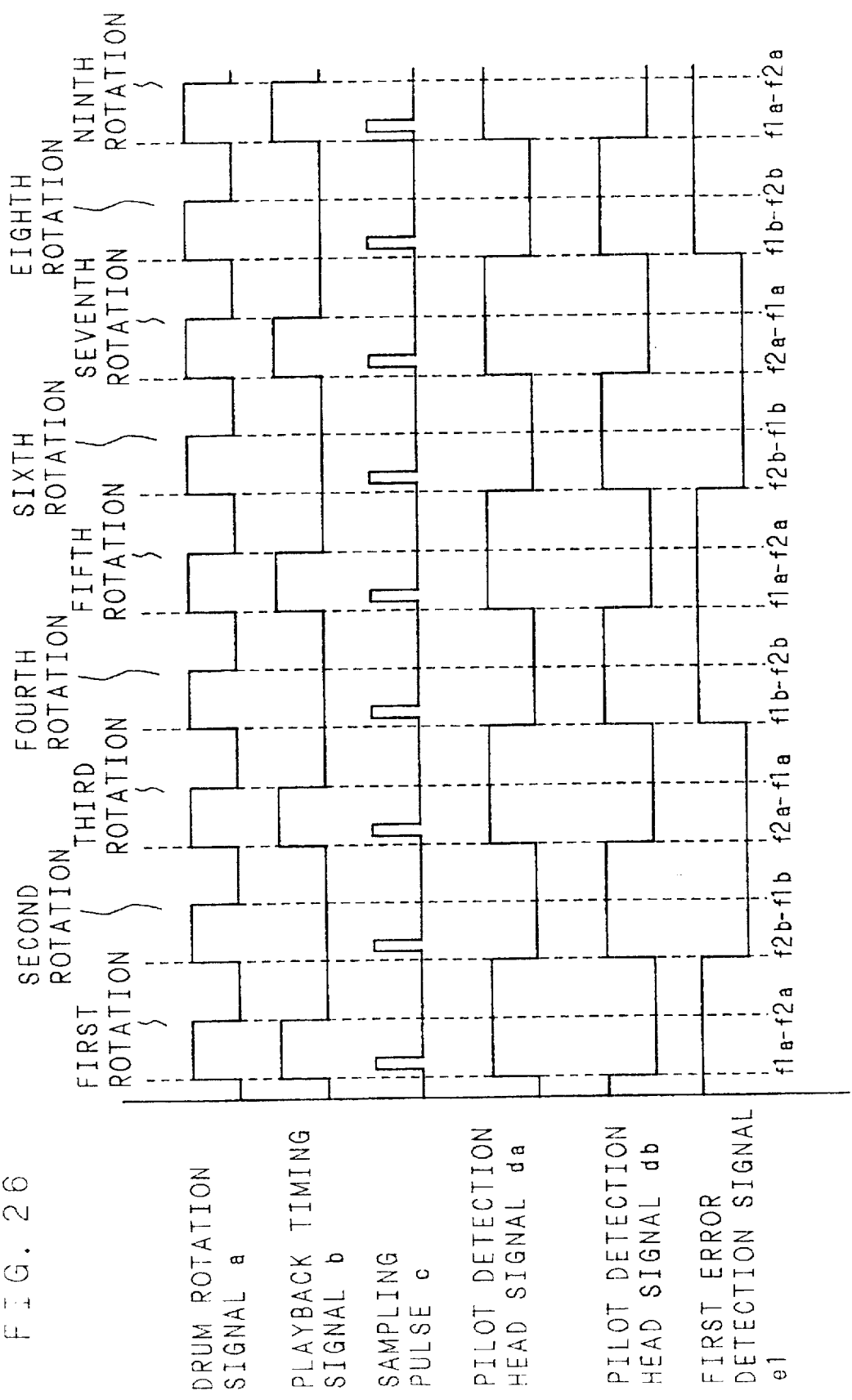
FIG. 26 is a timing chart of signals during the regular playback with a data rate of "½" in the second embodiment.

Being the same as in FIG. 26, the error detection signal e during the second and subsequent revolutions of the drum will not be described. FIG. 31 does not show the comparison control signal f since this signal is invalid when either one of the two pilot detection head signals da and db is at High (or Low) level.

Figure 32:
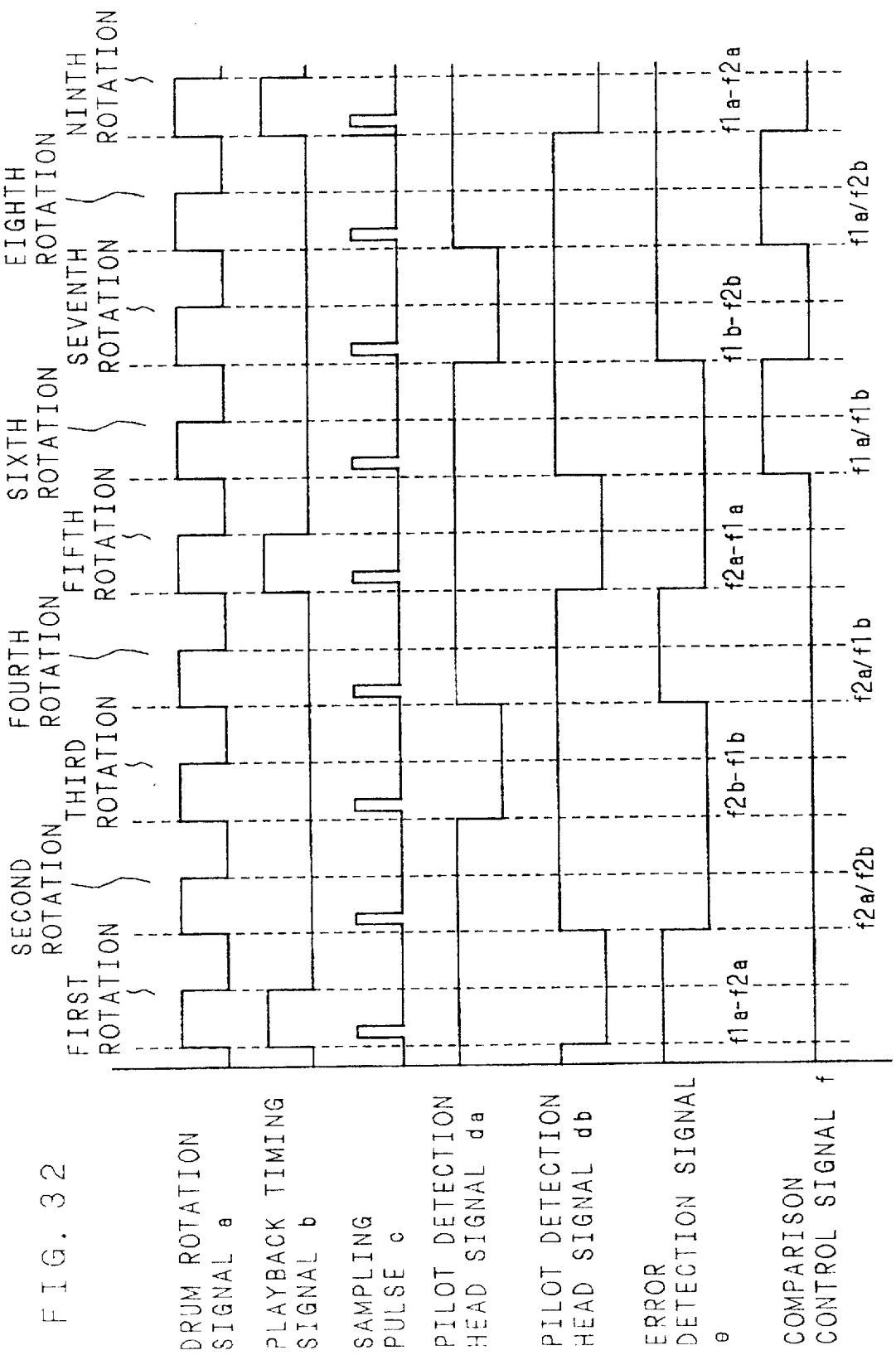
FIG. 32 is a timing chart of signals during the regular playback with a data rate of "¼" in the third embodiment.

Next, an explanation will be directed to a tracking control operation during the regular playback of record tracks having the data rate of "¼" with reference to a timing chart in FIG. 32. The signals a, b, c, da and db, being the same as those used in the second embodiment, will not be described. Instead, only the error detection signal e and the comparison control signal f will be described in detail. During the first revolution of the drum, the pilot detection head signal da is set at High level, the pilot detection head signal db is set at Low level, the error detection signal e is set at High level and the comparison control signal f is invalidated. This allows the error detection/comparison circuit 71 to detect a difference (f1a–f2a) between the two pilot signal components.

During the second revolution of the drum, both pilot detection head signals da and db are set at High level and the comparison control signal f is set at Low level with the error detection signal e at Low level. This allows the error detection/comparison circuit 71 to calculate a ratio (f2a/f2b) of the pilot signal components. If the heads 10a and 10b track normally, the ratio (f2a/f2b) is 1. If the heads 10a and 10b shift in tracking, the ratio (f2a/f2b) is not 1.

On the other hand, a reference set value of the ratio (=1) for normal tracking during the second revolution of the drum which is stored in a memory circuit 72 is supplied to the error detection/comparison circuit 71 from the memory circuit 72 and compared with the ratio (f2a/f2b). A tracking error signal which causes these two values to coincide with each other is supplied to the servo circuit 33, whereby tracking is controlled.

During the third revolution of the drum, the pilot detection head signal da is set at Low level, the pilot detection head signal db is set at High level, the error detection signal e is set at Low level and the comparison control signal f is invalidated. This allows the error detection/comparison circuit 71 to detect a difference (f2b–f1b) between the two pilot signal components.

During the fourth revolution of the drum, both of the pilot detection head signals da and db are set at High level, and the comparison control signal f is set at Low level while the error detection signal e is kept at High level. Hence, the error detection/comparison circuit 71 detects a ratio (f2a/f1b) of the pilot signal components. If the heads 10a and 10b track normally, the ratio (f2a/f1b) is 1. If the heads 10a and 10b shift in tracking, the ratio (f2a/f1b) is not 1.

On the other hand, the reference set value of the ratio (=1) for normal tracking during the second revolution of the drum is supplied to the error detection/comparison circuit 71 from the memory circuit 72 and compared with the ratio (f2a/f1b). A tracking error signal which causes these two values to coincide with each other is supplied to the servo circuit 33, whereby tracking is controlled.

Tracking is controlled by a similar operation to the above during the fifth through eighth revolutions of the drum as well. Hence, the tracking control operation is updated utilizing sampling for every revolution of the rotation drum during the regular playback with the data rate of "¼", which is the same as in the regular playback with the data rate of "1".

Figure 33:
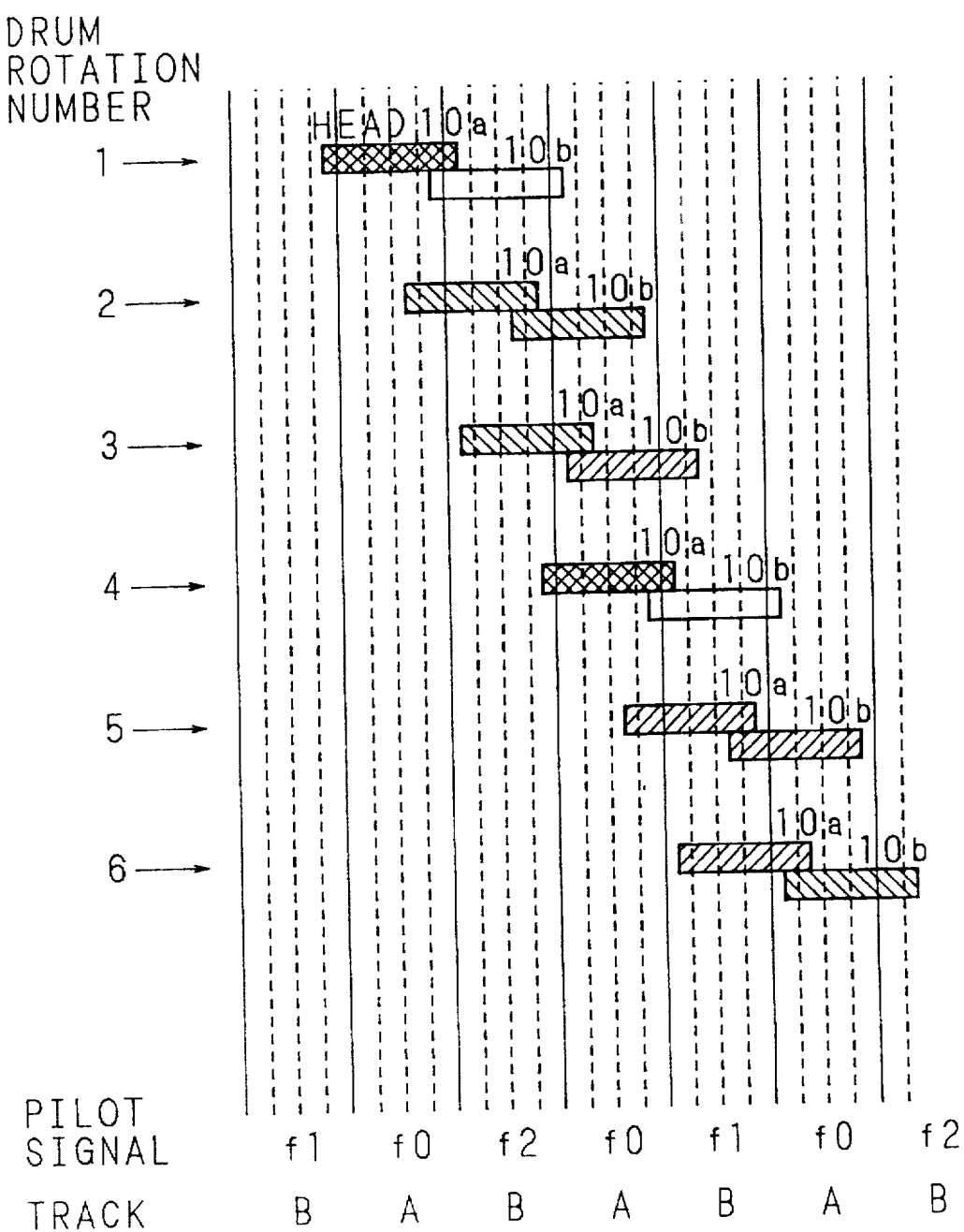
FIG. 33 is a diagram showing traces of heads during the regular playback with a data rate of "⅓" in the third embodiment.

Next, a description will be given on a tracking control operation during the regular playback of record tracks having the data rate of "⅓" with reference to a diagram of FIG. 33 showing a head trace condition and a timing chart in FIG. 34. The tape is fed at ⅓ of the tape speed v which is used during the regular playback with the data rate of "1". The first revolution of the drum in this case is exactly the same as the first revolution of the drum with the data rate of "¼" of the third embodiment, and will not be described here.

Both of the pilot detection head signals da and db are set at High level, and the comparison control signal f is set at Low level while the error detection signal e is kept at Low level during the second revolution of the drum. Hence, the error detection/comparison circuit 71 detects the ratio (f2a/f2b) of the pilot signal components and compares with the reference set value of the ratio for normal tracking during the second revolution of the drum supplied from the memory circuit 72. A tracking error signal which causes these two values to coincide with each other is supplied to the servo circuit 33, whereby tracking is controlled. Since the component f2a is larger than the component f2b, the reference set value of the ratio for normal tracking during the second revolution of the drum is larger than 1.

During the third revolution of the drum, both pilot detection head signals da and db are set at High level, and the comparison control signal f is set at Low level while the error detection signal e is kept at High level. Hence, the error detection/comparison circuit 71 detects the ratio (f2a/f1b) of the pilot signal components and compares with the reference set value of the ratio for normal tracking during the third revolution of the drum supplied from the memory circuit 72. A tracking error signal which causes these two values to coincide with each other is supplied to the servo circuit 33, whereby tracking is controlled. Since the component f2a is larger than the component f1b, the reference set value of the ratio for normal tracking during the third revolution of the drum is larger than 1.

During the fourth revolution of the drum, the pilot detection head signal da is set at High level, the pilot detection head signal db is set at Low level, the error detection signal e is set at Low level and the comparison control signal f is invalidated. This allows the error detection/comparison circuit 71 to detect the difference (f2a–f1a) between the two pilot signal components.

During the fifth revolution of the drum, both pilot detection head signals da and db are set at High level, and the comparison control signal f is set at High level while the error detection signal e is kept at Low level. Hence, the error detection/comparison circuit 71 detects a ratio (f1a/f1b) of the pilot signal components and compares with a reference set value of the ratio for normal tracking during the fifth revolution of the drum supplied from the memory circuit 72. A tracking error signal which causes these two values to coincide with each other is supplied to the servo circuit 33, whereby tracking is controlled. Since the component f1a is larger than the component f1b, the reference set value of the ratio for normal tracking during the fifth revolution of the drum is larger than 1.

During the sixth revolution of the drum, both the pilot detection head signals da and db are set at High level, and the comparison control signal f is set at High level while the error detection signal e is kept at High level. Hence, the error detection/comparison circuit 71 detects a ratio (f1a/f2b) of the pilot signal components and compares with a reference set value of the ratio for normal tracking during the sixth revolution of the drum supplied from the memory circuit 72. A tracking error signal which causes these two values to coincide with each other is supplied to the servo circuit 33, whereby tracking is controlled. Since the component f1a is larger than the component f2b, the reference set value of the ratio for normal tracking during the sixth revolution of the drum is larger than 1.

When tracking is controlled by a similar operation to the above in the seventh and subsequent revolutions of the drum, tracking control utilizing sampling is updated every time the drum rotates once during the regular playback with the data rate of "⅓" in the third embodiment.

Although described in relation to tracking control during the regular playback with the data rates of "⅓" and "¼" in addition to "1" and "½", the third embodiment is also applicable to tracking control during the regular playback with the data rate of "1/n" (n is an integer larger than 2). In such a case, tracking control utilizing sampling is updated n times in every n revolutions of the drum.

Next, a description will be given on a magnetic type recording and reproducing apparatus which performs high speed playback without fail even when bit streams of multiplexed signals having different data rates are used.

Embodiment 4

FIG. 35 is a block circuitry diagram showing a structure of a recording part of a bit stream recording and reproducing apparatus according to a fourth embodiment of the present invention. The recording part includes a recording data formatting circuit 88 which generates a synchronization signal block (sync block) between the input terminal 81 for receiving bit streams and an output terminal 90 for outputting recording data and formats recording data into a data arrangement for a track to which signals are recorded, a timing signal generating circuit 89 for generating and outputting a timing signal such as a synchronizing signal, a variable length decoder 84, a counter 85, a data extracting circuit 86 and an EOB (End of Block) adding circuit 87. To judge the data rate of inputted bit streams, the bit streams are supplied to a data rate detection circuit 91. The data rate detection circuit 91 outputs a signal expressing the data rate to a tape speed control circuit 92. The tape speed control circuit 92 controls the tape speed at the time of recording in accordance with this signal.

Next, the operation will be described in detail. MPEG2 bit streams inputted through the input terminal 81 are directly supplied to the recording data formatting circuit 88 as data for the main area. Synchronizing bytes are added to the bit streams in accordance with a synchronizing signal from the timing signal generating circuit 89 so that sync blocks are generated. The bit streams from the input terminal 81 are supplied to the variable length decoder 84 as well. As a result, syntaxes of the MPEG2 bit streams are analyzed and an intra image is detected. The counter 85 generates a timing signal by counting the number of DCT coefficients decoded by the variable length decoder 84 and outputs the timing signal to the data extracting circuit 86. In accordance with the timing signal from the counter 85, the data extracting circuit 86 samples low frequency components of all blocks of the intra image from the inputted bit streams and supplies data corresponding to a predetermined number of the DCT coefficients at a lower high speed and a higher high speed to the EOB adding circuit 87. The EOB adding circuit 87 adds EOB, and whereby high speed playback data for the lower high speed and the higher high speed are constructed. These data are outputted to the recording data formatting circuit 88. When synchronizing bytes are added in accordance with a synchronizing signal from the timing signal generating circuit 89, the data form sync blocks for high speed playback.

The data extracting circuit 86 may sample the data for the lower high speed and the data for the higher high speed at the same or different timing. When the timing is different, the number of the DCT coefficients within one image block to be recorded (i.e., a unit with which orthogonal transformation is performed at the side of the encoder) becomes different. Since an area for recording data for high speed playback is limited, if the areas for recording data for high speed playback are the same, an increase in the number of the DCT coefficients within one video signal block requires an increased area for recording data for high speed playback, thereby delaying refreshing of a screen during the playback. Instead, the image quality becomes better. The data extracting timing is determined through a trade-off between the refreshing and the image quality.

The recording data formatting circuit 88 adds synchronizing bytes to high speed playback data for the lower high speed and the higher high speed from the EOB adding circuit 87 in accordance with a synchronizing signal from the timing signal generating circuit 89, thereby to form sync blocks for high speed playback. Further a recording signal is formed so that sync blocks for the main area and sync blocks for high speed playback are recorded in a predetermined area on a track. The recording data formatting circuit 88 outputs formatted recording signals to a predetermined recording signal processing circuit and a tape head through the output terminal 90. After processed by digital recording modulation, recording amplification, and the like, the signals are recorded on a magnetic tape by the heads A and B having two types of azimuth angles.

The present embodiment is described with respect to a case that the data rate of inputted bit streams is "1", "½" and "¼". The data rate detection circuit 91 detects whether the data rate of inputted bit streams is "1", "½" or "¼", generates a signal which expresses the data rate and outputs the signal to the tape speed control circuit 92. Based on this signal, the tape speed control circuit 92 controls so that the tape speed for recording is changed in accordance with the data rate. That is, assuming that the tape speed is "1" when the data rate is "1", the tape speed is adjusted to "½" when the data rate is "½" and the tape speed is adjusted to "¼" when the data rate is "¼". When recording data outputted from the output terminal 90 is recorded with the tape speed controlled by the tape speed control circuit 92, a recording rate onto tracks remains the same and an arrangement on tracks also remains the same among the data rates.

Next, a description will be given on an arrangement on tracks for recording sync blocks for high speed playback. Since the data rates of bit streams are assumed to be "1", "½" and "¼" here, a description will be given on a quadruple speed as the lower high speed and a 16-times speed as the higher high speed.

Figure 36A:
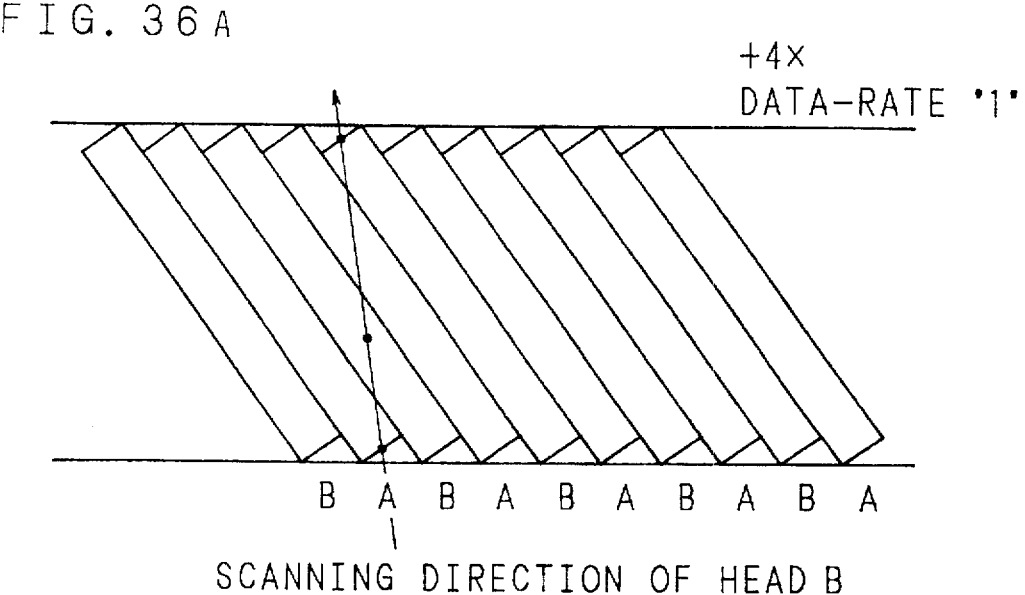
FIGS. 36A and 36B are diagrams showing a position of a head trace and a playback area during the playback at a quadruple speed with a data rate of "1"
Figure 36B:
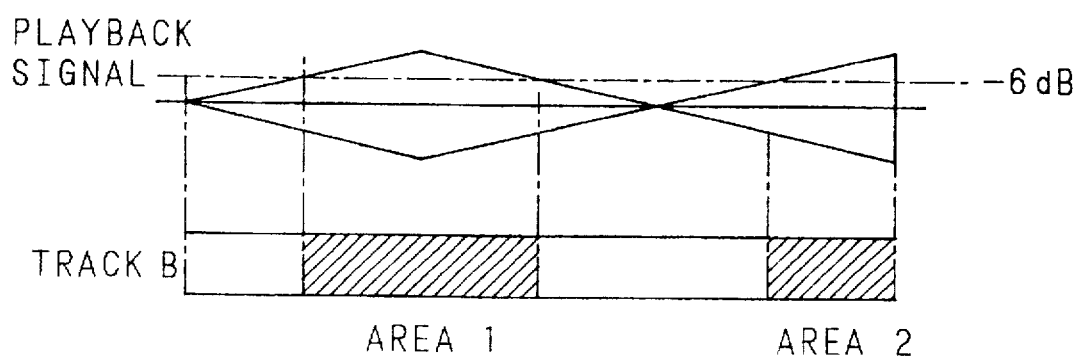

FIGS. 36A and 36B are diagrams showing an example of a position of a trace of a head B on tracks and a playback area during the playback at the quadruple speed and with the data rate of "1". If the tape speed is an integral multiple and phase lock is under control, head scanning synchronizes with tracks having the same azimuth, and therefore, a position of reproduced data is fixed. When a portion wherein an output level of a playback signal is larger than −6 dB is reproduced in FIG. 36A and 35B an area shadowed with hatching on tracks is reproduced by a head whose azimuth angle is B. Hence, a lower high speed recording area for recording quadruple speed data can be arranged in an area 1 or an area 2. For example, the lower high speed recording area is arranged in the area 1 of the track B. Since the head traces every four tracks at the quadruple speed, the copy area may be arranged every four tracks.

FIGS. 37A and 37B are diagrams showing an example of a position of a trace of a head A on tracks and a playback area during the playback at a 16-times speed and with the data rate of "1". If the tape speed is an integral multiple and phase lock is under control as in the case where the tape speed is the quadruple speed, head scanning synchronizes with tracks having the same azimuth, and therefore, a position of reproduced data is fixed. When a portion wherein an output level of a playback signal is larger than −6 dB is reproduced, an area shadowed with hatching on tracks is reproduced by a head whose azimuth angle is A. Hence, a higher high speed recording area for recording 16-times speed data can be arranged in any of the area 1 through an area 8. For example, the higher high speed recording area is arranged in the areas 3 to 6. Since the head traces every 16 tracks at the 16-times speed, it is possible to trace and reproduce all areas even if the copy area is arranged every four tracks.

Figure 38:
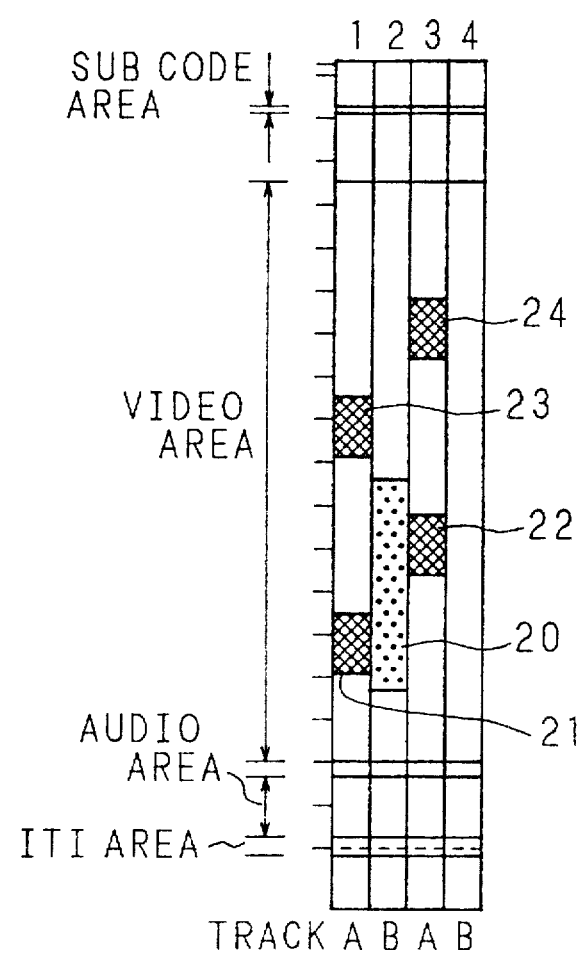
FIG. 38 is a diagram showing a track pattern in which a high speed playback data area is arranged in the fourth embodiment.

FIG. 38 is a diagram showing an example where each higher high speed recording area is arranged in a video area on the track within a home digital VTR based on the head trace with the data rate of bit streams of "1". In FIG. 38, denoted at 20 is a lower high speed area for tracks B for recording quadruple speed playback data by a head whose azimuth angle is B, and denoted at 21 to 24 are higher high speed areas for tracks A for recording 16-times speed playback data by a head whose azimuth angle is A. Image areas other than the areas 20 and 21 to 24 are used as the main area for recording bit streams which are data for regular playback.

The number of the areas for the quadruple speed and the 16-times speed is not limited to the above. These areas may be arranged in other areas in FIGS. 36A–36B and 37A–37B.

The playback speeds at data rates of bit streams are as follows during the quadruple speed playback and 16-times speed playback. That is, when the playback speed is the quadruple speed with the data rate of "½", data is reproduced by head tracing at a speed corresponding to double a speed with the data rate of "1", when the playback speed is 16 times, data is reproduced by head tracing at a speed corresponding to 8 times the speed with the data rate of "1". When the playback speed is the quadruple speed with the data rate of "¼", data is reproduced by head tracing at a speed corresponding to the normal speed with the data rate of "1", when the playback speed is 16 times, data is reproduced by head tracing at a speed corresponding to 4 times the speed with the data rate of "1". During the playback, the tape speed is changed depending on the data rate as in recording.

Hence, with the data rate of "1", during the quadruple speed playback, the quadruple speed playback area 20 of FIG. 38 is traced by the head B to obtain high speed playback data. During the 16-times speed playback, the 16-times speed playback areas 21 to 24 are traced by the head A to obtain high speed playback data.

With the data rate of "¼", since a track is traced at the normal speed during the quadruple speed playback, the quadruple speed playback area 20 is traced by the head B or the 16-times speed playback areas 21 to 24 are traced by the head A, to obtain high speed playback data. In addition, since a track is traced at the 4-times speed during the 16-times speed playback, the quadruple speed playback area 20 is traced by the head B to obtain high speed playback data.

Figure 39A:
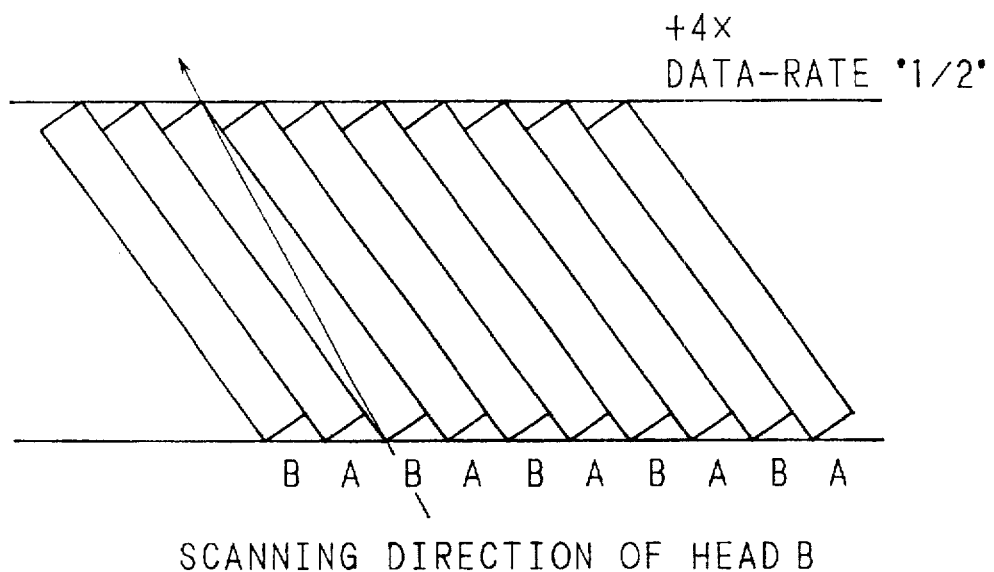
FIGS. 39A and 39B are diagrams showing a position of a head trace and a playback area during the playback at a quadruple speed with a data rate of "½"
Figure 39B:
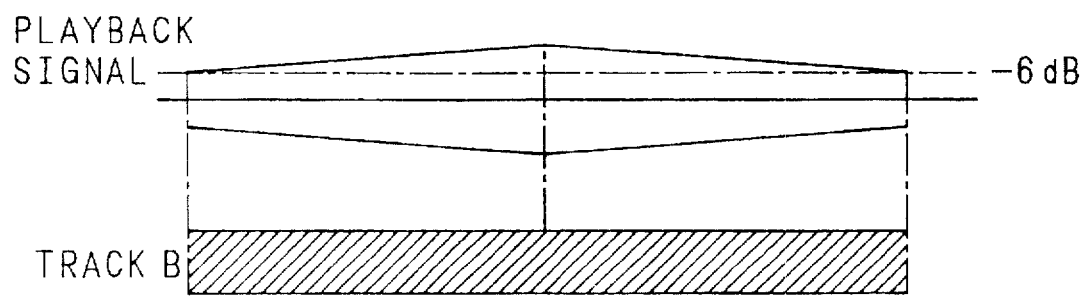

With the data rate of "½", a track is traced at the double speed during the quadruple speed playback. The head B traces as shown in FIGS. 39A and 39B, for instance, thereby reproducing all data contained in the track B. Hence, by tracing the quadruple speed playback area 20 by the head B, high speed playback data is reproduced. During the 16-times speed playback, the head traces at the an 8-times speed.

Hence, if high speed playback data are arranged in areas which are traced by the heads at the quadruple speed and the 16-times speed with the data rate of "1", the high speed playback data are reproduced during the quadruple speed playback and 16-times speed playback with the data rate of "¼" and during the quadruple speed playback with the data rate of "½". The arrangement of the four tracks shown in FIG. 38 is repeatedly recorded as one unit, thereby forming a recording pattern on the magnetic tape. For instance, data for quadruple speed are repeatedly recorded twice and data for 16-times speed are repeatedly recorded eight times.

<<Example 1 of Arrangement>>

Now, an example of arranging high speed playback data areas on a track will be described.

Figure 40:
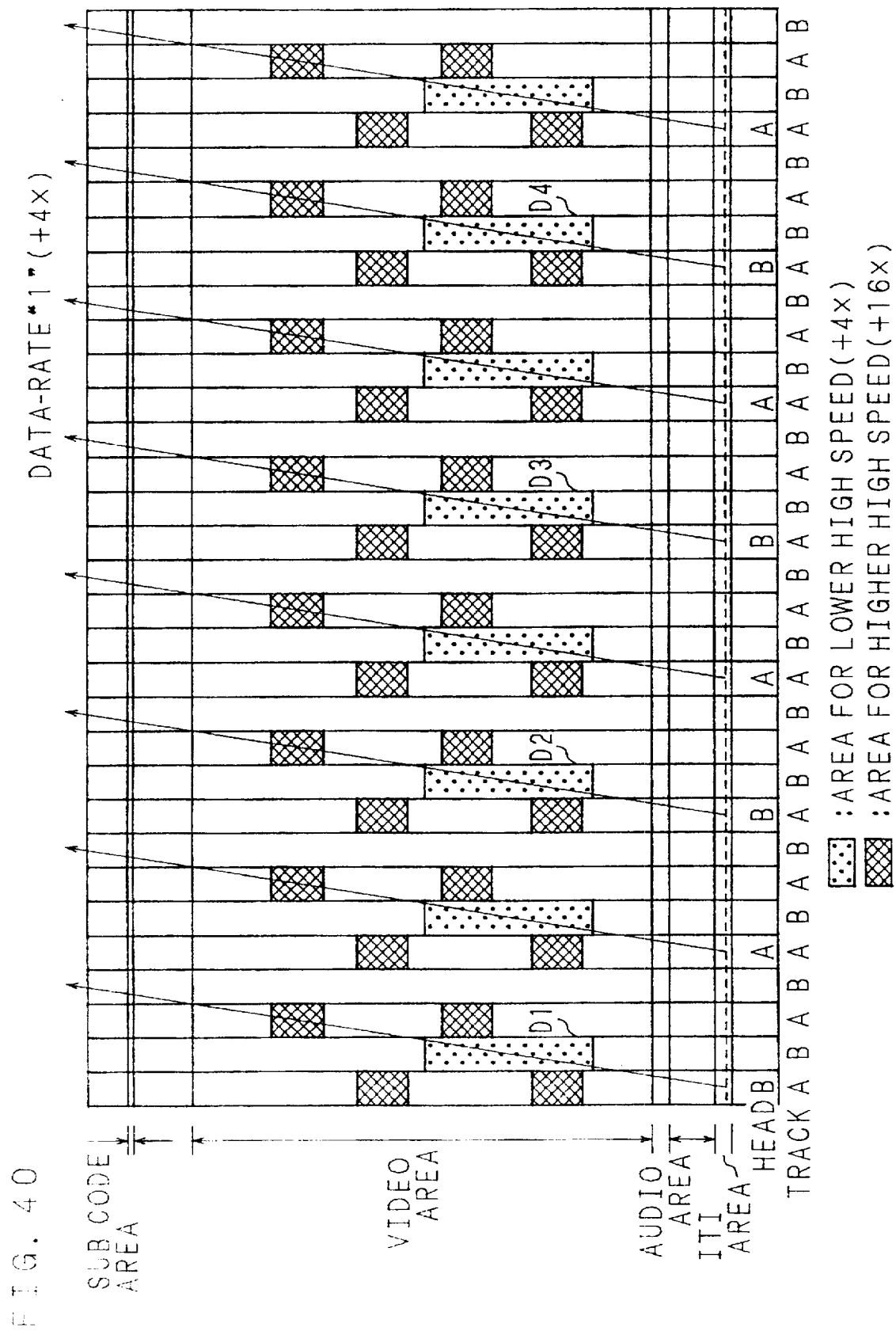
FIG. 40 is a diagram showing a state in which tracks recording data having a data rate of "1" are reproduced at a quadruple speed in a drum structure of 1ch×2 in the fourth embodiment.

FIG. 40 is a diagram showing scanning by heads of tracks recording data having the data rate of "1" during the quadruple speed playback in a drum structure of 1ch×2 in the fourth embodiment. Two types of heads having azimuth angles A and B are mounted on a rotation drum to face each other. Since the quadruple speed data are recorded by a head having the azimuth angle B, when the head B is subjected to phase lock control to trace as shown in FIG. 40, high speed playback data D1 to D4 of the quadruple speed areas traced by the head B are reproduced.

Figure 41:
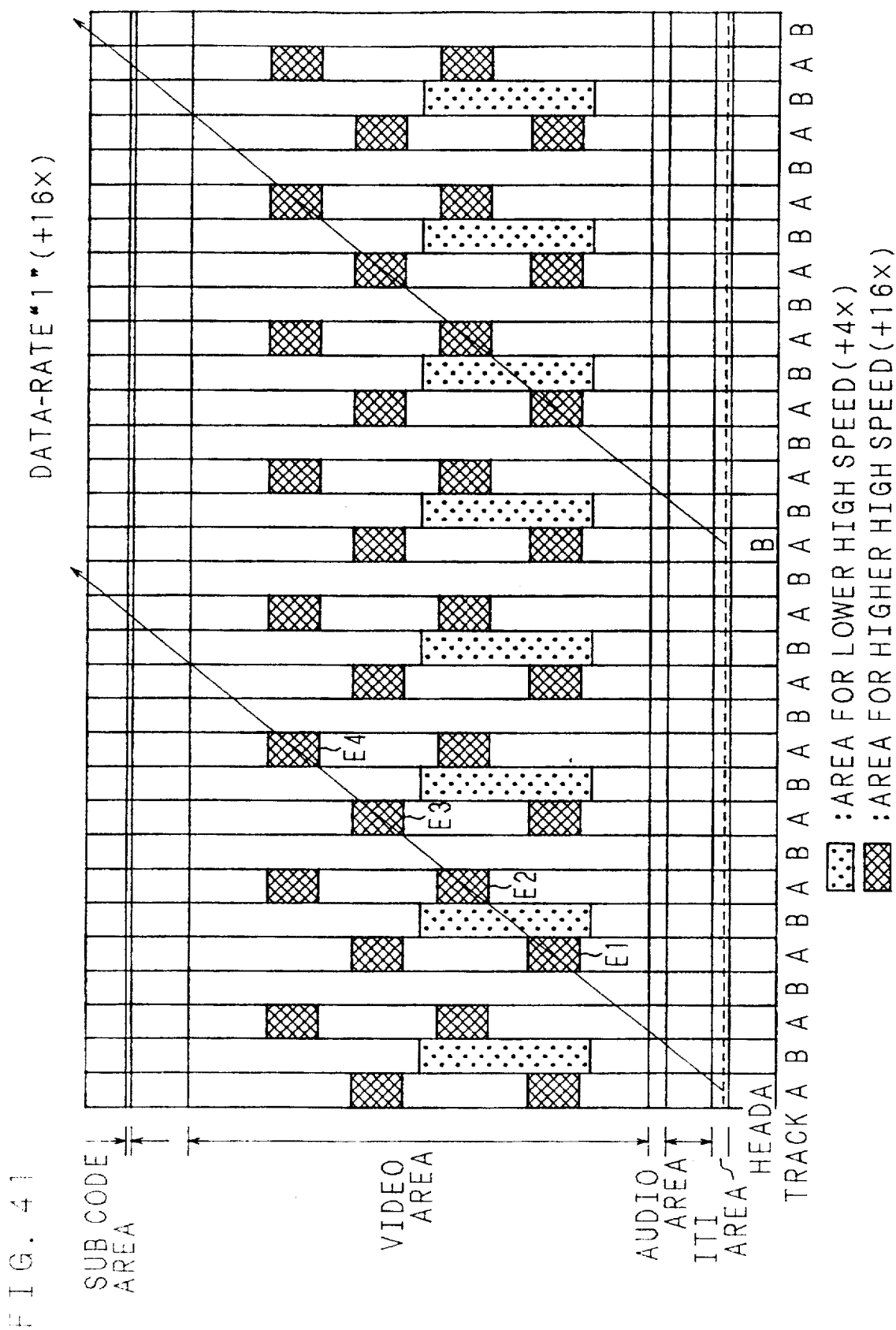
FIG. 41 is a diagram showing a state in which tracks recording data having a data rate of "1" are reproduced at a 16-times speed in a drum structure of 1ch×2 in the fourth embodiment.

FIG. 41 is a diagram of scanning on tracks recording data having the data rate of "1" by heads during the 16-times speed playback in a drum structure of 1ch×2 in the fourth embodiment. Since the 16-times speed data are recorded by a head which has the azimuth angle A, when the head A is subjected to phase lock control to trace as shown in FIG. 41, high speed playback data E1 to E4 of 16-times speed areas traced by the head A are reproduced.

Figure 42:
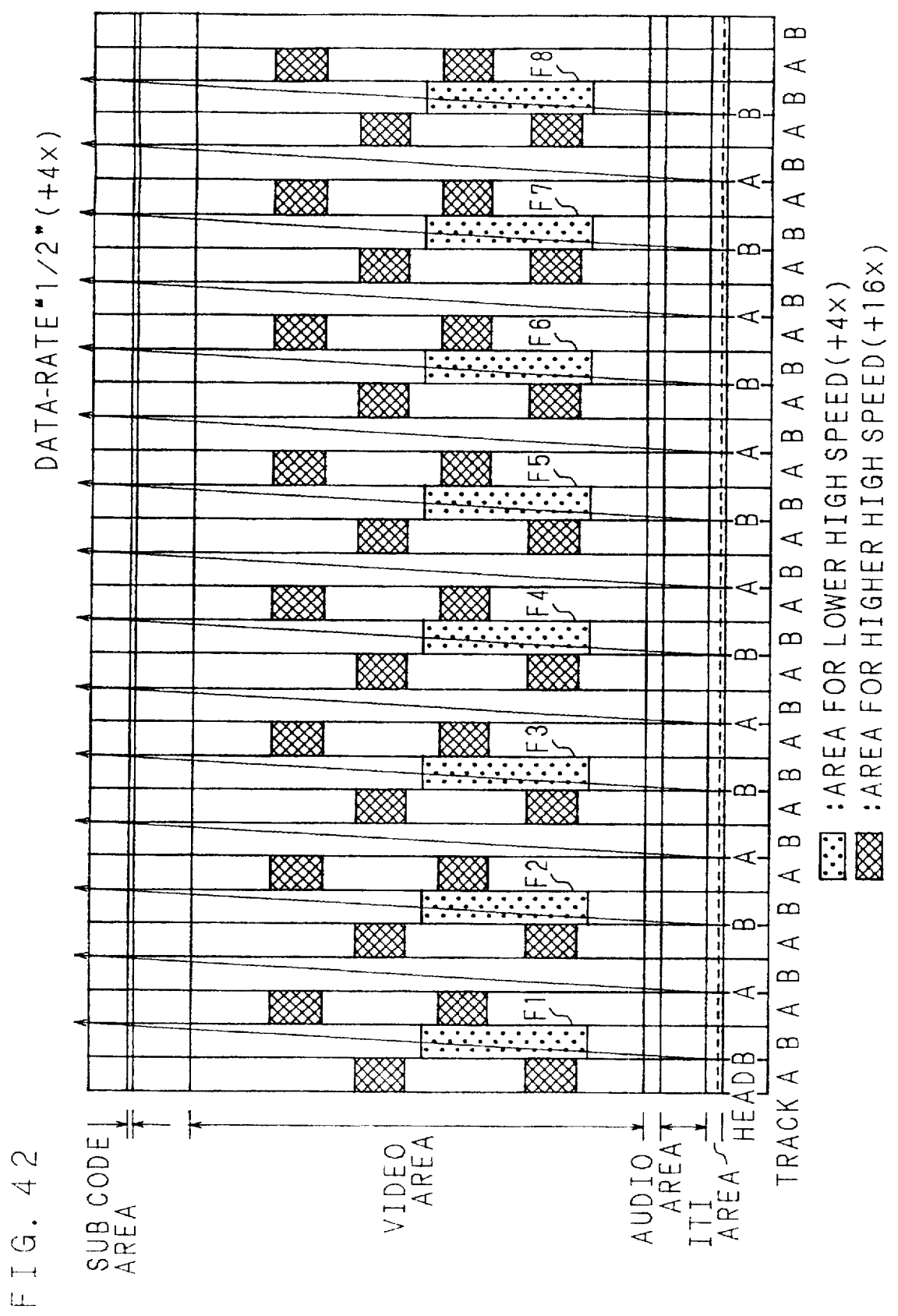

FIG. 42 is a diagram of scanning on tracks recording data having the data rate of "½" by heads during the quadruple speed playback in a drum structure of 1ch×2 in the fourth embodiment. Scanning by heads is the same as that during the double speed playback with the data rate of "1". The head B is under phase lock control to trace quadruple speed areas as shown in FIG. 42. Since the quadruple speed data are recorded by a head having the azimuth angle B, high speed playback data F1 to F8 of quadruple speed areas traced by the head B are reproduced.

Figure 43:
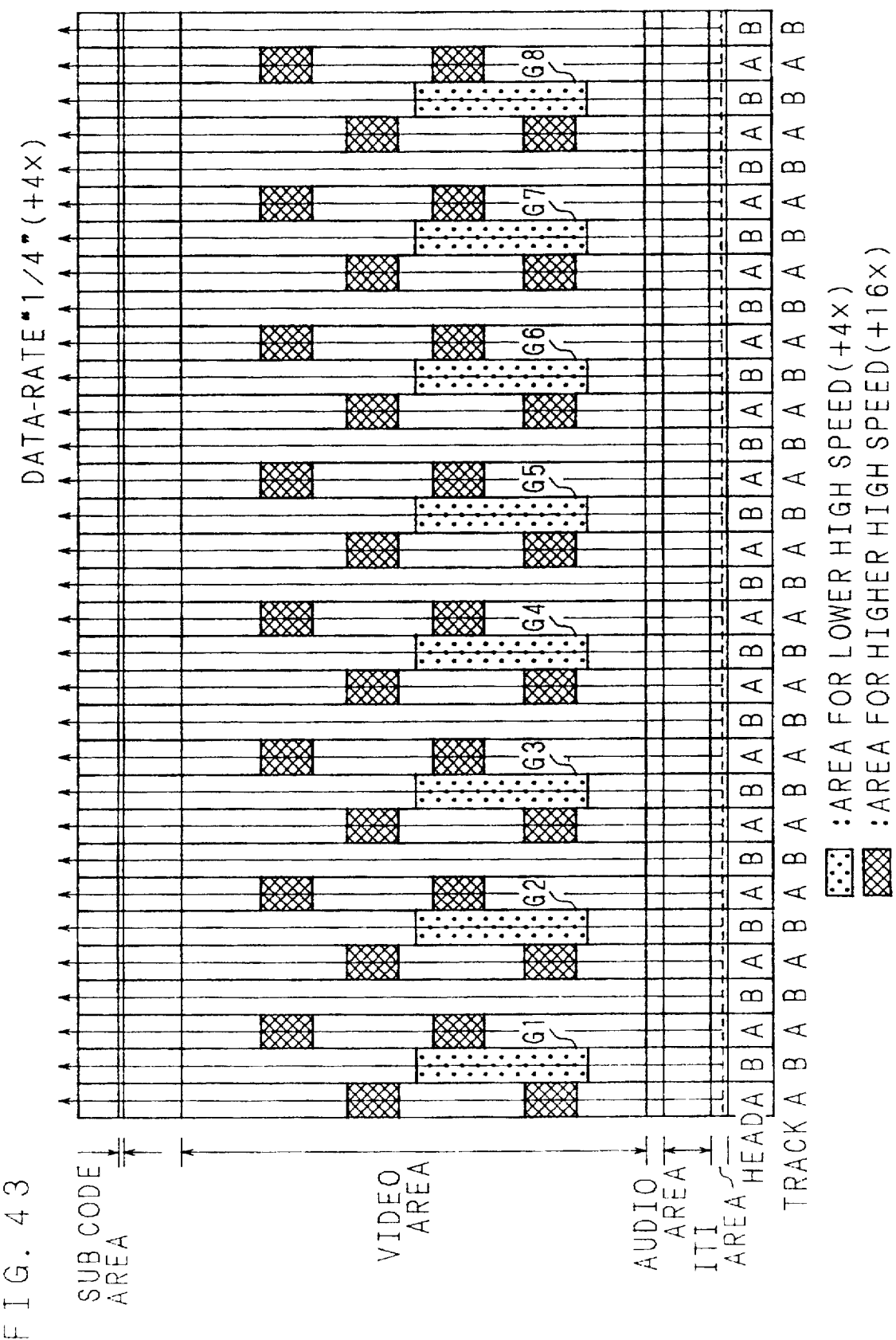
FIG. 43 is a view showing a state in which tracks recording data having a data rate of "¼" are reproduced at a quadruple speed in a drum structure of 1ch×2 in the fourth embodiment.

FIG. 43 is a diagram of scanning on tracks recording data having the data rate of "¼" by heads during the quadruple speed playback in a drum structure of 1ch×2 in the fourth embodiment. Scanning by heads is the same as that during the normal speed playback with the data rate of "1". Hence, quadruple speed data and 16-times speed data can be reproduced in this case. However, if quadruple speed data scanned by the head B are used, when the head B is under such phase lock control as to trace as shown in FIG. 43, high speed playback data G1 to G8 of quadruple speed areas traced by the head B are reproduced. All of the 16-times speed data scanned by the head A is reproduced when the head A scans tracks twice. The reproduced data can be used as the quadruple speed data.

Figure 44:
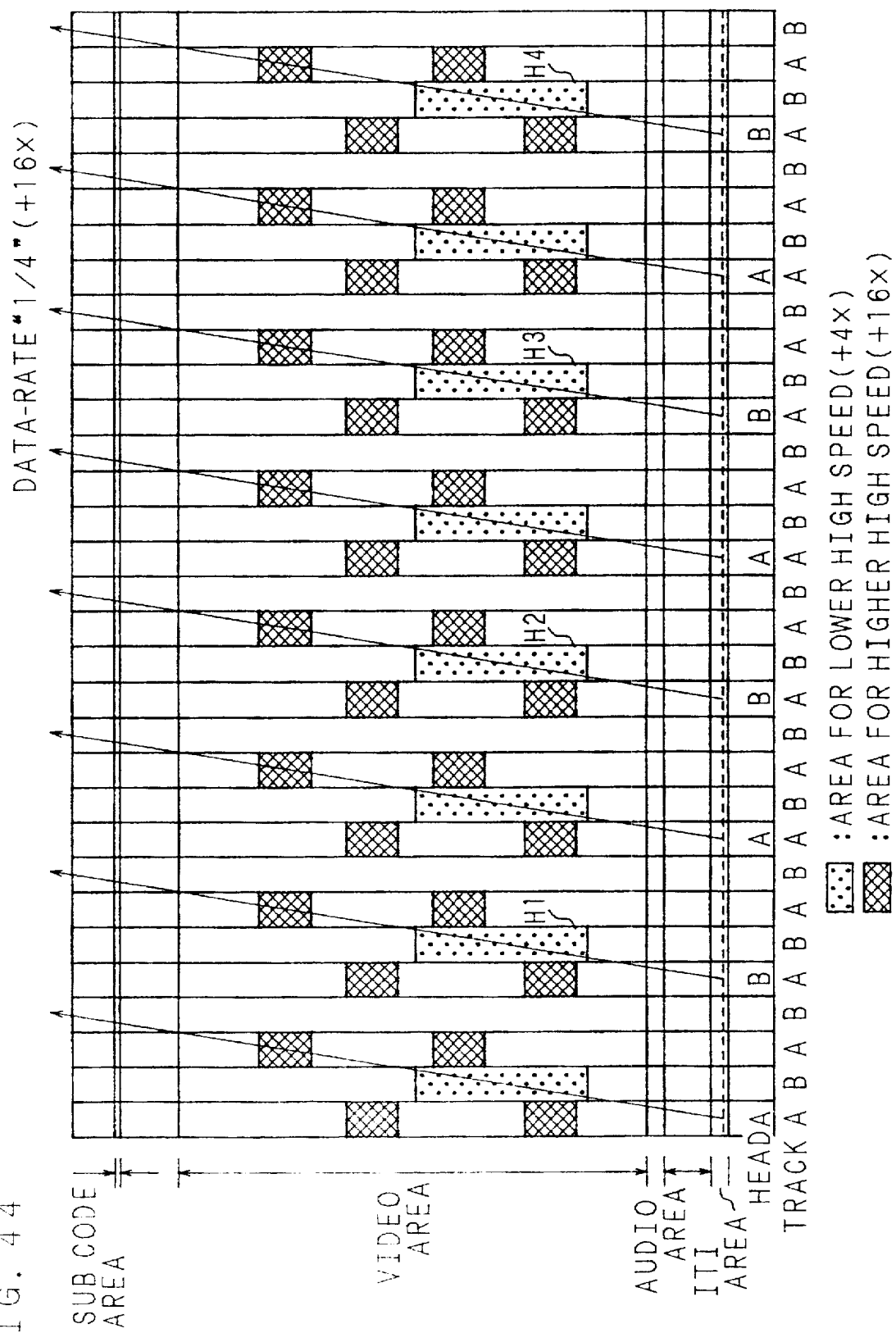
FIG. 44 is a view showing a state in which tracks recording data having a data rate of "¼" are reproduced at a 16-times speed in a drum structure of 1ch×2 in the fourth embodiment.

FIG. 44 is a diagram of scanning on tracks recording data having the data rate of "¼" by heads during the 16-times speed playback in a drum structure of 1ch×2 in the fourth embodiment. Scanning by heads is the same as that during the quadruple speed playback with the data rate of "1". The head B is subjected to phase lock control to trace the quadruple speed areas as shown in FIG. 44. Since the quadruple speed data are recorded by a head having the azimuth angle B, high speed playback data H1 to H4 of the quadruple speed areas traced by the head B are reproduced.

Although the drum structure is 1ch×2 in FIGS. 40 to 44, the drum structure is not limited to this. In a drum structure of 2ch×1 with two types of heads having azimuth angles A and B disposed in pairs or a drum structure of 2ch×2 with the pairs of heads mounted to face each other, data of a predetermined high speed playback area is similarly reproduced when either one of the heads A and B is subjected to phase lock control to trace as above since the high speed playback area to be used at the respective rates and high speeds is an area which is traced by either one of the heads A and B. A high speed for high speed playback in the drum structure of 2ch×2 is half that in the drum structures of 1ch×2 and 2ch×1.

Figure 45:
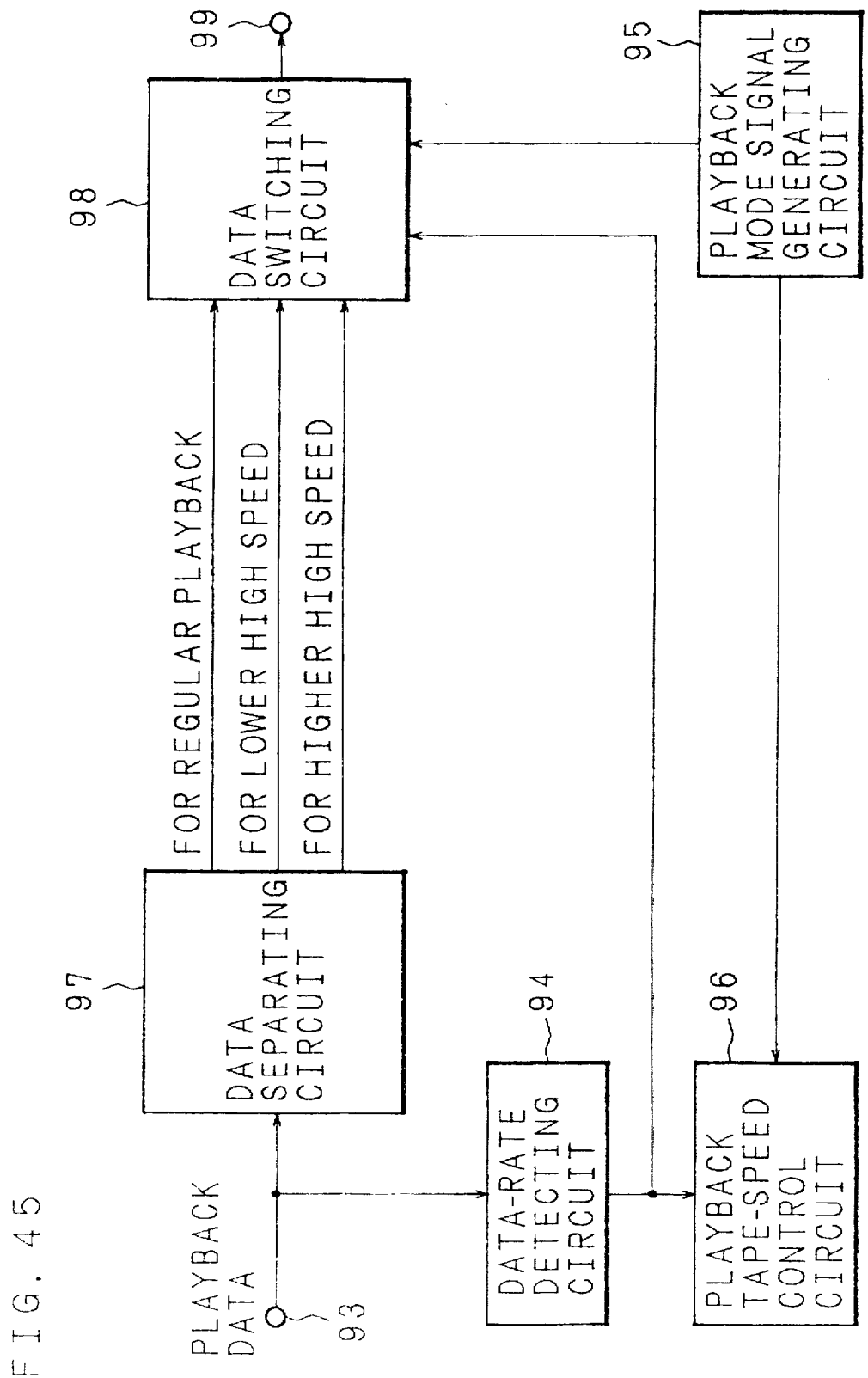
FIG. 45 is a block circuitry diagram showing a structure of a playback part of the magnetic type recording and reproducing apparatus according to the fourth embodiment.

FIG. 45 is a block diagram showing a structure of a playback part of the magnetic type recording and reproducing apparatus according to the present invention. Between an input terminal 93 for receiving reproduced data and an output terminal 99 for outputting reproduced data of the playback part are installed a data separating circuit 97 for separating reproduced data into normal reproduced data, lower high speed data and higher high speed data, and a data switch circuit 98 for switching and selecting reproduced data supplied from the data separating circuit 97. The playback part further includes a data rate detecting circuit 94 for judging the data rate of recorded bit streams from reproduced data, a playback mode signal generating circuit 95 for generating a signal which represents one mode of regular playback, lower high speed (quadruple speed) playback and higher high speed (16-times speed) playback, and a playback tape speed control circuit 96 for controlling the tape speed during the playback based on the signal indicating the data rate supplied from the data rate detecting circuit 94 and the playback mode signal supplied from the playback mode signal generating circuit 95. The data switch circuit 98 receives the data rate signal indicating the data rate from the data rate detecting circuit 94 and the playback mode signal supplied from the playback mode signal generating circuit 95.

Next, the operation will be described. The data rate detecting circuit 94 judges the data rate of bit streams of the playback data supplied through the input terminal 93. In accordance with the signal indicating the data rate and the playback mode signal from the playback mode signal generating circuit 95, the playback tape speed control circuit 96 controls the tape speed during the playback.

That is, assuming that the tape speed is "1" during the regular playback with the data rate being "1", the playback tape speed control circuit 96 adjusts the tape speed during the regular playback with the data rate of "½" to "½" and the tape speed during the regular playback with the data rate of "¼" to "¼". The playback tape speed control circuit 96 controls the tape speed so that the quadruple speed with the data rate of "½" corresponds to the double speed with the data rate of "1", the quadruple speed with the data rate of "¼" corresponds to the normal speed with the data rate of "1" and the 16-times speed with the data rate of "¼" corresponds to the quadruple speed with the data rate of "1".

The playback data inputted through the input terminal 93 is supplied to the data separating circuit 97 as well, and the data separating circuit 97 separates the playback data into normal reproduced data for the main area, lower high speed data from lower high speed areas and higher high speed data from higher high speed areas and outputs the data to the data switch circuit 98. The data switch circuit 98 switches and selects the data in accordance with the data rate signal and the playback mode signal and supplies the data to the output terminal 99.

During the regular playback, bit streams which are regular playback data in the main area are selected independently of the data rate. During the high speed playback, data is selected in accordance with the data rate of the playback data and the playback mode signal which indicates whether the playback is the lower high speed (quadruple speed) playback and higher high speed (16-times speed) playback. Lower high speed playback data is selected at the quadruple speed with the data rate "1" since the data D1 to D4 on the lower high speed playback areas traced by the head B are reproduced as shown in FIG. 40. When the speed is the 16-times speed, higher high speed playback data is selected since the data E1 to E4 of higher high speed playback areas traced by the head A are reproduced as shown in FIG. 41. At the quadruple speed with the data rate "½", lower high speed playback data is selected since the data F1 to F8 on the lower high speed playback areas traced by the head B are reproduced as shown in FIG. 42. At the quadruple speed with the data rate "¼", lower high speed playback data is selected since the data G1 to G8 on the lower high speed playback areas traced by the head B are reproduced as shown in FIG. 43. When the speed is 16 times, lower high speed playback data is selected since the data H1 to H4 of the lower high speed playback areas traced by the head B are reproduced as shown in FIG. 44.

Thus, in the present example of arrangement, the high speed for high speed playback is determined so that high speed playback data are arranged in areas which are traced during the high speed playback at the same high speed in the case where the data rate is "1" and the case where the data rates are "½" and "¼". Through tracing during the quadruple speed playback and 16-times speed playback with the data rate "1", high speed playback data for the quadruple speed and the 16-times speed are arranged. Further, in accordance with the data rate of playback data and the high speed for playback, data to be used is switched and selected. Hence, when bit streams of multiplexed signals of different data rates are to be recorded on tracks at the same recording rate and reproduced at a high speed, high speed playback data are reproduced during the quadruple speed playback with the data rate "1", "½" and "¼" and 16-times speed playback with the data rate "1" and "¼", and the data area for high speed playback need not be arranged for every data rate. This realizes high speed playback at the same high speed, steadily reproducing the high speed playback data.

Although the data rates are "1", "½" and "¼" in the present example 1, the data rate may be different from these values. Effects similar to those obtained in the present embodiment are achieved even when the data rate is a different value, as far as the head traces high speed playback data with the playback speed controlled corresponding to the data rate during the playback at an m-times speed with that data rate.

<<Example 2 of Arrangement>>

Another example of arranging high speed playback data areas on a track will be described. As in example 1, the high speed is 4 times for lower high speed playback and 16 times for higher high speed playback when the data rate of bit streams is "1", "½" and "¼".

Figure 46:
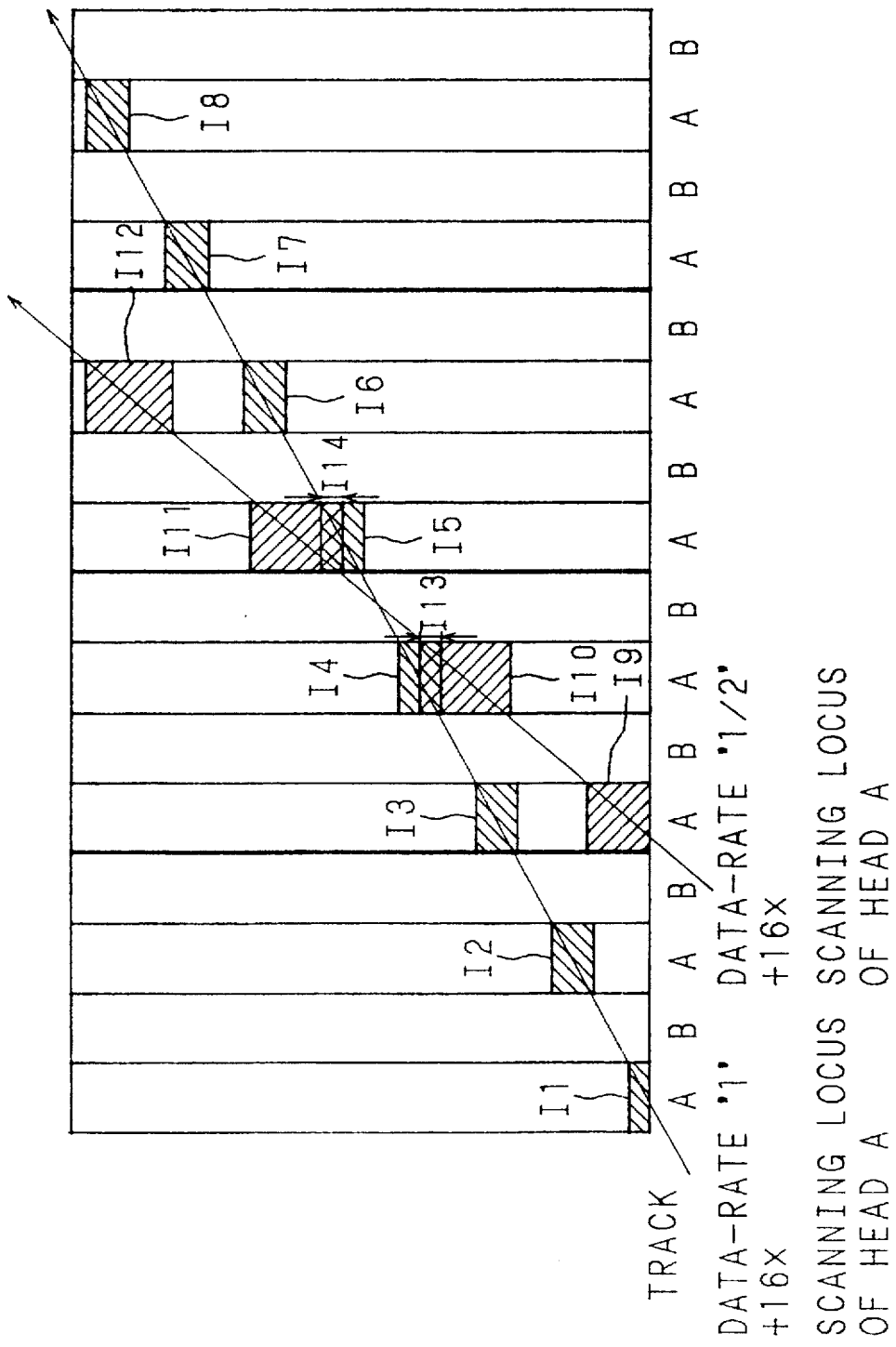
FIG. 46 is a diagram showing traces of heads and playback areas during the playback at a 16-times speed with data rates of "1" and "½"

FIG. 46 is a diagram showing an example traces by the head A on tracks and playback areas during the playback at the 16-times speed with data rates of "1" and "½". In FIG. 46, areas traced by the head A with the data rates of "1" and "½" overlap each other on the tracks. If the tape speed is an integral multiple and phase lock control is executed, head scanning synchronizes with tracks having the same azimuth, and therefore, a position of reproduced data is fixed. Denoted at I1 to I8 in FIG. 46 are areas reproducible at the 16-times speed with the data rate "1". Denoted at I9 to I12 are areas reproducible at the 16-times speed with the data rate "½".

Figure 47:
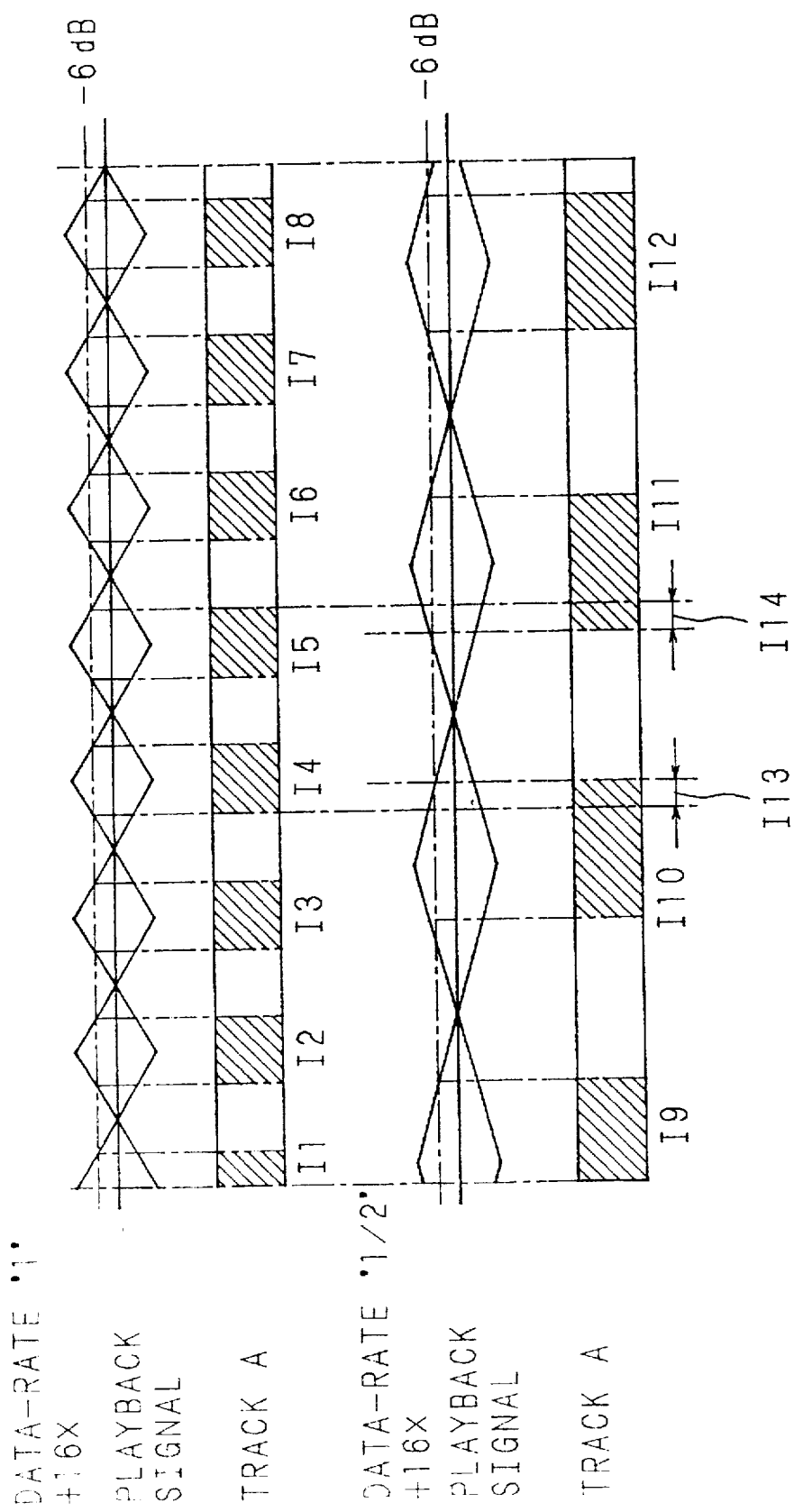
FIG. 47 is a diagram showing playback signals and reproducible areas during the playback at a 16-times speed with data rates of "1" and "½"

FIG. 47 shows playback signals and areas which are reproducible on the track A during tracing with respective data rates. In FIG. 47, shaded areas are the reproducible areas. In FIGS. 46 and 47, areas I13 and I14 are areas where reproducible areas during the 16-times speed playback with the data rate "1" overlap reproducible areas during 16-times speed playback with the data rate "½".

During the 16-times speed playback with the data rate "1", since the head traces every 16 tracks, when high speed playback areas are arranged every four tracks, all such areas are traceable and reproducible. During the 16-times speed playback with the data rate "½", since tracing corresponding to the 8-times speed playback with the data rate "1" is performed, that is, the head traces every eight tracks, even when high speed playback areas are arranged every four tracks, all such areas are reproduced.

Hence, higher high speed playback areas for the 16-times speed are arranged by arranging higher high speed recording areas for recording 16-times speed data in the areas I13 and I14 and by arranging the same data, for example, in the area I3 and a portion of the area I10 excluding the area I13 and also by arranging the same data in the area I6 and a portion of the area I11 excluding the area I14. This allows the data contained in the areas I13, I14, I3 and I6 to be reproduced at the 16-times speed with the data rate "1". Moreover, data in the areas I13, I14, the portion of the area I10 excluding the area I13 and the portion of the area I11 excluding the area I14 are reproduced at the 16-times speed with the data rate of "½". Hence, it is possible to obtain higher high speed playback data at the 16-times speed with any data rate.

Lower high speed playback areas are arranged in an arrangement similar to that in the example 1.

Figure 48:
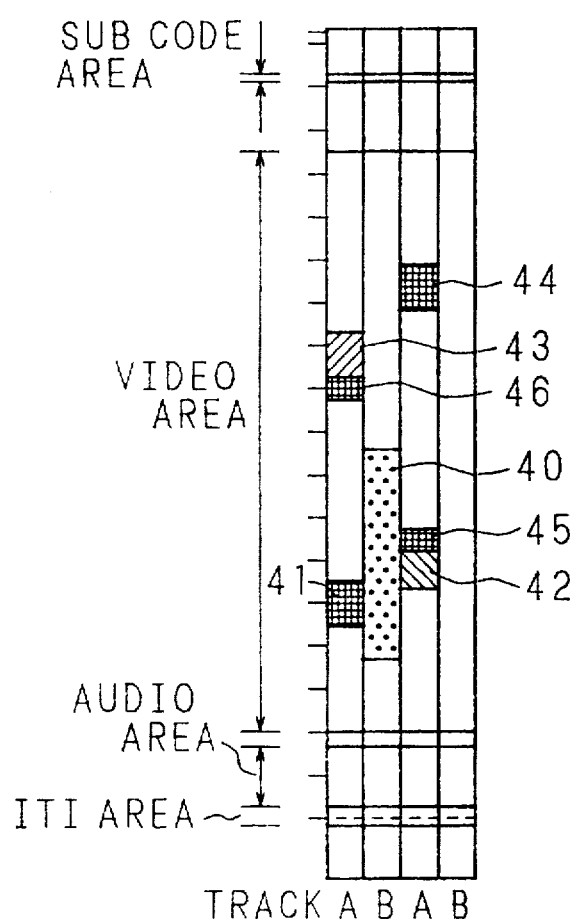
FIG. 48 is a diagram showing an example 2 of a track pattern in which a high speed playback data area is arranged.

FIG. 48 shows an example where high speed playback areas are arranged in video areas of tracks in home digital VTR with the above in mind. In FIG. 48, denoted at 40 is a lower high speed area of the track B for recording data to be reproduced during the quadruple speed playback by a head which has the azimuth angle of B. Denoted at 41 to 46 are higher high speed areas of tracks A for recording data to be reproduced during the 16-times speed playback by a head which has the azimuth angle of A. Video areas except the areas 40 and 41 to 46 are used as a main area for recording bit streams which are data for regular playback. In FIG. 48, data in the area 41 is the same as the data in the area 42 and data in the area 43 is the same as the data in the area 44.

As in example 1, during the quadruple speed playback, the head B traces the lower high speed (quadruple speed) area 40 when the data rate is "1" to obtain high speed playback data. When the data rate is "½", the head B traces the tracks at a speed which is twice faster during the quadruple speed playback. Since the head B traces as shown in FIGS. 39A and 39B, for example, high speed playback data is obtained when the head B traces the quadruple speed area 40. When the data rate is "¼", since the head traces the tracks at the normal speed during the quadruple speed playback, the head A traces the higher high speed areas 41 to 46 or the head B traces the quadruple speed area 40. Data obtained, for instance, when the head B traces the lower high speed area 40 may be used as high speed playback data. Further, since the head traces the tracks at a speed which is four times faster during the 16-times speed playback when the data rate is "¼", high speed playback data is obtained by tracing the lower high speed area 40 with the head B. The traces and the operations during the quadruple speed playback with the respective data rates and 16-times speed playback with the data rate of "¼" are similar to those in the example 1.

Next, operation at the 16-times speed with the data rates of "1" and "½" will be described. Traces by the head having the azimuth angle A at the 16-times speed with the data rates of "1" and "½" are as shown in FIG. 46. When the speed is the 16-times speed and the data rate is "½", data are reproduced by a head trace which corresponds to that at the 8-times speed with the data rate of "1". The playback tape speed is changed in accordance with the data rate during the playback as in recording. During the 16-times speed playback with the data rate of "1", the head A traces the higher high speed areas 41, 45, 46, 44 to obtain high speed playback data. When the data rate is "½", the head A traces the 16-times speed areas 42, 45, 46 and 43 thereby to reproduce high playback data. If high speed playback data is arranged in areas which are traced by the head A during the 16-times speed playback with the data rates of "1" and "½", it is possible to reproduce the high speed playback data during the quadruple speed playback with respective data rates, during the 16-times speed playback with the data rate of "¼" and 16-times speed playback with the data rates of "1" and "½". The arrangement of the four tracks shown in FIG. 48 is repeatedly recorded as one unit, thereby forming a recording pattern on the magnetic tape. For instance, data for quadruple speed are repeatedly recorded twice and data for 16-times speed are repeatedly recorded eight times.

Figure 49:
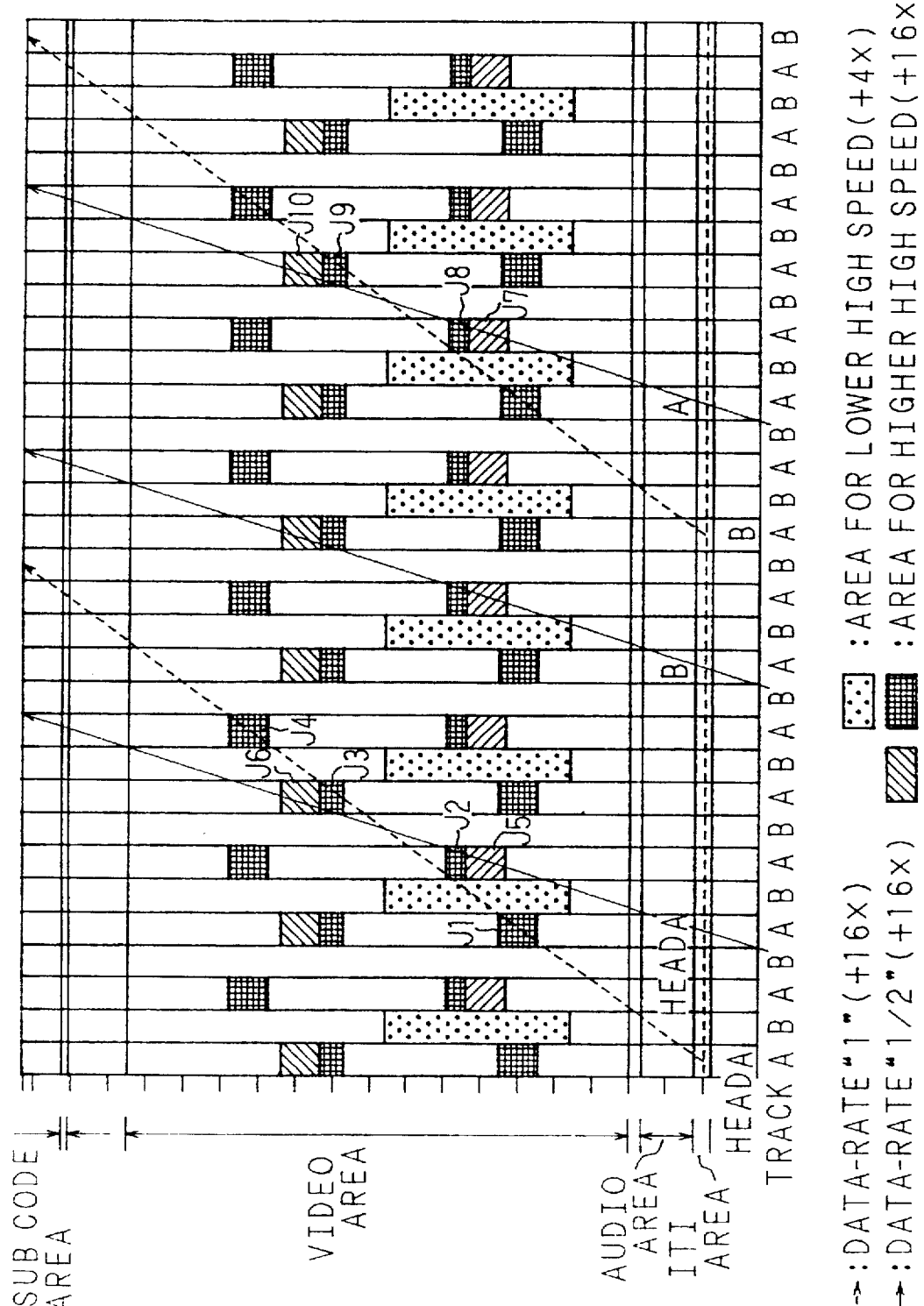
FIG. 49 is a diagram showing a state in which tracks recording data having a data rate of "1" or "½" are reproduced at a 16-times speed in a drum structure of 1ch×2 in the arrangement example 2.

FIG. 49 shows scanning of heads during the 16-times speed playback from tracks recording data having the data rate of "1" or "½" in the drum structure of 1ch×2 in the arrangement example 2. In FIG. 49, dotted arrows denote traces at the 16-times speed with the data rate of "1" while solid arrows denote traces at the 16-times speed with the data rate of "½". Since data for the 16-times speed are recorded by a head having the azimuth angle A, when the phase lock control is effected so that the head A traces as shown in FIG. 49, if the data rate is "1", data stored in high speed playback areas J1 to J4 for the 16-times speed traced by the head A are reproduced. Further, with the data rate of "½", data stored in high speed playback areas J5, J2, J3, J6 and J7 to J10 for the 16-times speed traced by the head A are reproduced.

Although FIG. 49 shows the case where the head has a drum structure of 1ch×2, the drum structure is not limited to this. In a drum structure of 2ch×1 with two types of heads having azimuth angles A and B disposed as a pair or a drum structure of 2ch×2 with such pairs mounted to face each other, data of a predetermined high speed playback area is similarly reproduced as in the example 1 when either one of the heads A and B is subjected to phase lock control to trace as above since the high speed playback area to be used at the respective rates and high speeds is an area which is traced by either one of the heads A and B. In the drum structure of 2ch×2, a high speed for high speed playback is half that in the drum structures of 1ch×2 and 2ch×1.

The high speed playback areas on the tracks of the example 2 are arranged by the bit stream recording and reproducing apparatus shown in FIGS. 35 and 45. During recording, the recording data formatting circuit 88 construct recording data so that the data arrangement of FIG. 48 is obtained. During the playback, the playback tape speed control circuit 96 controls the playback tape speed in accordance with the data rate signal from the data rate determining circuit 94 and the playback mode signal from the playback mode signal generating circuit 95.

The tape speed during the regular playback with the data rate "½" is adjusted to ½ of the tape speed during the regular playback with the data rate "1". The tape speed during the regular playback with the data rate "¼" is adjusted to ¼ of the tape speed during the regular playback with the data rate "1". The playback tape speed is adjusted so that the quadruple speed with the data rate "½" corresponds to the double speed with the data rate "1" and the 16-times speed with the data rate "½" corresponds to the 8-times speed with the data rate "1". Further, the playback tape speed is adjusted so that the quadruple speed with the data rate "¼" corresponds to the normal speed with the data rate "1" and 16-times speed with the data rate "¼" corresponds to the 4-times speed with the data rate "1".

The data separating circuit 97 separates the playback data into regular playback data for the main area, lower high speed data for lower high speed areas and higher high speed data for higher high speed areas. The separated data are outputted to the data switch circuit 98 which then switches and selects the separated data in accordance with the data rate signal and the playback mode signal and supplies to the output terminal 99. That is, during the regular playback, bit streams which are data for regular playback in the main area are selected with any data rate. During the high speed playback, data is selected in accordance with the data rate of the playback data and the playback mode signal which indicates whether the playback is the lower high speed (quadruple speed) playback or higher high speed (16-times speed) playback. Lower high speed playback data is selected when the speed is the quadruple speed and the data rate is "1" since lower high speed playback areas are reproduced. Since higher high speed playback areas traced by the head A are reproduced when the speed is the 16-times speed, higher high speed playback data is selected. Since lower high speed playback areas are reproduced when the speed is the quadruple speed and the data rate is "½", lower high speed playback data is selected. Since higher high speed playback areas are reproduced when the speed is the 16-times speed, higher high speed playback data is selected. Since lower high speed playback areas are reproduced when the speed is the quadruple speed and the data rate is "¼", lower high speed playback data is selected. Further, lower high speed playback data is selected since the lower high speed playback areas are reproduced when the speed is the 16-times speed.

Thus, according to the present example of arrangement, the high speed for high speed playback is determined so that high speed playback data are arranged in areas which are traced during the high speed playback at the same high speed with any data rate. Through tracing during the 4-times speed playback with the data rate "1" and 16-times speed playback with the data rates "1" and "½", high speed playback data for the 4-times speed and the 16-times speed are arranged. Further, in accordance with the data rate of playback data and the high speed for playback, data to be used is switched and selected. Hence, when bit streams of multiplexed signals of different data rates are to be recorded on tracks at the same recording rate and reproduced at a high speed. high speed playback data are reproduced during the lower high speed (quadruple speed) playback and higher high speed (16-times speed) playback with the data rates "1", "½" and "¼" without arranging areas for high speed playback data for every data rate. This realizes high speed playback at the same high speed, steadily reproducing the high speed playback data.

Although the data rates are "1", "½" and "¼" in the present example, the data rate may be different from these values. Effects similar to those obtained in the present example are achieved even when the data rate is different, as far as the head traces high speed playback data with the playback speed controlled depending on the data rate during the playback at an m-times speed with that data rate.

<<Example 3 of Arrangement>>

Still another example of arranging high speed playback data areas on a track will be described. As in examples 1 and 2, the high speed is the quadruple speed for lower high speed playback and 16-times speed for higher high speed playback and the data rate of bit streams is "1", "½" and "¼".

Figure 50:
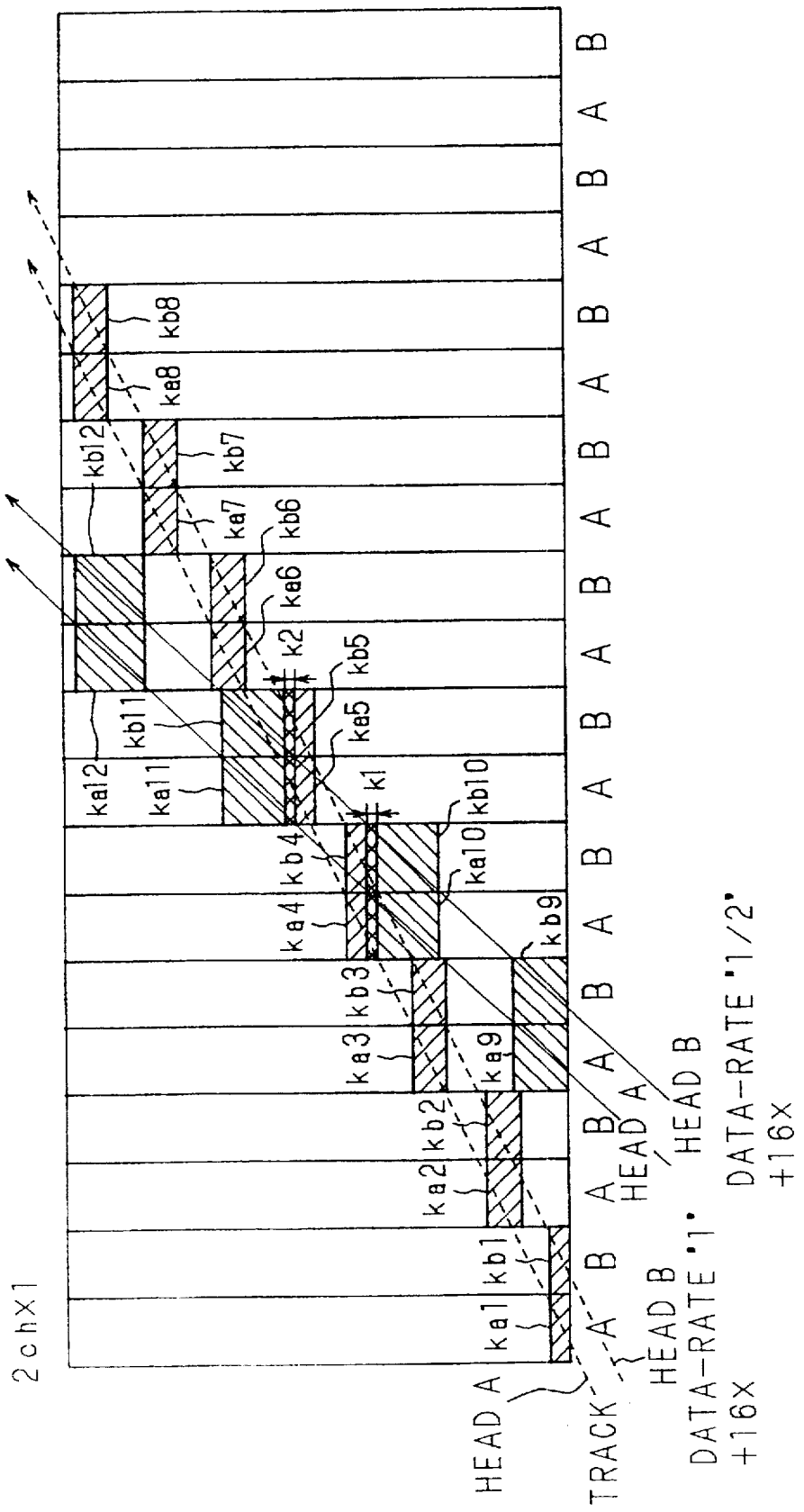
FIG. 50 is a diagram showing traces of heads and playback areas during the playback at a 16-times speed with data rates of "1" and "½" in a drum structure of 2ch×1.

FIG. 50 is a diagram showing an example of traces of heads A and B on tracks and playback areas during the playback at the 16-times speed with data rates of "1" and "½". In FIG. 50, areas traced by the heads A and B with data rates of "1" and "½" overlap each other on tracks. Two types of heads having azimuth angles A and B are mounted in pairs on a rotation drum. That is, this is a drum structure of 2ch×1. If the tape speed is an integral multiple and phase lock is controlled, head scanning synchronizes with tracks having the same azimuth, and therefore, a position of reproduced data is fixed. Denoted at ka1 to ka8 and kb1 to kb8 in FIG. 50 are areas which are reproducible during the 16-times speed playback with the data rate "1". Denoted at ka9 to ka12 and kb9 to kb12 are areas which are reproducible during the 16-times speed playback with the data rate "½".

Figure 51:
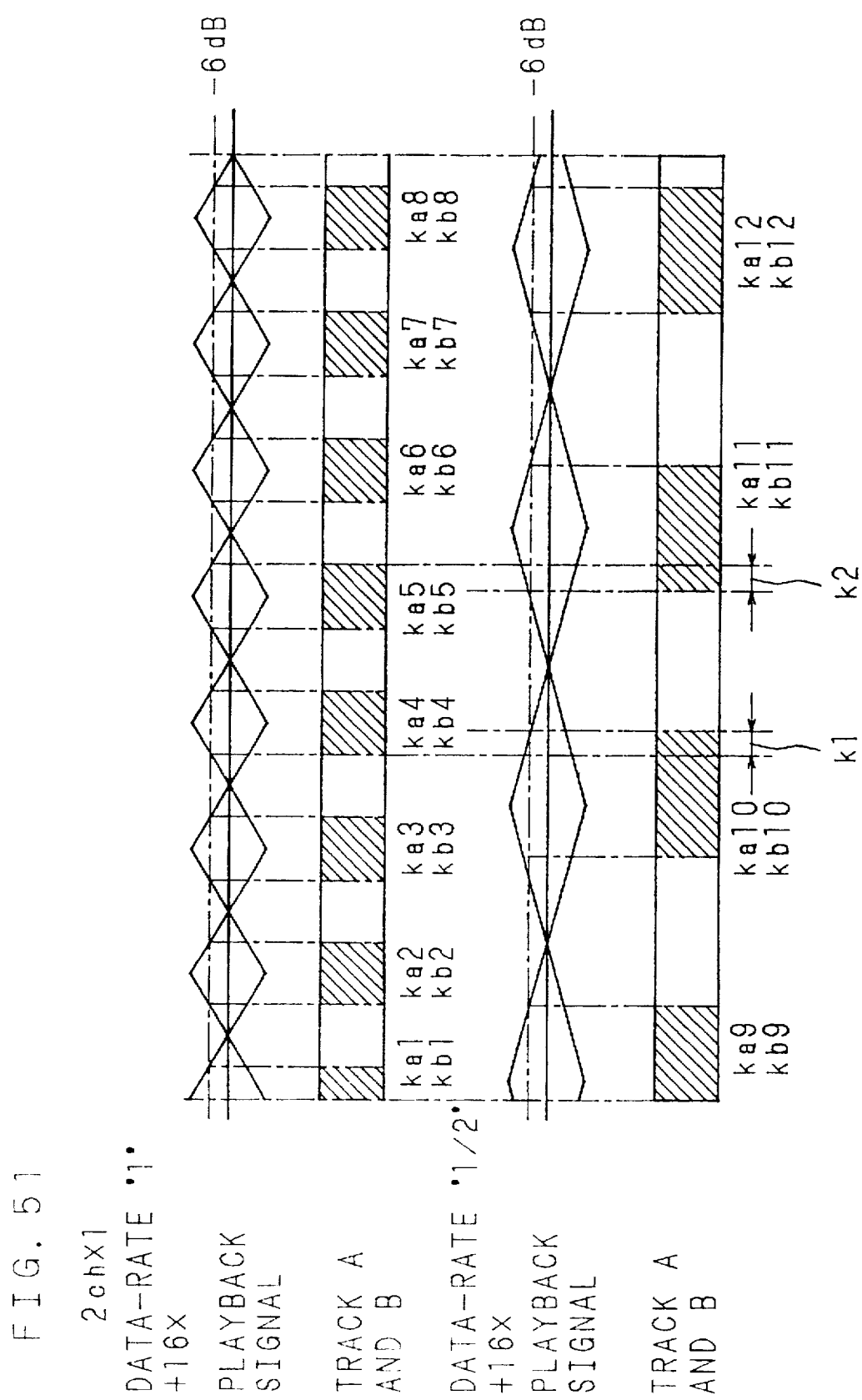
FIG. 51 is a diagram showing playback signals and reproducible areas on tracks in tracing at the data rates shown in FIG. 50.

FIG. 51 shows playback signals and reproducible areas on tracks A and B during tracing at the respective data rates. Shaded areas in FIG. 51 are reproducible areas. In FIGS. 50 and 51, areas k1 and k2 on the tracks A and B are overlap areas which are reproducible during both the 16-times speed playback with the data rate "1" and the 16-times speed playback with the data rate "½".

During the 16-times speed playback with the data rate "1", since the head traces every 16 tracks, even when high speed playback areas are arranged every four tracks, all such areas are traced and reproduced. During the 16-times speed playback with the data rate "½", since tracing corresponding to that during the 8-times speed playback with the data rate "1" is performed, that is, the head traces every eight tracks, when high speed playback areas are arranged every four tracks, all such areas are reproduced.

Hence, when higher high speed playback areas for the 16-times speed data are arranged in the areas k1 and k2, during the 16-times speed playback with the data rates of "1" and "½", data stored in the areas k1 and k2 arranged in the tracks A and B are reproduced by the heads having the azimuth angles A and B, whereby higher high speed playback data are obtained at the 16-times speed.

Lower high speed playback areas are arranged in an arrangement similar to that in the fourth embodiment, and therefore, will not be described.

Figure 52:
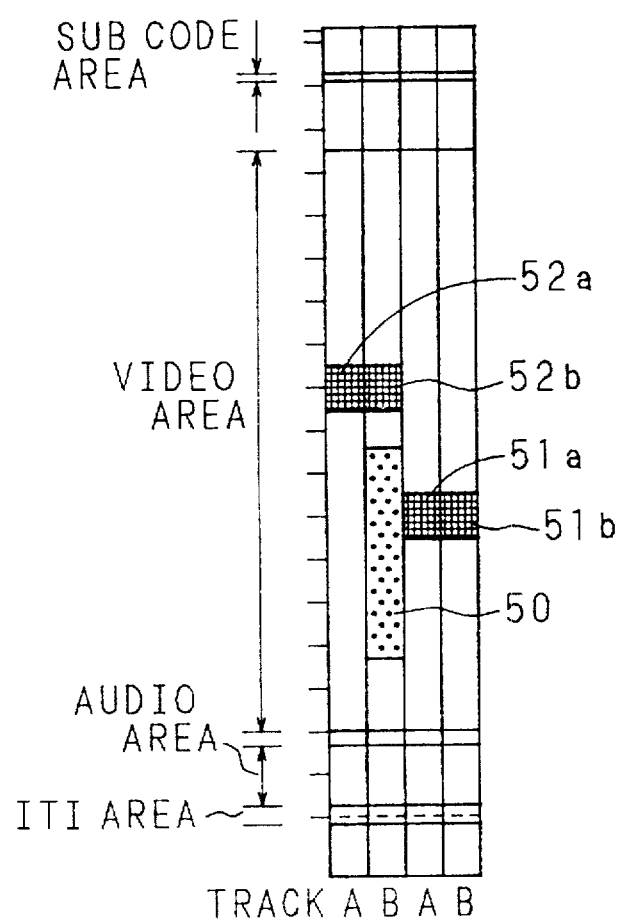
FIG. 52 is a diagram showing an example 3 of a track pattern in which a high speed playback data area is arranged.

FIG. 52 shows an example where high speed playback areas are arranged in video areas of tracks in a home digital VTR with the above in mind. In FIG. 52, denoted at 50 is a lower high speed area of the track B for recording data to be reproduced during the quadruple speed playback by a head which has the azimuth angle of B. Denoted at 51a and 52a are higher high speed areas of tracks A for recording data to be reproduced during the 16-times speed playback by a head which has the azimuth angle of A. Denoted at 51b and 52b are higher high speed areas of tracks B for recording data to be reproduced during the 16-times speed playback by a head which has the azimuth angle of B. Video areas except the areas 50, 51a, 51b, 52a and 52b are used as a main area for recording bit streams which are data for regular playback.

As in the examples 1 and 2, during the quadruple speed playback, the head B traces the lower high speed area 50 when the data rate is "1", thereby obtaining high speed playback data. When the data rate is "½", the head B traces the tracks at a speed which is twice faster during the quadruple speed playback. Since the head B traces, for example, as shown in FIG. 39A and 39B, high speed playback data is obtained when the head B traces the lower high speed area 50. When the data rate is "¼", since the head traces the tracks at the normal speed during the quadruple speed playback, the head A traces the higher high speed area 51a, 51b, 52a or 52b or the head B traces the lower high speed area 50. Data obtained when the head B traces the lower high speed area 50 may be used as high speed playback data. Further, since the head traces the tracks at a speed which is four times faster during the 16-times speed playback when the data rate is "¼", high speed playback data is obtained by tracing the lower high speed area 50 with the head B. It is possible to reproduce quadruple speed data in the 2ch×1 structure when phase lock is controlled so that the head B traces the quadruple speed playback areas. The traces and the operations during the quadruple speed playback with the respective data rates and 16-times speed playback with the data rate of "¼" are similar to those in the example 1.

Next, operation at the 16-times speed with the data rate of "1" and "½" will be described. Traces of the head at the 16-times speed with the data rates of "1" and "½" are as shown in FIG. 50. When the speed is the 16-times speed and the data rate is "½", data are reproduced by a head trace which corresponds to that during the 8-times speed with the data rate of "1". The playback tape speed is changed in accordance with the data rate during the playback as in recording. During the 16-times speed playback with the data rate of "1", the heads A and B trace the 16-times speed areas 51a, 51b, 52a and 52b, thereby obtaining high speed playback data. When the data rate is "½", the heads A and B trace the 16-times speed areas 51a, 51b, 52a and 52b, thereby obtaining high speed playback data.

Hence, when the high speed playback data are arranged in the areas which are traced by both heads A and B during the 16-times speed playback with the data rates of "1" and "½", high speed playback data are reproduced not only during the quadruple speed playback with the respective data rates and 16-times speed playback with the data rate of "¼" but also during the 16-times speed playback with the data rates of "1" and "½". The arrangement of the four tracks shown in FIG. 52 is repeatedly recorded as one unit, thereby forming a recording pattern on the magnetic tape. For instance, data for quadruple speed are repeatedly recorded twice and 16-times speed are repeatedly recorded eight times.

Figure 53:
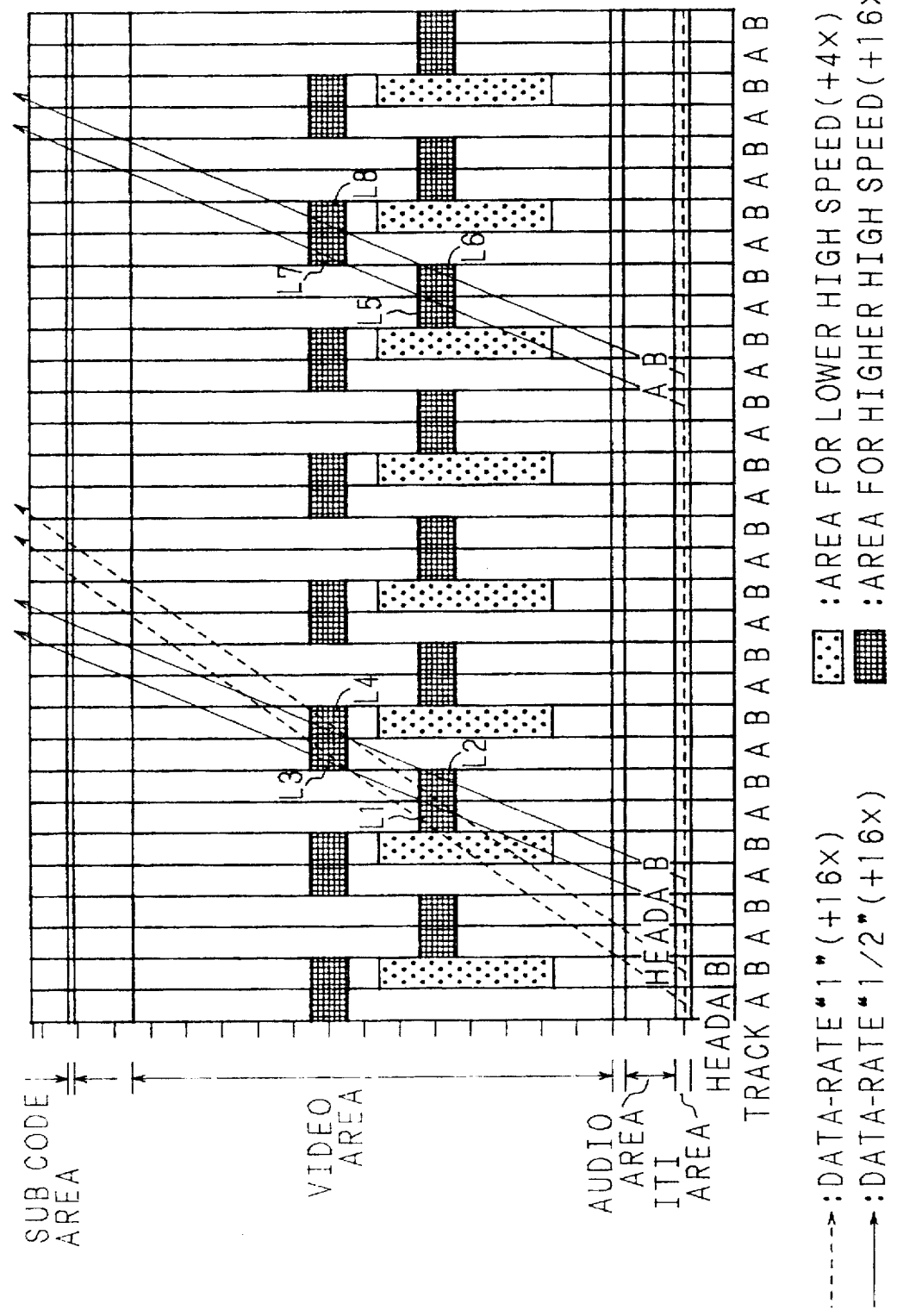
FIG. 53 is a diagram showing a state in which tracks recording data having a data rate of "1" or "½" are reproduced at a 16-times speed in a drum structure of 2ch×1 in the example 3.

FIG. 53 shows a diagram of scanning of heads during the 16-times speed playback from tracks recording data having the data rate of "1" or "½" in the drum structure of 2ch×1 in the arrangement example 3. In FIG. 53, dotted arrows denote traces at the 16-times speed with the data rate of "1"

while solid arrows denote traces at the 16-times speed with the data rate of "½". The respective heads are under phase lock control so as to trace higher high speed areas. When the data rate is "1", high speed playback data L1 to L4 of 16-times speed areas arranged in the tracks A and B are reproduced. When the data rate is "½", high speed playback data L1 to L4 and L5 to L8 of the 16-times speed areas arranged in the tracks A and B are reproduced.

Although FIG. 53 shows the case where the head has a drum structure of 2ch×1, the drum structure is not limited to this. In a drum structure of 2ch×2 with two pairs each consisting of two types of heads having azimuth angles A and B are mounted to face each other, data of a predetermined high speed playback area is similarly reproduced when either one of the heads A and B is subjected to phase lock control to trace as above since the high speed playback areas to be used at the respective rates and high speeds are traced.

The high speed playback areas on the tracks are arranged by the bit stream recording and reproducing apparatus shown in FIGS. 35 and 45. During recording, the recording data formatting circuit 88 constructs recording data so that the data arrangement of FIG. 52 is obtained. During the playback, the playback tape speed control circuit 96 controls the playback tape speed in accordance with the data rate signal and the playback mode signal.

The tape speed during the regular playback with the data rate "½" is adjusted to ½ of the tape speed during the regular playback with the data rate "1". The tape speed during the regular playback with the data rate "¼" is adjusted to ¼ of the tape speed during the regular playback with the data rate "1". The playback tape speed is adjusted so that the quadruple speed with the data rate "½" corresponds to the double speed with the data rate "1" and the 16-times speed with the data rate "½" corresponds to the 8-times speed with the data rate "1". Further, the playback tape speed is adjusted so that the quadruple speed with the data rate "¼" corresponds to the normal speed with the data rate "1" and 16-times speed with the data rate "¼" corresponds to the 4-times speed with the data rate "1".

The data separating circuit 97 separates the playback data into regular playback data for the main area, lower high speed data for lower speed areas and higher high speed data for higher high speed areas and outputs the data to the data switch circuit 98. The data switch circuit 98 switches and selects the data in accordance with the data rate signal and the playback mode signal and supplies the data to the output terminal 99.

During the regular playback, bit streams which are regular playback data in the main area are selected independently of the data rate. During the high speed playback, data is selected in accordance with the signal indicating the data rate of the playback data and the playback mode signal which indicates whether the playback is the lower high speed (quadruple speed) playback and higher high speed (16-times speed) playback. Lower high speed playback data is selected at the quadruple speed with the data rate "1" since lower high speed playback data is selected. When the speed is the 16-times speed and the data rate is "1", higher high speed playback data is selected since data are reproduced from higher high speed areas traced by the heads A and B. When the speed is the quadruple speed and the data rate is "½", lower high speed playback data is selected since data are reproduced from lower high speed areas. When the speed is the 16-times speed and the data rate is "½", higher high speed playback data is selected since data are reproduced from higher high speed areas. When the data rate is "¼" at the quadruple speed, lower high speed playback data is selected since lower high speed playback areas are reproduced. When the speed is 16 times with the data rate "¼", lower high speed playback data is selected since lower high speed areas are reproduced.

Thus, according to the present example of arrangement, the high speed for high speed playback is determined so that high speed playback data are arranged in areas which are traced during the high speed playback at the same high speed with any data rate. Through tracing during the quadruple speed playback with the data rate of "1" and 16-times speed playback with the data rates "1" and "½", high speed playback data for the quadruple speed and the 16-times speed are arranged. Further, in accordance with the data rate of playback data and the high speed for playback, data to be used is switched and selected. Hence, when bit streams of multiplexed signals of different data rates are to be recorded on tracks at the same recording rate and reproduced at a high speed, high speed playback data are reproduced during the lower high speed (quadruple speed) playback and higher high speed (16-times speed) playback with the data rates "1", "½" and "¼" without arranging high speed playback data area for the respective data rates. This realizes high speed playback at the same high speed, steadily reproducing the high speed playback data.

Although the data rates are "1", "½" and "¼" in the present example, the data rate may be different from these values. Effects similar to those obtained in the present example are achieved even when the data rate is different, as far as the head traces high speed playback data with the playback speed controlled depending on the data rate during the playback at an m-times speed with that data rate.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A magnetic type recording and reproducing apparatus for recording signals, having a different data rates from each other, together with pilot signals for use in tracking during playback, to a plurality of tracks formed on a magnetic tape and for reproducing the signals, comprising:

a first head and a second head which have different azimuth angles from each other;

determining means for determining a data rate of playback data obtained by said first head and said second head;

means for extracting a first pilot signal component obtained through playback by said first head;

means for extracting a second pilot signal component obtained through playback by said second head;

detection means for detecting a tracking error on the basis of the first pilot signal component, the second pilot signal component, and the data rate determined by said determining means; and control means for controlling tracking of said first and second heads in accordance with the tracking error detected by said detection means.

2. The magnetic type recording and reproducing apparatus of claim 1, wherein when reproducing playback data from a first of said plurality of tracks, said first head obtains the first pilot signal component from neighboring tracks of the first track, while when reproducing playback data from a second of said plurality of tracks, said second head obtains the second pilot signal component from neighboring tracks of the second track, and said detection means detects the tracking error using the first or the second pilot signal component during regular playback with a data rate of "1" and detects the tracking error using the first and the second pilot signal components during regular playback with a data rate of "½n" (n≧1: integer).

3. The magnetic type recording and reproducing apparatus of claim 2, further comprising:

means for extracting a third pilot signal component obtained when said first head scans astride adjacent tracks approximately uniformly; and means for extracting a fourth pilot signal component obtained when said second head scans astride adjacent tracks approximately uniformly, wherein said detection means detects the tracking error using the first or the second pilot signal component during regular playback with the data rate of "1", detects the tracking error using the first and the second pilot signal components during regular playback with a data rate of "½" and detects the tracking error using the first, the second, the third and the fourth pilot signal components during a regular playback with a data rate of "¼n" (n≧1: integer).

4. The magnetic type recording and reproducing apparatus of claim 2, further comprising:

means for extracting a third pilot signal component obtained when said first head scans and reproduces astride adjacent tracks; and means for extracting a fourth pilot signal component obtained when said second head scans and reproduces astride adjacent tracks;

memory means for storing a reference value of a ratio of the third pilot signal component and the fourth pilot signal component; and means for comparing the ratio of the third pilot signal component and the fourth pilot signal component with the reference value and for outputting a comparison signal, wherein said detection means detects the tracking error using the first or the second pilot signal component during regular playback with the data rate of "1", detects the tracking error using the first and the second pilot signal components during regular playback with the data rate of "½", and detects the tracking error using the first and/or the second pilot signal components, so that said control means controls tracking in accordance with a signal of the tracking error and the comparison signal during regular playback with a data rate of "1/n" (n≧3: integer).

5. A magnetic type recording and reproducing apparatus for recording signals, having a different data rates from each other, together with pilot signals for use in tracking during playback, to a plurality of tracks formed on a magnetic tape and for reproducing the signals, comprising:

a first head and a second head which have different azimuth angles from each other;

determining means for determining a data rate of playback data obtained by said first head and said second head;

means for extracting a first pilot signal component obtained through playback by said first head;

means for extracting a second pilot signal component obtained through playback by said second head;

detection means for detecting a tracking error on the basis of the first pilot signal component and the second pilot signal component; and control means for controlling tracking of said first and second heads in accordance with the tracking error detected by said detection means;

wherein when reproducing playback data from a first of said plurality of tracks, said first head obtains the first pilot signal component from neighboring tracks of the first track.

while when reproducing playback data from a second of said plurality of tracks, said second head obtains the second pilot signal component from neighboring tracks of the second track, and said detection means detects the tracking error using the first or the second pilot signal component during regular playback with a data rate of "1" and detects the tracking error using the first and the second pilot signal components during regular playback with a data rate of "½n" (n≧1: integer).

6. The magnetic type recording and reproducing apparatus of claim 5, further comprising:

means for extracting a third pilot signal component obtained when said first head scans astride adjacent tracks approximately uniformly; and means for extracting a fourth pilot signal component obtained when said second head scans astride adjacent tracks approximately uniformly, wherein said detection means detects the tracking error using the first or the second pilot signal component during regular playback with the data rate of "1", detects the tracking error using the first and the second pilot signal components during regular playback with a data rate of "½" and detects the tracking error using the first, the second, the third and the fourth pilot signal components during a regular playback with a data rate of "¼n" (n≧1: integer).

7. The magnetic type recording and reproducing apparatus of claim 5, further comprising:

means for extracting a third pilot signal component obtained when said first head scans and reproduces astride adjacent tracks; and means for extracting a fourth pilot signal component obtained when said second head scans and reproduces astride adjacent tracks;

memory means for storing a reference value of a ratio of the third pilot signal component and the fourth pilot signal component; and means for comparing the ratio of the third pilot signal component and the fourth pilot signal component with the reference value and for outputting a comparison signal, wherein said detection means detects the tracking error using the first or the second pilot signal component during regular playback with the data rate of "1", detects the tracking error using the first and the second pilot signal components during regular playback with the data rate of "½", and detects the tracking error using the first and/or the second pilot signal components, so that said control means controls tracking in accordance with a signal of the tracking error and the comparison signal during regular playback with a data rate of "1/n" (n≧3: integer).

* * * * *